(12) United States Patent
Kim et al.

(10) Patent No.: US 12,416,787 B2
(45) Date of Patent: Sep. 16, 2025

(54) OPTICAL IMAGING SYSTEM

(71) Applicant: SAMSUNG ELECTRO-MECHANICS CO., LTD., Suwon-si (KR)

(72) Inventors: Hag Chul Kim, Suwon-si (KR); Phil Ho Jung, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 627 days.

(21) Appl. No.: 17/851,991

(22) Filed: Jun. 28, 2022

(65) Prior Publication Data

US 2023/0194833 A1 Jun. 22, 2023

(30) Foreign Application Priority Data

Dec. 21, 2021 (KR) .................. 10-2021-0183975

(51) Int. Cl.
G02B 13/00 (2006.01)
G02B 9/64 (2006.01)
G02B 13/16 (2006.01)

(52) U.S. Cl.
CPC .............. *G02B 9/64* (2013.01); *G02B 13/16* (2013.01)

(58) Field of Classification Search
CPC ............................ G02B 13/0065; G02B 9/12
See application file for complete search history.

(56) References Cited

U.S. PATENT DOCUMENTS

| | | | |
|---|---|---|---|
| 6,108,137 A | 8/2000 | Ohtake | |
| 7,092,170 B2 | 8/2006 | Satori | |
| 8,184,378 B2 | 5/2012 | Chia | |
| 2010/0149657 A1 | 6/2010 | Kuroda | |
| 2013/0342749 A1 | 12/2013 | Tashiro | |
| 2016/0091699 A1 | 3/2016 | Lin | |
| 2019/0086638 A1 | 3/2019 | Lee | |
| 2019/0324236 A1 | 10/2019 | Kim et al. | |
| 2019/0384035 A1 | 12/2019 | Nagano | |
| 2020/0209555 A1 | 7/2020 | Shimoeda | |

(Continued)

FOREIGN PATENT DOCUMENTS

CN 101915981 A 12/2010
CN 106199935 B 12/2018

(Continued)

OTHER PUBLICATIONS

Taiwanese Office Action issued on Jun. 21, 2023, in counterpart Taiwanese Patent Application No. 111123903 (4 pages in English, 5 pages in Chinese).

(Continued)

*Primary Examiner* — Joseph P Martinez
(74) *Attorney, Agent, or Firm* — NSIP Law

(57) ABSTRACT

An optical imaging system includes a first lens group, a second lens group, and a third lens group, each including a plurality of lenses and arranged in order along an optical axis, a reflecting member disposed in front of the first lens group, and an aperture disposed between the first lens group and the second lens group, wherein at least one of the first lens group to the third lens group is configured to be movable along the optical axis, and wherein the lens disposed closest to the aperture among the plurality of lenses included in the second lens group is formed of glass.

19 Claims, 44 Drawing Sheets

(56) References Cited

U.S. PATENT DOCUMENTS

2022/0075163 A1* 3/2022 Tang .................. G02B 15/143
2022/0413269 A1* 12/2022 Yao ..................... G02B 15/15

FOREIGN PATENT DOCUMENTS

| | | |
|---|---|---|
| CN | 112415729 A | 2/2021 |
| CN | 112612125 A | 4/2021 |
| CN | 112612127 A | 4/2021 |
| CN | 113296232 A | 8/2021 |
| CN | 110618518 B | 11/2021 |
| JP | 2014-26264 A | 2/2014 |
| JP | 2017-116702 A | 6/2017 |
| JP | 2018-25572 A | 2/2018 |
| JP | 2019-53113 A | 4/2019 |
| JP | 2019-70690 A | 5/2019 |
| KR | 10-2019-0032905 A | 3/2019 |
| KR | 10-2019-0121678 A | 10/2019 |
| TW | I593998 B | 8/2017 |
| TW | I746156 B | 11/2021 |

OTHER PUBLICATIONS

Korean Office Action Issued on May 17, 2024, in Counterpart Korean Patent Application No. 10-2021-0183975 (6 Pages in English, 5 Pages in Korean).

Taiwanese Office Action issued on Jun. 3, 2025, in corresponding Taiwanese Patent Application No. 113110797. (8pages in English, 7pages in Taiwanese).

* cited by examiner

OPTICAL IMAGING SYSTEM

CROSS-REFERENCE TO RELATED APPLICATIONS

This application claims the benefit under 35 USC 119(a) of Korean Patent Application No. 10-2021-0183975 filed on Dec. 21, 2021, in the Korean Intellectual Property Office, the entire disclosure of which is incorporated herein by reference for all purposes.

BACKGROUND

1. Field

The present disclosure relates to an optical imaging system.

2. Description of the Background

A camera module may be installed in a portable electronic device such as a smartphone.

In addition, a method of mounting a plurality of camera modules having different focal lengths in a portable electronic device has recently been proposed to indirectly implement an optical zoom effect.

However, this method requires the plurality of camera modules for implementing the optical zoom effect, thus causing the portable electronic device to have a complicated structure.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes a first lens group, a second lens group, and a third lens group, each including a plurality of lenses and arranged in order along an optical axis, a reflecting member disposed in front of the first lens group, and an aperture disposed between the first lens group and the second lens group, wherein at least one of the first lens group to the third lens group is configured to be movable along the optical axis, and wherein the lens disposed closest to the aperture among the plurality of lenses included in the second lens group is formed of glass.

At least one among the plurality of lenses included in the first lens group may be formed of glass and the others may be formed of plastic, and the plurality of lenses included in the third lens group may be formed of plastic.

The object-side surface and image-side surface of the lens formed of glass may be aspherical surfaces.

The lens formed of glass may have the largest effective diameter among the plurality of lenses included in the first lens group to the third lens group.

The first lens group may have negative refractive power, the second lens group may have positive refractive power, and the third lens group may have negative refractive power.

The first lens group may include a first lens and a second lens, the second lens group may include a third lens, a fourth lens, a fifth lens, and a sixth lens, and the third lens group may include a seventh lens and an eighth lens.

The first lens may have negative refractive power, and the second lens may have positive refractive power.

The third lens may have positive refractive power, the fourth lens may have positive refractive power, the fifth lens may have negative refractive power, and the sixth lens may have positive refractive power.

The seventh lens may have positive refractive power, and the eighth lens may have negative refractive power.

The second lens group and the third lens group may each be capable of being moved along the optical axis, the optical imaging system may have a first total focal length or a second total focal length, based on positions of the second lens group and the third lens group, and the first total focal length may be smaller than the second total focal length.

$f3/fL$ may be greater than 0.5 and less than 3.0, where f3 indicates a focal length of the third lens, and fL indicates the first total focal length.

$f4/fL$ may be greater than 1.0 and less than 15.0, where f4 indicates a focal length of the fourth lens.

$f5/fL$ may be greater than $-2.0$ and less than $-0.5$, where f5 indicates a focal length of the fifth lens.

$f6/fL$ may be greater than 0.5 and less than 3.0, where f6 indicates a focal length of the sixth lens.

$fH/fL$ may be greater than 1.9 and less than 3.0, where fH indicates the second total focal length.

$|fG1|/|fG2|$ may be greater than 2 and less than 3.0 and $|fG1|/|fG3|$ may be greater than 1 and less than 2, where fG1 indicates a focal length of the first lens group, fG2 is a focal length of the second lens group, and fG3 indicates a focal length of the third lens group.

MAX_GED/MAX_PED may be greater than 1 and less than 1.2, where MAX_GED indicates an effective diameter of the lens having the largest effective diameter among the plurality of lenses included in the first lens group to the third lens group, and MAX_PED indicates an effective diameter of the lens having the second largest effective diameter among the plurality of lenses included in the first lens group to the third lens group.

MAX_GED/2IMG HT may be greater than 0.9 and less than 1.3, where 2IMG HT indicates a diagonal length of an imaging plane.

In another general aspect, an optical imaging system includes a first lens group, a second lens group, and a third lens group, each including a plurality of lenses and arranged in order along an optical axis, a reflecting member disposed in front of the first lens group, and an aperture disposed between the first lens group and the second lens group, wherein at least one of the first lens group to the third lens group is movable along the optical axis, wherein at least one lens among the plurality of lenses included in the second lens group is formed of glass, and wherein the at least one lens formed of glass has the largest effective diameter among the plurality of lenses included in the first lens group to the third lens group.

An electronic device may include the optical imaging system, wherein the optical imaging system may further include an image sensor configured to convert an image of an incident subject into an electrical signal.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative sizes, proportions, and depictions of elements in the drawings may be exaggerated for clarity, illustration, and convenience.

DETAILED DESCRIPTION

Figure 1:
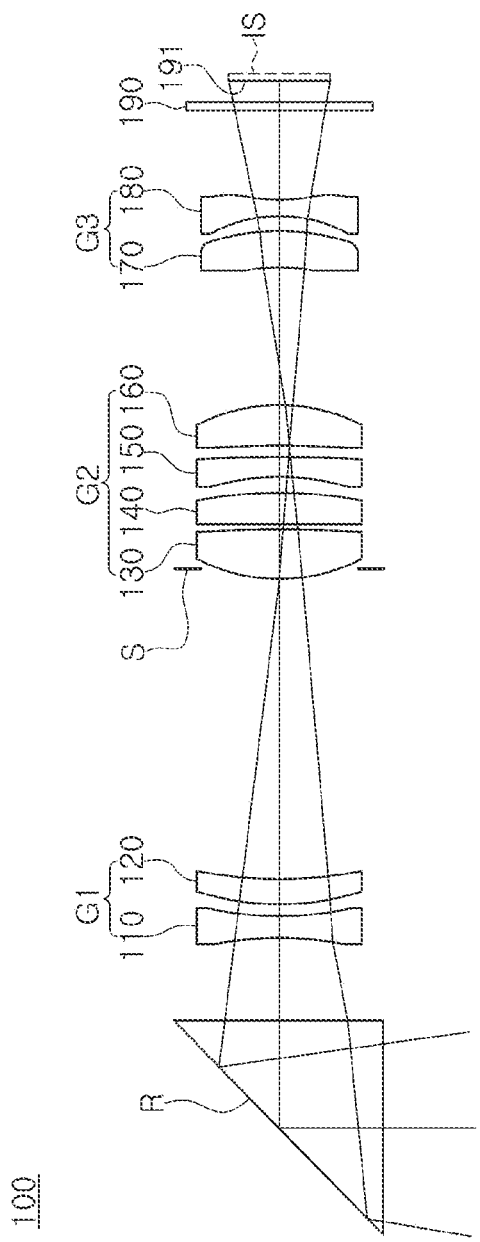
FIG. 1 is a view illustrating a configuration of a lens in the case that an optical imaging system according to a first example embodiment of the present disclosure has a first total focal length.

Hereinafter, example embodiments in the present disclosure are described in detail with reference to the accompanying illustrative drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

Herein, it is noted that use of the term "may" with respect to an example, for example, as to what an example may include or implement, means that at least one example exists in which such a feature is included or implemented while all examples are not limited thereto.

The features of the examples described herein may be combined in various ways as will be apparent after an understanding of this disclosure. Further, although the examples described herein have a variety of configurations, other configurations are possible as will be apparent after an understanding of this disclosure.

An aspect of the present disclosure may provide an optical imaging system which may implement a zoom function by changing a focal length.

In the drawings, the thickness, size, and shape of a lens are somewhat exaggerated for convenience of explanation. In particular, a shape of a spherical surface or aspherical surface, illustrated in the drawings, is only illustrative. That is, the shape of the spherical surface or aspherical surface is not limited to that illustrated in the drawings.

An optical imaging system according to an example embodiment of the present disclosure may be mounted in a portable electronic device. For example, the optical imaging system may be a component of a camera module mounted in the portable electronic device. The portable electronic device may be a transportable electronic device such as a mobile communications terminal, a smartphone, or a tablet personal computer (PC).

The optical imaging system according to an example embodiment of the present disclosure may include a plurality of lens groups. For example, the optical imaging system may include a first lens group, a second lens group and a third lens group. Each of the first lens group to the third lens group may include a plurality of lenses. For example, the optical imaging system may include at least eight lenses. For example, the optical imaging system may include no more than eight lenses.

The first lens group may include a first lens and a second lens, the second lens group may include a third lens, a fourth lens, a fifth lens and a sixth lens, and the third lens group may include a seventh lens and an eighth lens.

The plurality of lenses may be arranged to be spaced apart from each other by a predetermined distance.

The first lens (or forwardmost lens) may indicate a lens disposed closest to an object side (or reflecting member), and the last lens (or rearmost lens) may indicate a lens disposed closest to an imaging plane (or image sensor).

In addition, a first surface of each lens may indicate a surface thereof closest to the object side (or object-side surface) and a second surface of each lens may indicate a surface thereof closest to an image side (or image-side surface). In addition, in the present specification, all numerical values of the radius of curvature, thickness, distance, focal length and the like of a lens may be indicated in millimeters (mm), and a field of view (FOV) may be indicated in degrees.

Further, in a description for a shape of each lens, one surface of a lens, having a convex shape, may indicate that a paraxial region portion of the corresponding surface is convex, and one surface of a lens, having a concave shape, may indicate that a paraxial region portion of the corresponding surface is concave. Therefore, although it is described that one surface of a lens is convex, an edge portion of the lens may be concave. Likewise, although it is described that one surface of a lens is concave, an edge portion of the lens may be convex.

Meanwhile, a paraxial region may indicate a very narrow region in the vicinity of an optical axis.

The imaging plane may indicate a virtual plane where a focus is formed by the optical imaging system. Alternatively, the imaging plane may indicate one surface of the image sensor, on which light is received.

The optical imaging system according to an example embodiment of the present disclosure may include at least eight lenses.

For example, the optical imaging system according to an example embodiment of the present disclosure may include the first lens, the second lens, the third lens, the fourth lens, the fifth lens, the sixth lens, the seventh lens and the eighth lens, which are arranged in order from the object side (or reflecting member).

In addition, the optical imaging system may further include the image sensor for converting an image of an incident subject into an electrical signal.

In addition, the optical imaging system may further include an infrared filter (hereinafter, filter) blocking infrared light. The filter may be disposed between the rearmost lens and the image sensor.

In addition, the optical imaging system may further include an aperture disposed between the first lens group and the second lens group. For example, the aperture may be disposed between the second lens and the third lens.

The optical imaging system according to an example embodiment of the present disclosure may further include the reflecting member having a reflecting surface for changing an optical path. For example, the reflecting member may be a mirror or a prism.

The reflecting member may be disposed in front of the plurality of lenses. For example, the reflecting member may be disposed in front of the first lens (i.e., disposed closer to the object side than the first lens).

A long optical path may be formed in a relatively narrow space by disposing the reflecting member in front of the plurality of lenses to bend the optical path.

The optical imaging system may thus have a long focal length while being made smaller.

At least one among the plurality of lenses included in the optical imaging system according to an example embodiment of the present disclosure may be formed of glass.

That is, some of the plurality of lenses included in the optical imaging system according to an example embodiment of the present disclosure may be formed of glass, and the others may be formed of plastic.

For example, at least one among the plurality of lenses included in the first lens group may be formed of glass, and the others may be formed of plastic. At least one among the plurality of lenses included in the second lens group may be formed of glass, and the others may be formed of plastic. The lenses included in the third lens group may be formed of plastic.

For example, the first lens group may include two lenses, and may be formed of plastic or glass in order from the object side.

The second lens group may include four lenses, and the lenses formed of glass, plastic, glass and plastic and may be repeatedly arranged in order from the object side.

In an example embodiment, the first lens group may include two lenses. For example, the first lens group may include the first lens and the second lens. Here, the first lens may be a plastic lens having the aspherical surface, and the second lens may be a glass lens having the spherical surface. The second lens may be made of abrasive glass.

In an example embodiment, the second lens group may include four lenses. For example, the second lens group may include the third lens, the fourth lens, the fifth lens and the sixth lens. Here, the third lens and the fifth lens may each be a glass lens, and the fourth lens and the sixth lens may each be the plastic lens having the aspherical surface.

In addition, the third lens and fifth lens may have different optical characteristics. The third lens may be made of a glass mold having the aspherical surface, and the fifth lens may be made of the abrasive glass having the spherical surface. The third lens may have a low refractive index and a high dispersion value, and the fifth lens may have a high refractive index and a low dispersion value. For example, the third lens may have a refractive index less than 1.5 and an Abbe number greater than 80. The fifth lens may have a refractive index greater than 1.8 and an Abbe number less than 30.

Each refractive index of the fourth lens and the sixth lens which are formed of plastic may have a value between each refractive index of the third lens and the fifth lens which are formed of glass. In addition, each Abbe number of the fourth lens and the sixth lens which are formed of plastic may have a value between each Abbe number of the third lens and the fifth lens which are formed of glass.

The lens disposed forwardmost (i.e., lens disposed closest to the first lens group, or lens disposed closest to the aperture) among the plurality of lenses included in the second lens group, may be formed of glass and may have the largest effective diameter.

For example, the third lens disposed forwardmost of the plurality of lenses included in the second lens group may have the effective diameter larger than the effective diameters of the other lenses.

The optical imaging system according to an example embodiment of the present disclosure may have the optical path bent by the reflecting member, and may be disposed in such a manner that the optical axis is oriented perpendicular to a thickness direction of the portable electronic device. In this case, the effective diameter of the lens included in the optical imaging system may affect a thickness of the portable electronic device.

In order for the optical imaging system to receive as much light as possible for capturing a high-resolution image (i.e., for having a smaller Fno (constant indicating brightness of the optical imaging system)), it is necessary to increase the effective diameter of the lens included in the optical imaging system as long as the increased effective diameter does not affect the thickness of the portable electronic device.

However, the lens may have performance thereof deteriorated by the temperature as having a larger effective diameter. In particular, the lens formed of plastic may have the performance deteriorated by the temperature.

However, the optical imaging system according to an example embodiment of the present disclosure may allow the lens disposed closest to the aperture to be formed of glass, thus preventing performance thereof from being deteriorated by the temperature.

In an example embodiment, the lens disposed closest to the aperture may be made of aspherical glass.

Some of the plurality of lenses may each have the aspherical surface. For example, in some example embodiments, the first lens, the third lens, the fourth lens, the sixth lens, the seventh lens, and the eighth lens may each have at least one aspherical surface.

In addition, in other example embodiments, the first lens, the fourth lens, the sixth lens, the seventh lens, and the eighth lens may each have at least one aspherical surface.

Here, the aspherical surface of each lens may be expressed by Equation 1.

$$Z = \frac{cY^2}{1+\sqrt{1-(1+K)c^2Y^2}} + AY^4 + BY^6 + CY^8 + DY^{10} + EY^{12} + FY^{14} + GY^{16} + HY^{18} + JY^{20}$$

Equation 1

In Equation 1, "c" may indicate a curvature (reciprocal of the radius of curvature) of the lens, "K" may indicate a conic constant, and "Y" may indicate a distance from any point on the aspherical surface of the lens to the optical axis. In addition, each of constants "A" to "H", and "J" may indicate a coefficient of the aspherical surface. In addition, "Z" may indicate a distance SAG from any point on the aspherical surface of the lens to a vertex of the aspherical surface.

The optical imaging system according to an example embodiment of the present disclosure may satisfy at least one of the following conditional expressions.

| Conditional Expression 1 | 0.5 < f3/fL < 3.0 |
| Conditional Expression 2 | 1.0 < f4/fL < 15.0 |
| Conditional Expression 3 | −2.0 < f5/fL < −0.5 |

-continued

| Conditional Expression 4 | 0.5 < f6/fL < 3.0 |
| Conditional Expression 5 | 1.9 < fH/fL < 3.0 |
| Conditional Expression 6 | 2 < |fG1|/|fG2| < 3.0 |
| Conditional Expression 7 | 1 < |fG1/fG3| < 2 |
| Conditional Expression 8 | 0.5 < |fG2|/|fG3| < 1 |
| Conditional Expression 9 | 1 < MAX_GED/MAX_PED < 1.2 |
| Conditional Expression 10 | 0.9 < MAX_GED/2IMG HT < 1.3 |
| Conditional Expression 11 | 2.0 < Fno_L < 3.5 | fL may indicate a first total focal length of the optical imaging system, fH may indicate a second total focal length of the optical imaging system, f3 may indicate a focal length of the third lens, f4 may indicate a focal length of the fourth lens, f5 may indicate a focal length of the fifth lens, and f6 may indicate a focal length of the sixth lens.

fG1 may indicate a focal length of the first lens group, fG2 may indicate a focal length of the second lens group, and fG3 may indicate a focal length of the third lens group.

MAX_GED may indicate an effective diameter of the lens having the largest effective diameter among the first to eighth lenses, and MAX_PED may indicate an effective diameter of the lens having the second largest effective diameter among the first to eighth lenses. Here, the effective diameter may indicate a larger value among the effective diameters of the object-side surface and image-side surface of the corresponding lens.

2IMG HT may indicate a diagonal length of the imaging plane.

Fno_L may indicate an F-number in the case that the optical imaging system has a smaller total focal length (e.g., first total focal length fL).

The optical imaging system according to an example embodiment of the present disclosure may include the plurality of lens groups. For example, an optical imaging system may include the first lens group, the second lens group and the third lens group. Each of the first lens group to the third lens group may include the plurality of lenses.

The first lens group may include the first lens and the second lens. The first lens may have negative refractive power, and a concave first surface and a concave second surface. The second lens has positive refractive power, and a convex first surface and a concave second surface.

The first lens group may generally have negative refractive power.

The second lens group may include the third lens, the fourth lens, the fifth lens, and the sixth lens. The third lens may have positive refractive power, and a convex first surface and a convex second surface. The fourth lens may have positive refractive power, and a concave first surface and a convex second surface. Alternatively, the fourth lens may have a convex first surface and a concave second surface. Alternatively, the fourth lens may have a convex first surface and a convex second surface. The fifth lens may have negative refractive power, and a concave first surface and a convex second surface. Alternatively, the fifth lens may have a concave first surface and a concave second surface. The sixth lens may have positive refractive power, and a concave first surface and a convex second surface. Alternatively, the sixth lens may have a convex first surface and a convex second surface. Alternatively, the sixth lens may have a concave first surface and a convex second surface.

The second lens group may generally have positive refractive power.

The third lens group may include the seventh lens and the eighth lens. The seventh lens may have positive refractive power, and a concave first surface and a convex second surface. The eighth lens may have negative refractive power, and a concave first surface and a concave second surface.

The third lens group may generally have negative refractive power.

At least one of the first lens group to the third lens group may be moved to change the total focal length of the optical imaging system.

For example, a space between the first lens group and the second lens group may be changed. For example, the first lens group may be fixedly disposed, and the second lens group may be disposed to be moved in an optical axis direction.

In addition, at least one of the first lens group to the third lens group may be moved to focus on the subject.

For example, the third lens group may be disposed to be moved in the optical axis direction. A space between the third lens group and the image sensor may also be changed as the third lens group is moved.

That is, the second lens group may be moved along the optical axis to implement the optical zoom function, and the third lens group may be moved along the optical axis to adjust the focus.

Accordingly, the optical imaging system according to an example embodiment of the present disclosure may have the optical zoom function and/or the focusing function.

Meanwhile, a space between the second lens group and the third lens group may also be changed as the second lens group and the third lens group are respectively moved.

The optical imaging system according to an example embodiment of the present disclosure may have characteristics of a telephoto lens having a relatively narrow angle of view and the long focal length.

An optical imaging system according to a first example embodiment of the present disclosure is described with reference to FIGS. 1 through 4.

Figure 2:
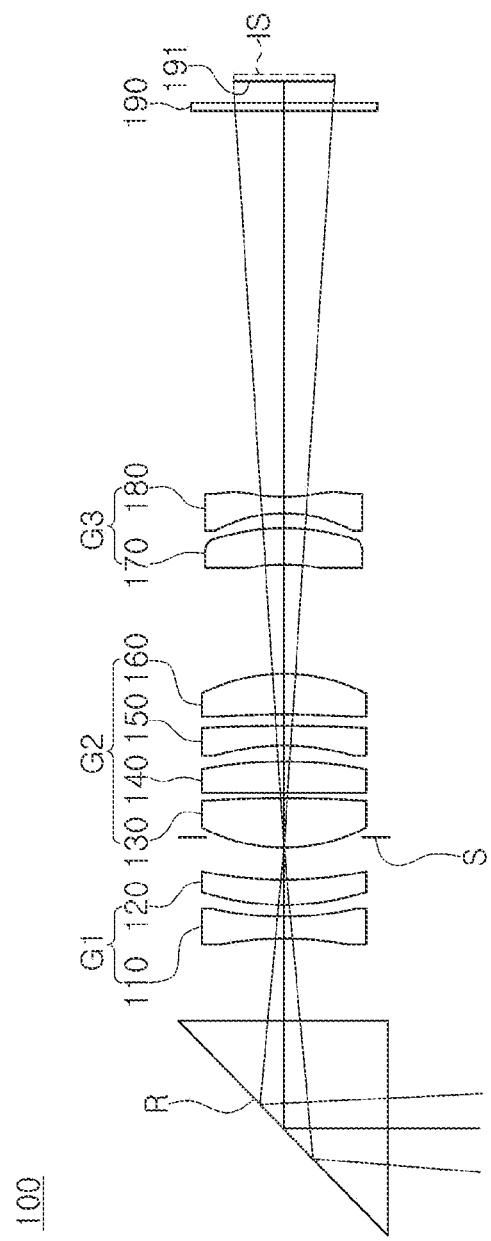
FIG. 2 is a view illustrating a configuration of the lens in the case that the optical imaging system according to the first example embodiment of the present disclosure has a second total focal length.

FIG. 1 is a view illustrating a configuration of the lens in the case that the optical imaging system according to the first example embodiment of the present disclosure has the first total focal length; and FIG. 2 is a view illustrating a configuration of the lens in the case that the optical imaging system according to the first example embodiment of the present disclosure has the second total focal length.

An optical imaging system 100 according to the first example embodiment of the present disclosure may include a first lens group G1, a second lens group G2 and a third lens group G3.

The first lens group G1 may include a first lens 110 and a second lens 120; the second lens group G2 may include a third lens 130, a fourth lens 140, a fifth lens 150, and a sixth lens 160; and the third lens group G3 may include a seventh lens 170 and an eighth lens 180.

In addition, the optical imaging system may further include a filter 190 and an image sensor IS.

The optical imaging system 100 according to the first example embodiment of the present disclosure may form the focus on an imaging plane 191. The imaging plane 191 may indicate a surface on which the focus is formed by the optical imaging system. For example, the imaging plane 191 may indicate one surface of the image sensor IS, on which light is received.

In addition, the aperture S may be disposed between the first lens group G1 and the second lens group G2. For example, the aperture S may be disposed between the second lens 120 and the third lens 130.

In addition, the optical imaging system may further include a reflecting member R disposed in front of the first lens 110 and having the reflecting surface of which the optical path is changed. In the first example embodiment of the present disclosure, the reflecting member R may be the prism or the mirror.

Light incident on the reflecting member R may be bent by the reflecting member R, and may pass through the first lens group G1 to the third lens group G3. For example, light incident on the reflecting member R along a first optical axis may be bent toward a second optical axis (for example, the optical axis) perpendicular to the first optical axis.

At least one of the first lens group G1 to the third lens group G3 may be moved to change the total focal length of the optical imaging system. For example, a space between the first lens group G1 and the second lens group G2 may be changed as the first lens group G1 is fixed and the second lens group G2 is moved along the optical axis.

In addition, a space between the second lens group G2 and the third lens group G3 may be changed, and a space between the third lens group G3 and the imaging plane 191 may be changed, as the second lens group G2 and the third lens group G3 are each moved along the optical axis.

Here, 'space' may indicate a distance between two members in the optical axis direction.

Table 1 illustrates characteristics of each lens (e.g., radius of curvature, thickness of the lens or distance between the lenses, refractive index, Abbe number, effective diameter, and focal length).

TABLE 1

| Surface no. | Item | Radius of curvature | Thickness or distance | Refractive index | Abbe no. | Effective diameter | Focal length |
|---|---|---|---|---|---|---|---|
| S1 | Prism | Infinity | 3.200 | 1.717 | 29.5 | 5.800 | |
| S2 | | Infinity | 3.200 | 1.717 | 29.5 | 5.800 | |
| S3 | | Infinity | 2.500 | | | 5.800 | |
| S4 | First lens | −8.741 | 0.620 | 1.544 | 56 | 5.100 | −10.509 |
| S5 | | 17.164 | 0.355 | | | 5.219 | |
| S6 | Second lens | 7.303 | 0.750 | 1.846 | 23.7 | 5.534 | 26.268 |
| S7 | | 10.308 | D1 | | | 5.478 | |
| S8 | Third lens | 5.71470 | 1.473 | 1.497 | 81.5 | 6.000 | 8.741 |
| S9 | | −16.78133 | 0.185 | | | 6.000 | |
| S10 | Fourth lens | −74.78126 | 0.910 | 1.544 | 56 | 5.900 | 111.018 |
| S11 | | −33.63970 | 0.481 | | | 5.900 | |
| S12 | Fifth lens | −9.15650 | 0.580 | 1.846 | 23.7 | 5.659 | −13.466 |
| S13 | | −46.02062 | 0.350 | | | 5.621 | |
| S14 | Sixth lens | −46.71626 | 1.283 | 1.535 | 56 | 5.565 | 9.846 |
| S15 | | −4.79595 | D2 | | | 5.520 | |
| S16 | Seventh lens | −7.04833 | 1.050 | 1.66 | 20.4 | 4.300 | 32.671 |
| S17 | | −5.646 | 0.480 | | | 4.176 | |
| S18 | Eighth lens | −16.50050 | 0.580 | 1.535 | 56 | 4.109 | −8.337 |
| S19 | | 6.22100 | D3 | | | 4.300 | |
| S20 | Filter | Infinity | 0.210 | 1.516 | 64.1 | 5.317 | |
| S21 | | Infinity | 0.655 | | | 5.337 | |
| S22 | Imaging plane | Infinity | | | | 5.489 | |

TABLE 2

| | First position | Second position |
|---|---|---|
| D1 | 9.066 | 0.850 |
| D2 | 4.087 | 2.557 |
| D3 | 2.635 | 12.402 |

D1 may indicate a distance between the second lens 120 and the third lens 130 in the optical axis direction, D2 may indicate a distance between the sixth lens 160 and the seventh lens 170 in the optical axis direction, and D3 may indicate a distance between the eighth lens 180 and the filter 190 in the optical axis direction.

A space between the first lens group G1 and the second lens group G2 in the first position may be different from a space between the first lens group G1 and the second lens group G2 in the second position. For example, the first lens group G1 and the second lens group G2 may be positioned relatively distantly from each other in the first position, and the first lens group G1 and the second lens group G2 may be positioned relatively close to each other in the second position.

In addition, a space between the second lens group G2 and the third lens group G3 in the first position may be different from a space between the second lens group G2 and the third lens group G3 in the second position. For example, the second lens group G2 and the third lens group G3 may be positioned relatively distantly from each other in the first position, and the second lens group G2 and the third lens group G3 may be positioned relatively close to each other in the second position.

The space between the first lens group G1 and the second lens group G2 and the space between the second lens group G2 and the third lens group G3 may be changed, thus changing the total focal length of the optical imaging system, and adjusting the focus.

The first position may indicate relative positions of the first lens group G1 to the third lens group G3 in the case that the optical imaging system has the first total focal length fL, and the second position may indicate the relative positions of the first lens group G1 to the third lens group G3 in the case that the optical imaging system has the second total focal length fH.

The first total focal length fL of the optical imaging system in the first position may be 8.2 mm, and Fno_L may be 2.4.

The second total focal length fH of the optical imaging system in the second position may be 22 mm, and Fno_H may be 4.5.

Fno_L may indicate the F-number of the optical imaging system in the first position, and Fno_H may indicate the F-number of the optical imaging system in the second position.

TTL of the optical imaging system may be 25.751 mm. TTL may indicate a distance from an object-side surface of the first lens 110 to the imaging plane 191 in the optical axis direction.

A diagonal length of the imaging plane 191 may be 5.489 mm.

In the first example embodiment of the present disclosure, the first lens group G1 may generally have negative refractive power. A focal length of the first lens group G1 may be −17.233 mm.

The second lens group G2 may generally have positive refractive power. A focal length of the second lens group G2 may be 7.582 mm.

The third lens group G3 may generally have negative refractive power. A focal length of the third lens group G3 may be −10.676 mm.

The first lens 110 may have negative refractive power, and a concave first surface and a concave second surface.

The second lens 120 may have positive refractive power, and a convex first surface and a concave second surface.

The third lens 130 may have positive refractive power, and a convex first surface and a convex second surface.

The fourth lens 140 may have positive refractive power, and a concave first surface and a convex second surface.

The fifth lens 150 may have negative refractive power, and a concave first surface and a convex second surface.

The sixth lens 160 may have positive refractive power, and a concave first surface and a convex second surface.

The seventh lens 170 may have positive refractive power, and a concave first surface and a convex second surface.

The eighth lens 180 may have negative refractive power, and a concave first surface and a concave second surface.

Meanwhile, each surface of the first lens 110, the third lens 130, the fourth lens 140, the sixth lens 160, the seventh lens 170, and the eighth lens 180 may have the coefficient of the aspherical surface, as illustrated in Table 3. For example, the object-side surfaces and image-side surfaces of the first lens 110, the third lens 130, the fourth lens 140, the sixth lens 160, the seventh lens 170, and the eighth lens 180 may be all the aspherical surfaces.

TABLE 3

| | S4 | S5 | S8 | S9 | S10 | S11 |
|---|---|---|---|---|---|---|
| Conic constant K | 2.2882784 | 9.9447339 | 0.1345855 | −99 | 99.000001 | 99 |
| $4^{th}$ coefficient A | 6.669E−03 | 5.394E−03 | 2.281E−04 | 1.290E−03 | 7.336E−04 | 1.442E−03 |
| $6^{th}$ coefficient B | −1.950E−03 | −1.111E−03 | −4.048E−05 | 2.223E−05 | 5.399E−05 | 1.114E−04 |
| $8^{th}$ coefficient C | 1.204E−03 | 6.148E−04 | −1.303E−05 | −1.993E−06 | −1.469E−04 | −7.077E−04 |
| $10^{th}$ coefficient D | −5.491E−04 | −3.011E−04 | 7.495E−07 | −1.378E−06 | −1.956E−05 | 1.687E−04 |
| $12^{th}$ coefficient E | 1.555E−04 | 9.070E−05 | −1.787E−07 | 2.467E−08 | 2.703E−05 | −2.691E−06 |
| $14^{th}$ coefficient F | −2.712E−05 | −1.657E−05 | 0.000E+00 | 0.000E+00 | −7.109E−06 | −4.941E−06 |
| $16^{th}$ coefficient G | 2.846E−06 | 1.808E−06 | 0.000E+00 | 0.000E+00 | 8.916E−07 | 8.746E−07 |
| $18^{th}$ coefficient H | −1.651E−07 | −1.088E−07 | 0.000E+00 | 0.000E+00 | −5.658E−08 | −6.301E−08 |
| $20^{th}$ coefficient J | 4.071E−09 | 2.786E−09 | 0.000E+00 | 0.000E+00 | 1.473E−09 | 1.727E−09 |

TABLE 3-continued

|  | S14 | S15 | S16 | S17 | S18 | S19 |
|---|---|---|---|---|---|---|
| Conic constant K | 99 | −3.04386 | −11.32069 | −76.7575 | −25.70075 | −99 |
| $4^{th}$ coefficient A | 8.568E−03 | 3.543E−03 | 7.116E−03 | −3.756E−02 | −3.084E−02 | 1.099E−02 |
| $6^{th}$ coefficient B | −2.399E−03 | −1.447E−03 | −8.812E−04 | 3.872E−02 | −2.048E−03 | −3.721E−02 |
| $8^{th}$ coefficient C | 6.341E−04 | 6.107E−04 | 1.190E−04 | −3.051E−02 | 6.805E−03 | 3.604E−02 |
| $10^{th}$ coefficient D | −3.662E−04 | −3.053E−04 | 3.303E−04 | 1.863E−02 | −2.574E−03 | −2.164E−02 |
| $12^{th}$ coefficient E | 1.298E−04 | 9.456E−05 | −1.887E−04 | −7.885E−03 | −1.572E−04 | 8.521E−03 |
| $14^{th}$ coefficient F | −2.516E−05 | −1.725E−05 | 4.280E−05 | 2.219E−03 | 4.121E−04 | −2.198E−03 |
| $16^{th}$ coefficient G | 2.676E−06 | 1.828E−06 | −4.506E−06 | −3.999E−04 | −1.420E−04 | 3.579E−04 |
| $18^{th}$ coefficient H | −1.441E−07 | −1.044E−07 | 1.928E−07 | 4.197E−05 | 2.260E−05 | −3.326E−05 |
| $20^{th}$ coefficient J | 3.016E−09 | 2.526E−09 | −2.152E−09 | −1.947E−06 | −1.437E−06 | 1.343E−06 |

Figure 3:
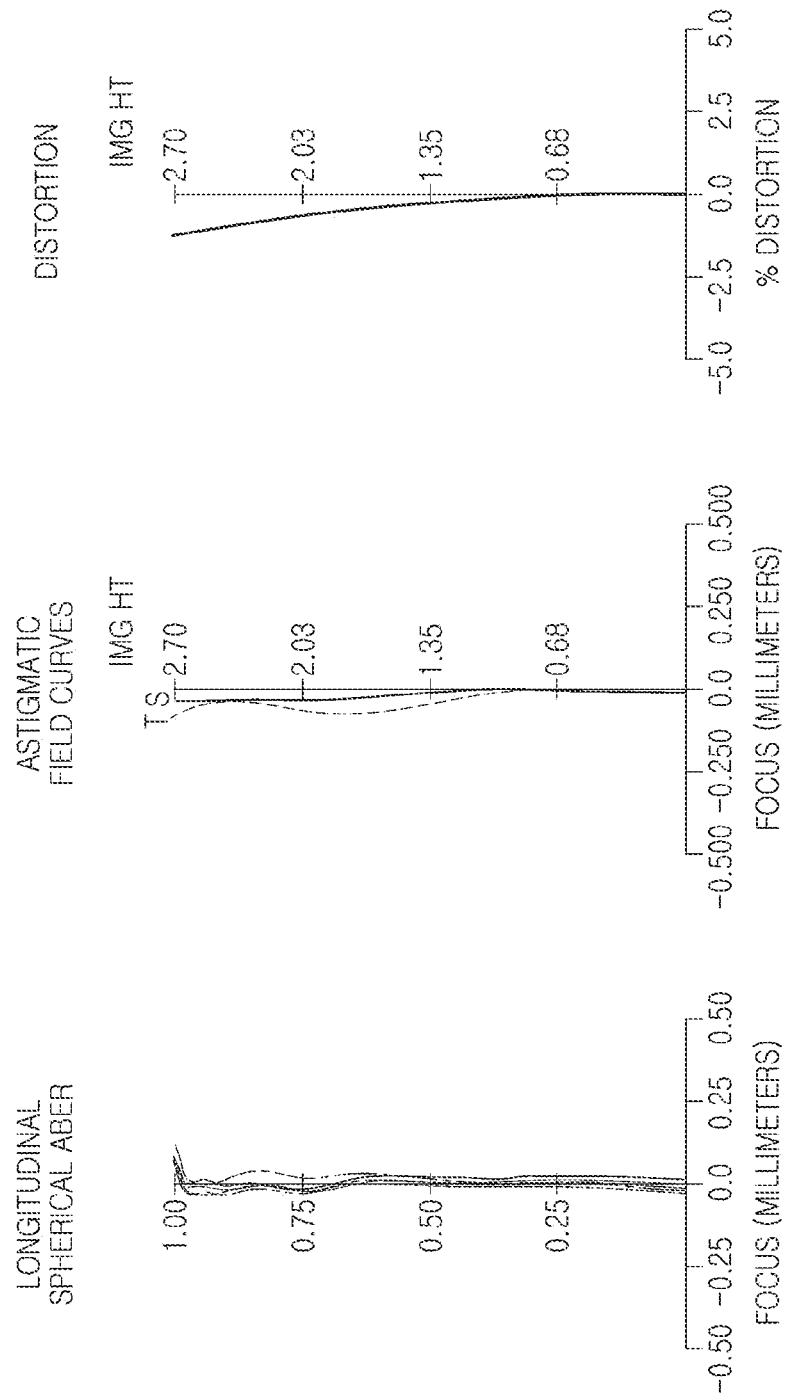
FIG. 3 presents graphs having curves representing aberration characteristics of the optical imaging system illustrated in FIG. 1.
Figure 4:
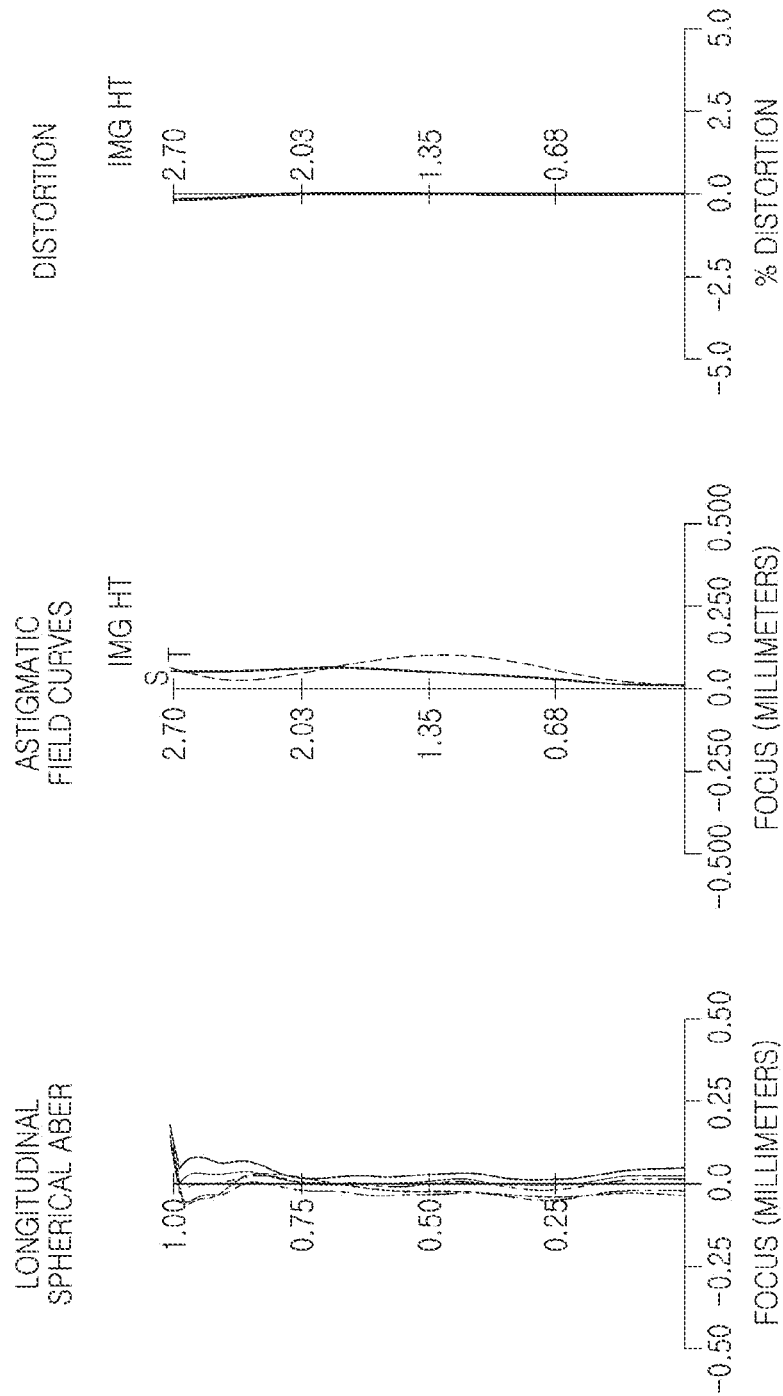
FIG. 4 presents graphs having curves representing aberration characteristics of the optical imaging system illustrated in FIG. 2.

In addition, the optical imaging system configured as described above may have aberration characteristics illustrated in FIGS. 3 and 4.

An optical imaging system according to a second example embodiment of the present disclosure is described with reference to FIGS. 5 through 8.

Figure 5:
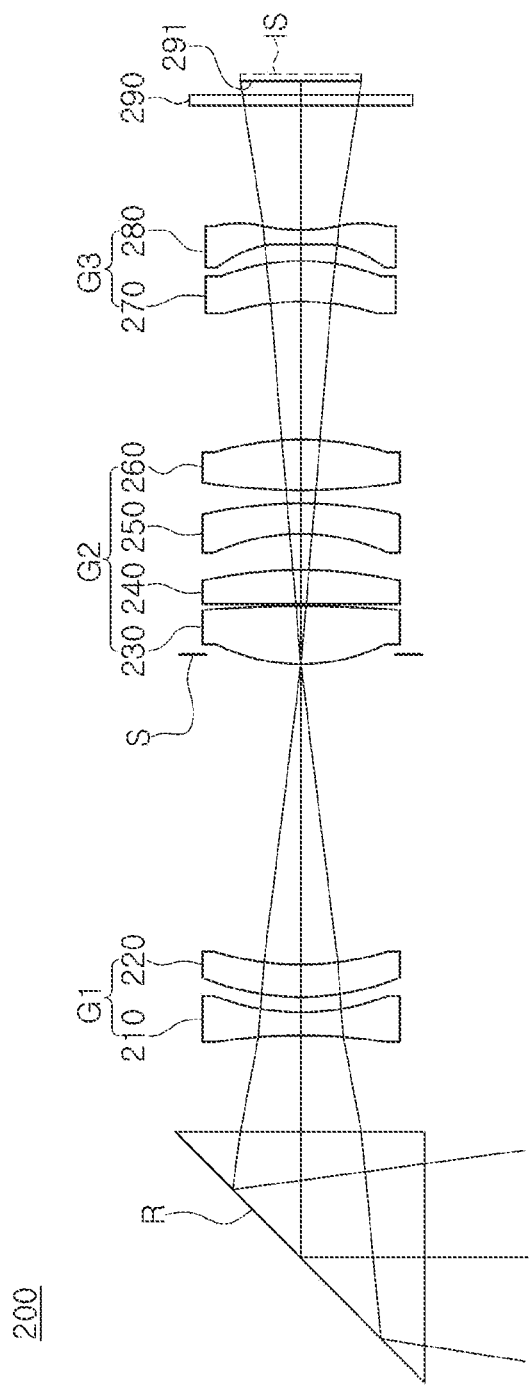
FIG. 5 is a view illustrating a configuration of the lens in the case that an optical imaging system according to a second example embodiment of the present disclosure has the first total focal length.
Figure 6:
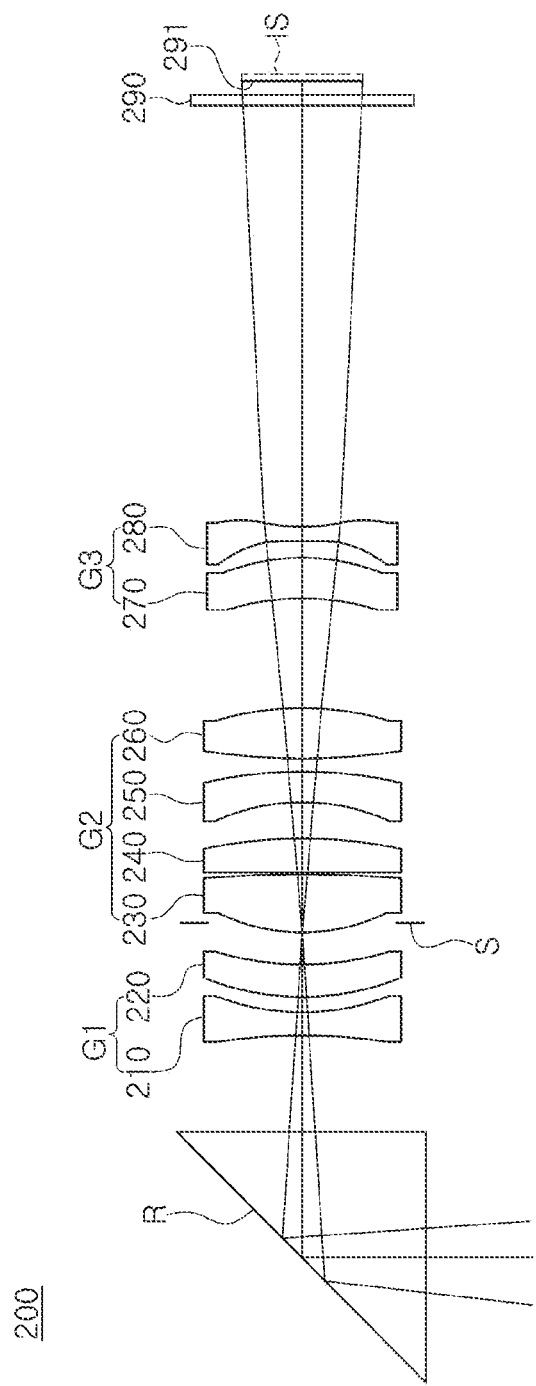
FIG. 6 is a view illustrating a configuration of the lens in the case that the optical imaging system according to the second example embodiment of the present disclosure has the second total focal length.

FIG. 5 is a view illustrating a configuration of the lens in the case that the optical imaging system according to the second example embodiment of the present disclosure has the first total focal length; and FIG. 6 is a view illustrating a configuration of the lens in the case that the optical imaging system according to the second example embodiment of the present disclosure has the second total focal length.

An optical imaging system 200 according to the second example embodiment of the present disclosure may include the first lens group G1, the second lens group G2, and the third lens group G3.

The first lens group G1 may include a first lens 210 and a second lens 220; the second lens group G2 may include a third lens 230, a fourth lens 240, a fifth lens 250, and a sixth lens 260; and the third lens group G3 may include a seventh lens 270 and an eighth lens 280.

In addition, the optical imaging system may further include a filter 290 and the image sensor IS.

The optical imaging system 200 according to the second example embodiment of the present disclosure may form the focus on an imaging plane 291. The imaging plane 291 may indicate the surface on which the focus is formed by the optical imaging system. For example, the imaging plane 291 may indicate one surface of the image sensor IS, on which light is received.

In addition, the aperture S may be disposed between the first lens group G1 and the second lens group G2. For example, the aperture S may be disposed between the second lens 220 and the third lens 230.

In addition, the optical imaging system may further include the reflecting member R disposed in front of the first lens 210 and having the reflecting surface on which the optical path is changed. In the second example embodiment of the present disclosure, the reflecting member R may be the prism or the mirror.

Light incident on the reflecting member R may be bent by the reflecting member R, and may pass through the first lens group G1 to the third lens group G3. For example, light incident on the reflecting member R along the first optical axis may be bent toward the second optical axis (for example, the optical axis) perpendicular to the first optical axis.

At least one of the first lens group G1 to the third lens group G3 may be moved to change the total focal length of the optical imaging system. For example, the space between the first lens group G1 and the second lens group G2 may be changed as the first lens group G1 is fixed and the second lens group G2 is moved along the optical axis.

In addition, the space between the second lens group G2 and the third lens group G3 may be changed, and a space between the third lens group G3 and the imaging plane 291 may be changed, as the second lens group G2 and the third lens group G3 are respectively moved along the optical axis.

Here, 'space' may indicate the distance between two members in the optical axis direction.

Table 4 illustrates the characteristics of each lens (e.g., radius of curvature, thickness of the lens or distance between the lenses, refractive index, Abbe number or focal length).

TABLE 4

| Surface no. | Item | Radius of curvature | Thickness or distance | Refractive index | Abbe no. | Effective diameter | Focal length |
|---|---|---|---|---|---|---|---|
| S1 | Prism | Infinity | 3.200 | 1.717 | 293.5 | 5.800 | |
| S2 | | Infinity | −3.200 | 1.717 | 29.5 | 5.800 | |
| S3 | | Infinity | −2.500 | | | 5.800 | |
| S4 | First lens | −17.244 | 0.646 | 1.544 | 56 | 5.400 | −9.872 |
| S5 | | 7.956 | 0.355 | | | 5.283 | |
| S6 | Second lens | 6.513 | 0.872 | 1.846 | 23.7 | 5.445 | 23.663 |
| S7 | | 9.011 | D1 | | | 5.288 | |
| S8 | Third lens | 5.41085 | 1.459 | 1.497 | 81.5 | 5.400 | 8.928 |
| S9 | | −22.84824 | 0.100 | | | 5.451 | |
| S10 | Fourth lens | −2639.73721 | 0.837 | 1.544 | 56 | 5.360 | 55.686 |
| S11 | | −30.08915 | 1.000 | | | 5.377 | |
| S12 | Fifth lens | −5.26526 | 0.745 | 1.846 | 23.7 | 4.888 | −11.375 |
| S13 | | −12.22907 | 0.350 | | | 5.062 | |
| S14 | Sixth lens | 25.40020 | 1.347 | 1.535 | 56 | 5.011 | 8.432 |
| S15 | | −5.40948 | D2 | | | 4.860 | |

TABLE 4-continued

| Surface no. | Item | Radius of curvature | Thickness or distance | Refractive index | Abbe no. | Effective diameter | Focal length |
|---|---|---|---|---|---|---|---|
| S16 | Seventh lens | −4.70937 | 1.050 | 1.66 | 20.4 | 3.900 | 30.710 |
| S17 | | −4.173 | 0.480 | | | 3.990 | |
| S18 | Eighth lens | −8.62603 | 0.580 | 1.535 | 56 | 3.940 | −9.255 |
| S19 | | 12.00803 | D3 | | | 4.253 | |
| S20 | Filter | Infinity | 0.210 | 1.516 | 64.1 | 5.352 | |
| S21 | | Infinity | 0.364 | | | 5.368 | |
| S22 | Imaging plane | Infinity | | | | 5.425 | |

TABLE 5

| | First position | Second position |
|---|---|---|
| D1 | 7.795 | 0.850 |
| D2 | 3.535 | 2.000 |
| D3 | 3.026 | 11.506 |

D1 may indicate a distance between the second lens 220 and the third lens 230 in the optical axis direction, D2 may indicate a distance between the sixth lens 260 and the seventh lens 270 in the optical axis direction, and D3 may indicate a distance between the eighth lens 280 and the filter 290 in the optical axis direction.

The space between the first lens group G1 and the second lens group G2 in the first position may be different from the space between the first lens group G1 and the second lens group G2 in the second position. For example, the first lens group G1 and the second lens group G2 may be positioned relatively distantly from each other in the first position, and the first lens group G1 and the second lens group G2 may be positioned relatively close to each other in the second position.

In addition, the space between the second lens group G2 and the third lens group G3 in the first position may be different from the space between the second lens group G2 and the third lens group G3 in the second position. For example, the second lens group G2 and the third lens group G3 may be positioned relatively distantly from each other in the first position, and the second lens group G2 and the third lens group G3 may be positioned relatively close to each other in the second position.

The space between the first lens group G1 and the second lens group G2 and the space between the second lens group G2 and the third lens group G3 may be changed, thus changing the total focal length of the optical imaging system, and adjusting the focus.

The first position may indicate the relative positions of the first lens group G1 to the third lens group G3 in the case that the optical imaging system has the first total focal length fL, and the second position may indicate the relative positions of the first lens group G1 to the third lens group G3 in the case that the optical imaging system has the second total focal length fH.

The first total focal length fL of the optical imaging system in the first position may be 8.2 mm, and Fno_L may be 2.4.

The second total focal length fH of the optical imaging system in the second position may be 19 mm, and Fno_H may be 4.3.

Fno_L may indicate the F-number of the optical imaging system in the first position, and Fno_H may indicate the F-number of the optical imaging system in the second position.

TTL of the optical imaging system may be 24.751 mm. TTL may indicate a distance from an object-side surface of the first lens 210 to the imaging plane 291 in the optical axis direction.

A diagonal length of the imaging plane 291 may be 5.425 mm.

In the second example embodiment of the present disclosure, the first lens group G1 may generally have negative refractive power. The focal length of the first lens group G1 may be −16.268 mm.

The second lens group G2 may generally have positive refractive power. The focal length of the second lens group G2 may be 7.307 mm.

The third lens group G3 may generally have negative refractive power. The focal length of the third lens group G3 may be −12.061 mm.

The first lens 210 may have negative refractive power, and a concave first surface and a concave second surface.

The second lens 220 may have positive refractive power, and a convex first surface and a concave second surface.

The third lens 230 may have positive refractive power, and a convex first surface and a convex second surface.

The fourth lens 240 may have positive refractive power, and a concave first surface and a convex second surface.

The fifth lens 250 may have negative refractive power, and a concave first surface and a convex second surface.

The sixth lens 260 may have positive refractive power, and a convex first surface and a convex second surface.

The seventh lens 270 may have positive refractive power, and a concave first surface and a convex second surface.

The eighth lens 280 may have negative refractive power, and a concave first surface and a concave second surface.

Meanwhile, each surface of the first lens 210, the third lens 230, the fourth lens 240, the sixth lens 260, the seventh lens 270, and the eighth lens 280 may have the coefficient of the aspherical surface, as illustrated in Table 6. For example, the object-side surfaces and image-side surfaces of the first lens 210, the third lens 230, the fourth lens 240, the sixth lens 260, the seventh lens 270, and the eighth lens 280 may be all the aspherical surfaces.

TABLE 6

| | S4 | S5 | S8 | S9 | S10 | S11 |
|---|---|---|---|---|---|---|
| Conic constant K | −11.72108 | 1.0654103 | −0.252235 | −99 | 0 | 99 |
| $4^{th}$ coefficient A | 7.938E−04 | 7.282E−04 | −2.086E−04 | 3.079E−04 | −1.452E−05 | −3.799E−04 |
| $6^{th}$ coefficient B | −8.471E−05 | 4.085E−05 | −6.101E−05 | 1.808E−06 | −3.358E−04 | −7.945E−04 |

TABLE 6-continued

| | | | | | | |
|---|---|---|---|---|---|---|
| 8th coefficient C | 2.020E-05 | -9.438E-06 | -1.376E-05 | -7.620E-07 | 9.525E-05 | 1.528E-04 |
| 10th coefficient D | -2.389E-06 | 9.289E-07 | -6.932E-07 | -1.518E-06 | -7.503E-06 | -1.931E-05 |
| 12th coefficient E | 1.094E-07 | -2.434E-08 | -1.896E-07 | -2.700E-12 | 2.112E-07 | 1.035E-06 |
| 14th coefficient F | 0.000E+00 | 0.000E+00 | 0.000E+00 | 0.000E+00 | 0.000E+00 | 0.000E+00 |
| 16th coefficient G | 0.000E+00 | 0.000E+00 | 0.000E+00 | 0.000E+00 | 0.000E+00 | 0.000E+00 |
| 18th coefficient H | 0.000E+00 | 0.000E+00 | 0.000E+00 | 0.000E+00 | 0.000E+00 | 0.000E+00 |
| 20th coefficient J | 0.000E+00 | 0.000E+00 | 0.000E+00 | 0.000E+00 | 0.000E+00 | 0.000E+00 |

| | S14 | S15 | S16 | S17 | S18 | S19 |
|---|---|---|---|---|---|---|
| Conic constant K | 54.242161 | -4.943669 | -10.66983 | -13.4387 | -19.89431 | -99 |
| 4th coefficient A | 5.281E-03 | 3.465E-03 | 1.136E-03 | -7.730E-03 | -2.770E-02 | -2.269E-02 |
| 6th coefficient B | -1.294E-03 | -8.314E-04 | 1.355E-03 | 4.310E-03 | 3.947E-03 | 4.475E-03 |
| 8th coefficient C | 3.069E-04 | 2.922E-04 | -4.281E-04 | -1.424E-03 | -1.680E-03 | -1.435E-03 |
| 10th coefficient D | -4.962E-05 | -5.078E-05 | 9.297E-05 | 2.468E-04 | 3.467E-04 | 3.668E-04 |
| 12th coefficient E | 3.193E-06 | 3.414E-06 | -7.899E-06 | -1.518E-05 | -1.560E-05 | -4.857E-05 |
| 14th coefficient F | 0.000E+00 | 0.000E+00 | 0.000E+00 | 0.000E+00 | 0.000E+00 | 3.040E-06 |
| 16th coefficient G | 0.000E+00 | 0.000E+00 | 0.000E+00 | 0.000E+00 | 0.000E+00 | 0.000E+00 |
| 18th coefficient H | 0.000E+00 | 0.000E+00 | 0.000E+00 | 0.000E+00 | 0.000E+00 | 0.000E+00 |
| 20th coefficient J | 0.000E+00 | 0.000E+00 | 0.000E+00 | 0.000E+00 | 0.000E+00 | 0.000E+00 |

Figure 7:
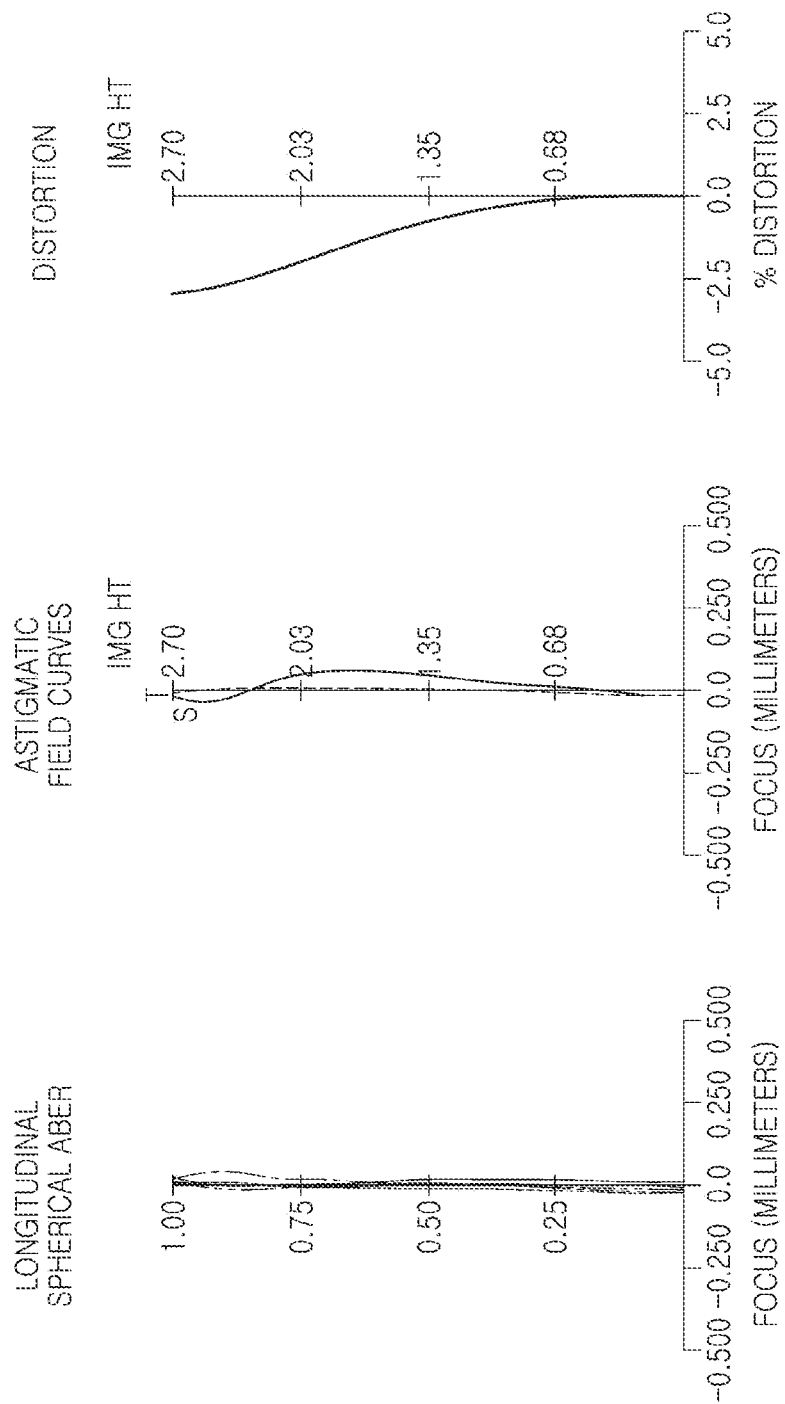
FIG. 7 presents graphs having curves representing aberration characteristics of the optical imaging system illustrated in FIG. 5.
Figure 8:
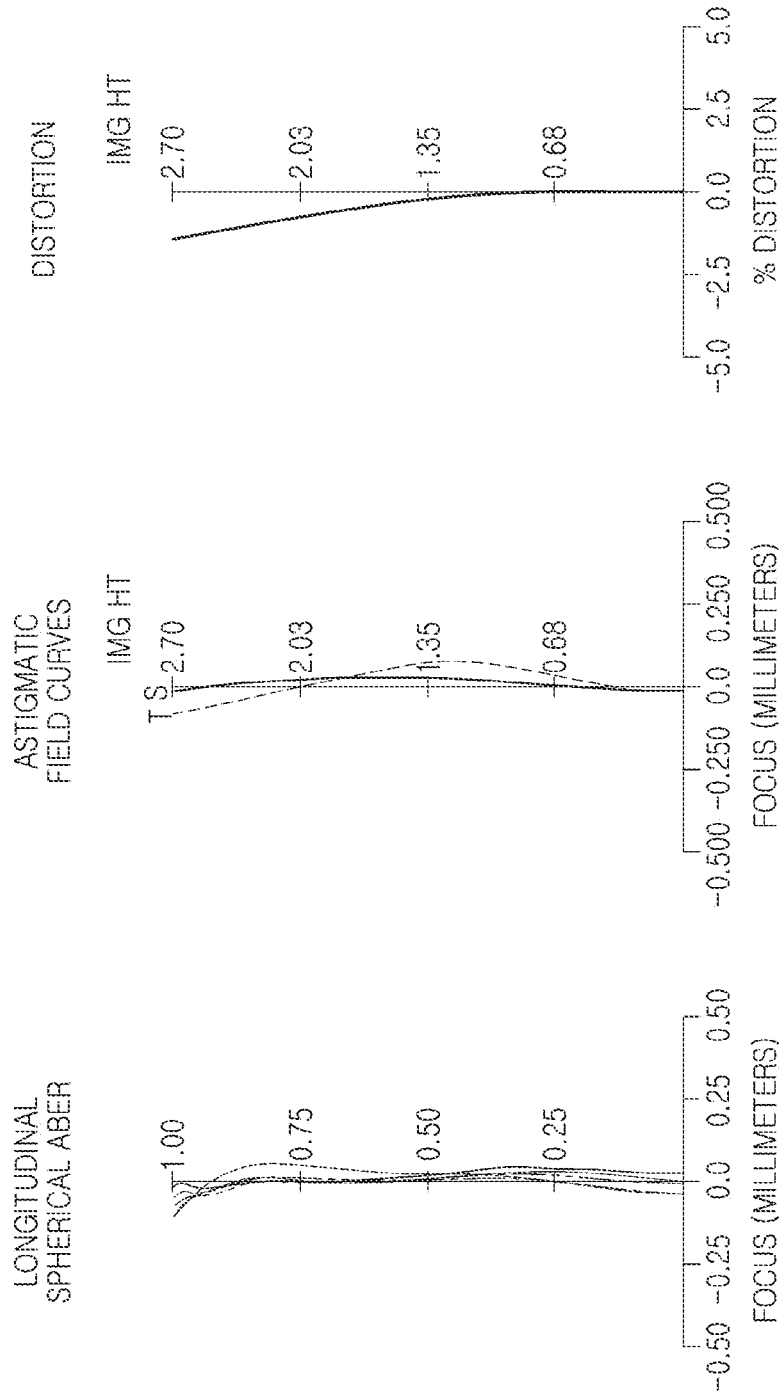
FIG. 8 presents graphs having curves representing aberration characteristics of the optical imaging system illustrated in FIG. 6.

In addition, the optical imaging system configured as described above may have aberration characteristics illustrated in FIGS. 7 and 8.

An optical imaging system according to a third example embodiment of the present disclosure is described with reference to FIGS. 9 through 12.

Figure 9:
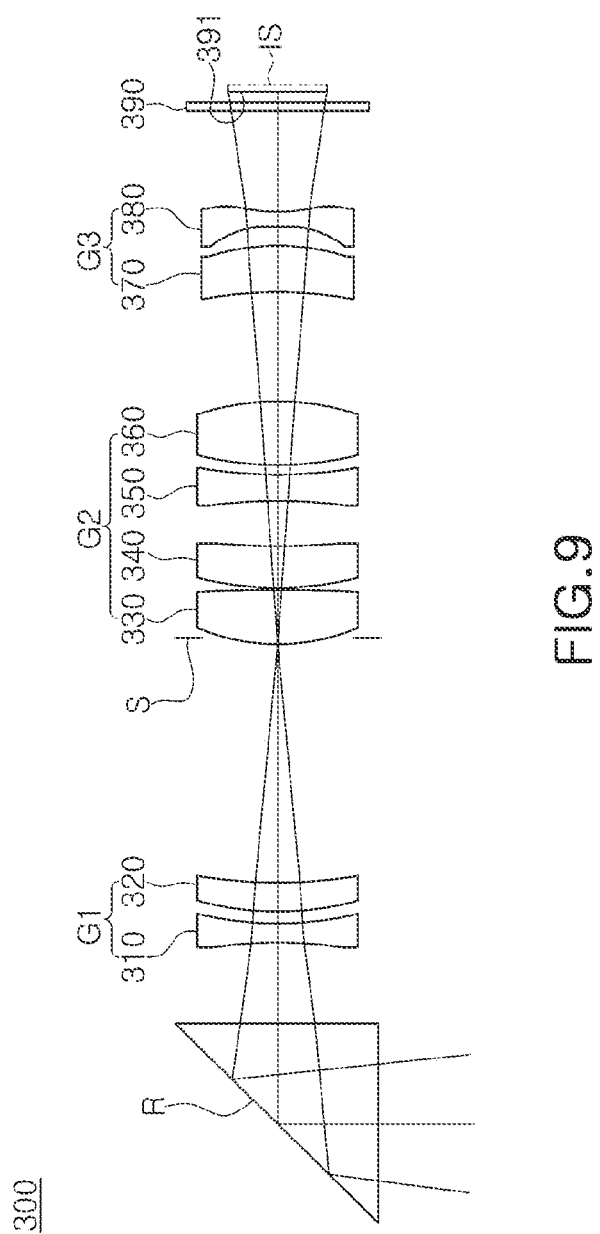
FIG. 9 is a view illustrating a configuration of the lens in the case that an optical imaging system according to a third example embodiment of the present disclosure has the first total focal length.
Figure 10:
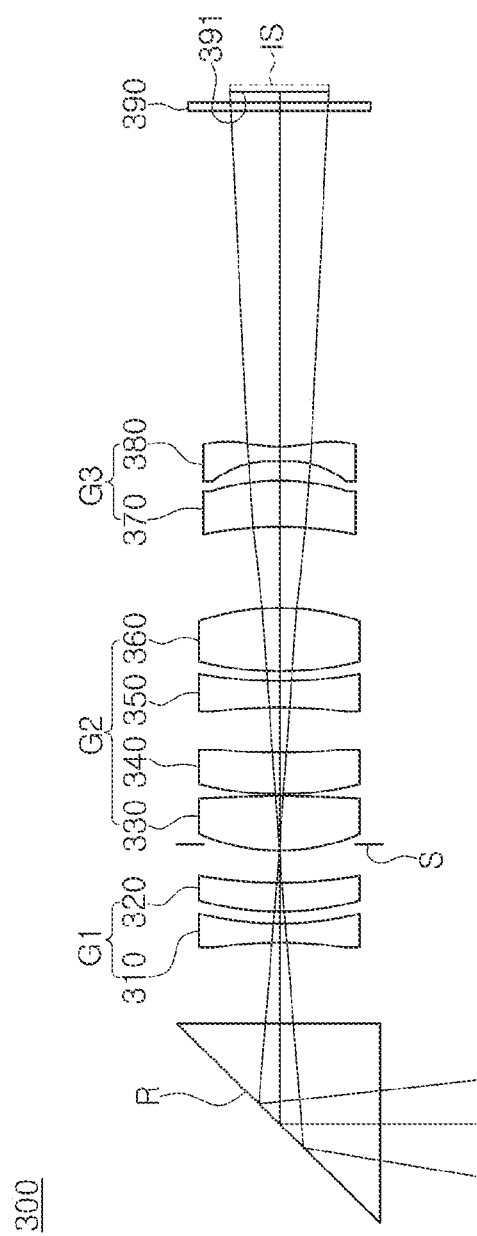
FIG. 10 is a view illustrating a configuration of the lens in the case that the optical imaging system according to the third example embodiment of the present disclosure has the second total focal length.

FIG. 9 is a view illustrating a configuration of the lens in the case that the optical imaging system according to the third example embodiment of the present disclosure has the first total focal length; and FIG. 10 is a view illustrating a configuration of the lens in the case that the optical imaging system according to the third example embodiment of the present disclosure has the second total focal length.

An optical imaging system 300 according to the third example embodiment of the present disclosure may include the first lens group G1, the second lens group G2, and the third lens group G3.

The first lens group G1 may include a first lens 310 and a second lens 320; the second lens group G2 may include a third lens 330, a fourth lens 340, a fifth lens 350, and a sixth lens 360; and the third lens group G3 may include a seventh lens 370 and an eighth lens 380.

In addition, the optical imaging system may further include a filter 390 and the image sensor IS.

The optical imaging system 300 according to the third example embodiment of the present disclosure may form the focus on an imaging plane 391. The imaging plane 391 may indicate the surface on which the focus is formed by the optical imaging system. For example, the imaging plane 391 may indicate one surface of the image sensor IS, on which light is received.

In addition, the aperture S may be disposed between the first lens group G1 and the second lens group G2. For example, the aperture S may be disposed between the second lens 320 and the third lens 330.

In addition, the optical imaging system further include the reflecting member R disposed in front of the first lens 310 and having the reflecting surface on which the optical path is changed. In the third example embodiment of the present disclosure, the reflecting member R may be the prism or the mirror.

Light incident on the reflecting member R may be bent by the reflecting member R, and may pass through the first lens group G1 to the third lens group G3. For example, light incident on the reflecting member R along the first optical axis may be bent toward the second optical axis (for example, the optical axis) perpendicular to the first optical axis.

At least one of the first lens group G1 to the third lens group G3 may be moved to change the total focal length of the optical imaging system. For example, the space between the first lens group G1 and the second lens group G2 may be changed as the first lens group G1 is fixed and the second lens group G2 is moved along the optical axis.

In addition, the space between the second lens group G2 and the third lens group G3 may be changed, and a space between the third lens group G3 and the imaging plane 391 may be changed, as the second lens group G2 and the third lens group G3 are respectively moved along the optical axis.

Here, 'space' may indicate the distance between two members in the optical axis direction.

Table 7 illustrates the characteristics (e.g., radius of curvature) of each lens, the thicknesses of the lens or the distance between the lenses, and the refractive index, Abbe number, effective diameter, and focal length of the lens.

TABLE 7

| Surface no. | Item | Radius of curvature | Thickness or distance | Refractive index | Abbe no. | Effective diameter | Focal length |
|---|---|---|---|---|---|---|---|
| S1 | Prism | Infinity | 3.200 | 1.717 | 29.5 | 5.800 | |
| S2 | | Infinity | −3.200 | 1.717 | 29.5 | 5.800 | |
| S3 | | Infinity | −2.500 | | | 5.800 | |
| S4 | First lens | −18.974 | 0.650 | 1.544 | 56 | 6.160 | −12.342 |
| S5 | | 10.592 | 0.355 | | | 6.238 | |
| S6 | Second lens | 9.827 | 0.927 | 1.846 | 23.7 | 6.433 | 32.727 |
| S7 | | 14.487 | D1 | | | 6.369 | |
| S8 | Third lens | 7.22441 | 1.671 | 1.497 | 81.6 | 6.840 | 13.069 |
| S9 | | −61.18345 | 0.100 | | | 6.669 | |
| S10 | Fourth lens | 10.08549 | 1.303 | 1.544 | 56 | 6.402 | 24.619 |
| S11 | | 38.43828 | 1.400 | | | 5.993 | |
| S12 | Fifth lens | −28.70075 | 0.850 | 1.846 | 23.7 | 5.367 | −10.698 |
| S13 | | 13.60989 | 0.300 | | | 5.135 | |
| S14 | Sixth lens | 13.10479 | 2.000 | 1.535 | 56 | 5.126 | 9.145 |
| S15 | | −7.43682 | D2 | | | 4.860 | |
| S16 | Seventh lens | −8.43034 | 1.474 | 1.66 | 20.4 | 3.900 | 20.597 |
| S17 | | −5.595 | 0.632 | | | 4.043 | |
| S18 | Eighth lens | −4.49042 | 0.600 | 1.535 | 56 | 3.977 | −7.978 |
| S19 | | 97.91140 | D3 | | | 4.282 | |
| S20 | Filter | Infinity | 0.210 | 1.516 | 64.1 | 5.544 | |
| S21 | | Infinity | 0.359 | | | 5.564 | |
| S22 | Imaging plane | Infinity | | | | 5.615 | |

TABLE 8

| | First position | Second position |
|---|---|---|
| D1 | 7.507 | 0.850 |
| D2 | 3.421 | 2.030 |
| D3 | 3.031 | 11.079 |

D1 may indicate a distance between the second lens 320 and the third lens 330 in the optical axis direction, D2 may indicate a distance between the sixth lens 360 and the seventh lens 370 in the optical axis direction, and D3 may indicate a distance between the eighth lens 380 and the filter 390 in the optical axis direction.

The space between the first lens group G1 and the second lens group G2 in the first position may be different from the space between the first lens group G1 and the second lens group G2 in the second position. For example, the first lens group G1 and the second lens group G2 may be positioned relatively distantly from each other in the first position, and the first lens group G1 and the second lens group G2 may be positioned relatively close to each other in the second position.

In addition, the space between the second lens group G2 and the third lens group G3 in the first position may be different from the space between the second lens group G2 and the third lens group G3 in the second position. For example, the second lens group G2 and the third lens group G3 may be positioned relatively distantly from each other in the first position, and the second lens group G2 and the third lens group G3 may be positioned relatively close to each other in the second position.

The space between the first lens group G1 and the second lens group G2 and the space between the second lens group G2 and the third lens group G3 may be changed, thus changing the total focal length of the optical imaging system, and adjusting the focus.

The first position may indicate the relative positions of the first lens group G1 to the third lens group G3 in the case that the optical imaging system has the first total focal length fL, and the second position may indicate the relative positions of the first lens group G1 to the third lens group G3 in the case that the optical imaging system has the second total focal length fH.

The first total focal length fL of the optical imaging system in the first position may be 11.5 mm, and Fno_L may be 2.5.

The second total focal length fH of the optical imaging system in the second position may be 22.7 mm, and Fno_H may be 4.3.

Fno_L may indicate the F-number of the optical imaging system in the first position, and Fno_H may indicate the F-number of the optical imaging system in the second position.

TTL of the optical imaging system may be 26.790 mm. TTL may indicate a distance from an object-side surface of the first lens 310 to the imaging plane 391 in the optical axis direction.

A diagonal length of the imaging plane 391 may be 5.615 mm.

In the third example embodiment of the present disclosure, the first lens group G1 may generally have negative refractive power. The focal length of the first lens group G1 may be −19.391 mm.

The second lens group G2 may generally have positive refractive power. The focal length of the second lens group G2 may be 8.609 mm.

The third lens group G3 may generally have negative refractive power. The focal length of the third lens group G3 may be −12.228 mm.

The first lens 310 may have negative refractive power, and a concave first surface and a concave second surface.

The second lens 320 may have positive refractive power, and a convex first surface and a concave second surface.

The third lens 330 may have positive refractive power, and a convex first surface and a convex second surface.

The fourth lens 340 may have positive refractive power, and a convex first surface and a concave second surface.

The fifth lens 350 may have negative refractive power, and a concave first surface and a concave second surface.

The sixth lens 360 may have positive refractive power, and a convex first surface and a convex second surface.

The seventh lens 370 may have positive refractive power, and a concave first surface and a convex second surface.

The eighth lens 380 may have negative refractive power, and a concave first surface and a concave second surface.

Meanwhile, each surface of the first lens 310, the fourth lens 340, the sixth lens 360, the seventh lens 370, and the eighth lens 380 may have the coefficient of the aspherical surface, as illustrated in Table 9. For example, the object-side surfaces and image-side surfaces of the first lens 310, the fourth lens 340, the sixth lens 360, the seventh lens 370, and the eighth lens 380 may be all the aspherical surfaces.

TABLE 9

|  | S4 | S5 | S10 | S11 | S14 | S15 |
|---|---|---|---|---|---|---|
| Conic constant K | 2.22866587 | −0.5087147 | 0 | −3.8054407 | −0.8152512 | −1.0879564 |
| $4^{th}$ coefficient A | −8.498E−05 | −5.573E−05 | −5.106E−04 | −6.210E−05 | 6.745E−05 | 8.146E−04 |
| $6^{th}$ coefficient B | 1.710E−05 | 1.913E−05 | −1.583E−05 | −7.806E−06 | 1.265E−05 | −1.585E−05 |
| $8^{th}$ coefficient C | −5.265E−07 | −5.499E−07 | −4.276E−07 | 0.000E+00 | 8.017E−06 | 8.962E−06 |
| $10^{th}$ coefficient D | 0.000E+00 | 0.000E+00 | 0.000E+00 | 0.000E+00 | 0.000E+00 | 0.000E+00 |
| $12^{th}$ coefficient E | 0.000E+00 | 0.000E+00 | 0.000E+00 | 0.000E+00 | 0.000E+00 | 0.000E+00 |
| $14^{th}$ coefficient F | 0.000E+00 | 0.000E+00 | 0.000E+00 | 0.000E+00 | 0.000E+00 | 0.000E+00 |
| $16^{th}$ coefficient G | 0.000E+00 | 0.000E+00 | 0.000E+00 | 0.000E+00 | 0.000E+00 | 0.000E+00 |
| $18^{th}$ coefficient H | 0.000E+00 | 0.000E+00 | 0.000E+00 | 0.000E+00 | 0.000E+00 | 0.000E+00 |
| $20^{th}$ coefficient J | 0.000E+00 | 0.000E+00 | 0.000E+00 | 0.000E+00 | 0.000E+00 | 0.000E+00 |

|  | S16 | S17 | S18 | S19 |
|---|---|---|---|---|
| Conic constant K | −17.549314 | −12.367464 | −17.981959 | −99 |
| $4^{th}$ coefficient A | 2.447E−03 | 3.116E−04 | −2.312E−02 | −5.614E−03 |
| $6^{th}$ coefficient B | −9.727E−05 | −4.456E−04 | 3.082E−03 | −1.939E−03 |
| $8^{th}$ coefficient C | 1.121E−05 | 2.897E−05 | −6.583E−04 | 1.212E−03 |
| $10^{th}$ coefficient D | 1.029E−07 | 4.167E−06 | 1.353E−04 | −3.020E−04 |
| $12^{th}$ coefficient E | 0.000E+00 | 0.000E+00 | −9.543E−06 | 4.149E−05 |
| $14^{th}$ coefficient F | 0.000E+00 | 0.000E+00 | 0.000E+00 | −2.361E−06 |
| $16^{th}$ coefficient G | 0.000E+00 | 0.000E+00 | 0.000E+00 | 0.000E+00 |
| $18^{th}$ coefficient H | 0.000E+00 | 0.000E+00 | 0.000E+00 | 0.000E+00 |
| $20^{th}$ coefficient J | 0.000E+00 | 0.000E+00 | 0.000E+00 | 0.000E+00 |

Figure 11:
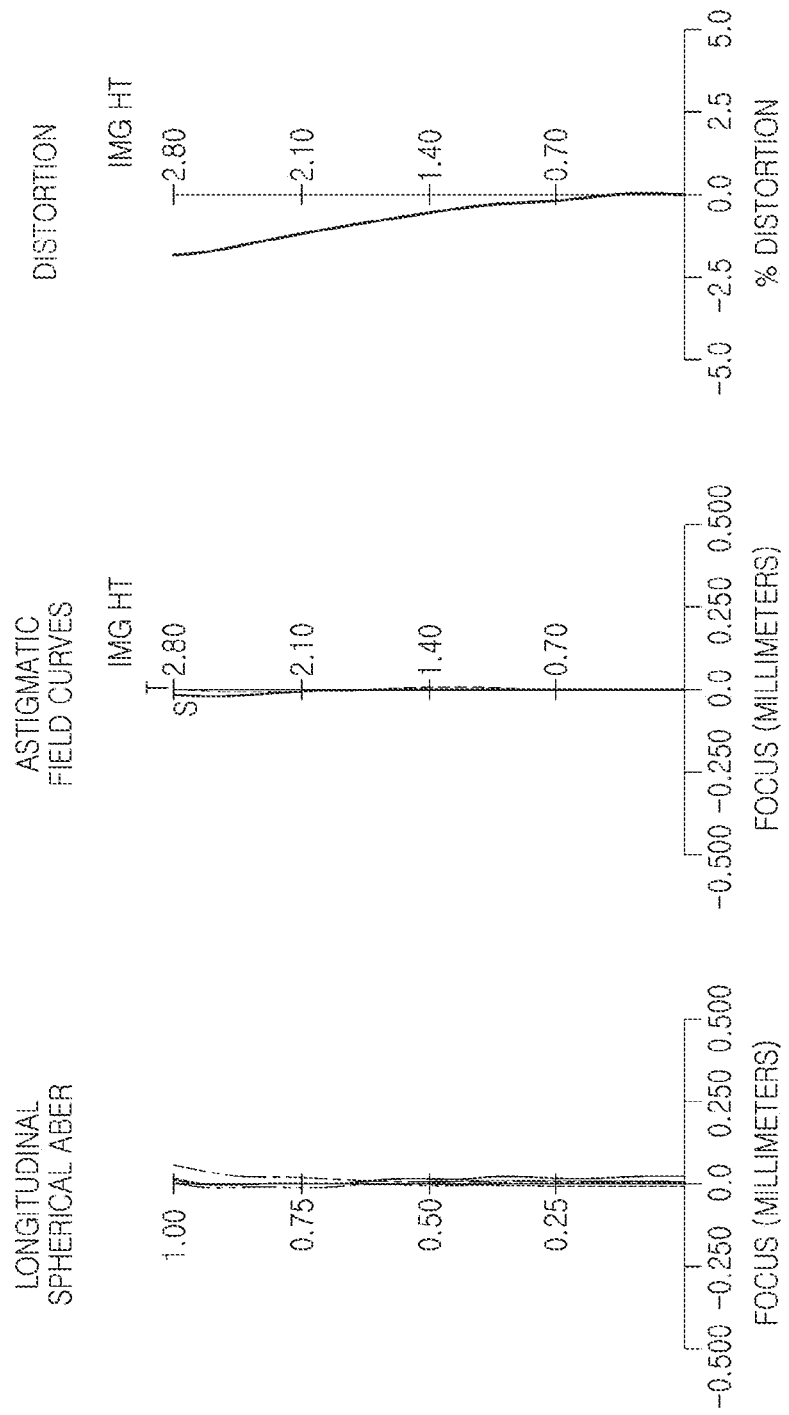
FIG. 11 presents graphs having curves representing aberration characteristics of the optical imaging system illustrated in FIG. 9.
Figure 12:
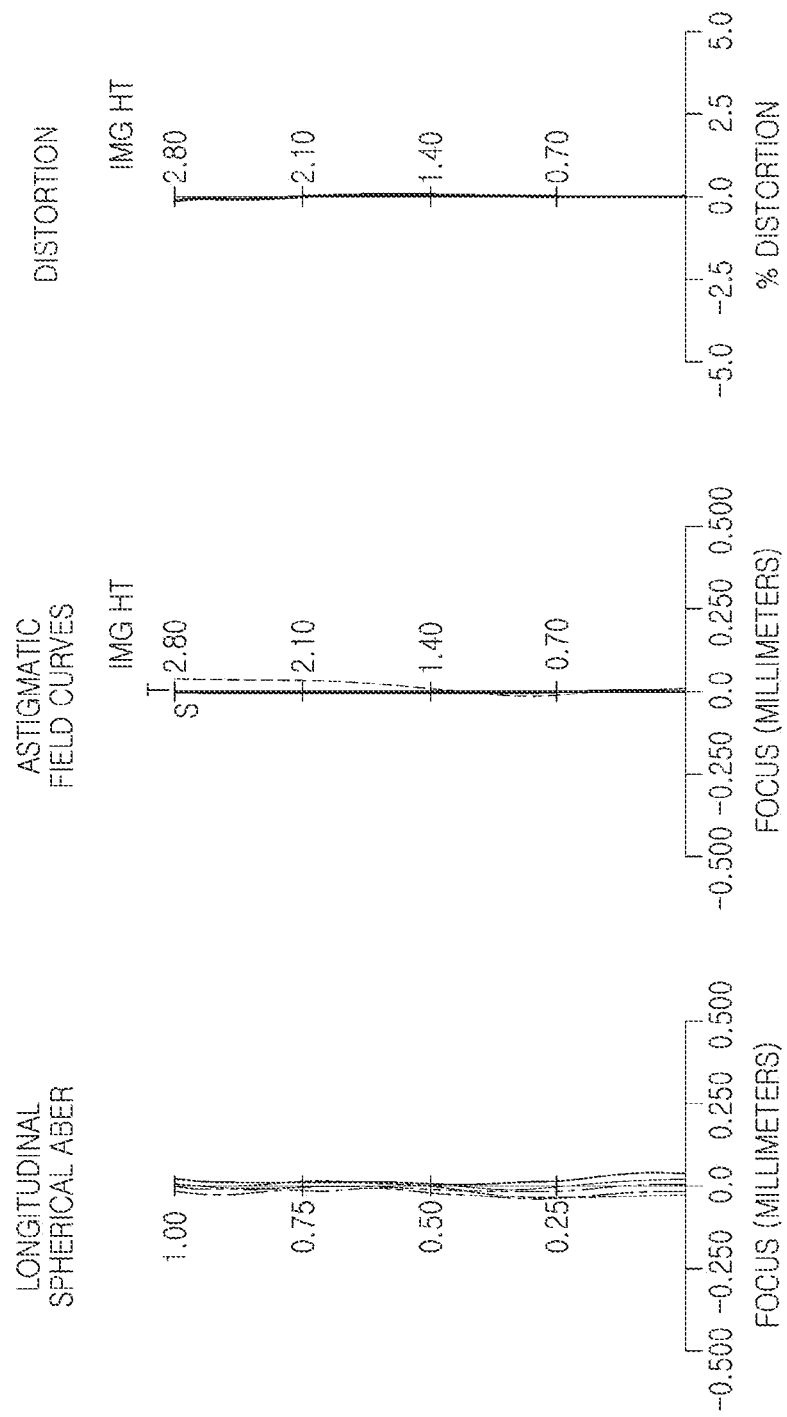
FIG. 12 presents graphs having curves representing aberration characteristics of the optical imaging system illustrated in FIG. 10.

In addition, the optical imaging system configured as described above may have aberration characteristics illustrated in FIGS. 11 and 12.

An optical imaging system according to a fourth example embodiment of the present disclosure is described with reference to FIGS. 13 through 16.

Figure 13:
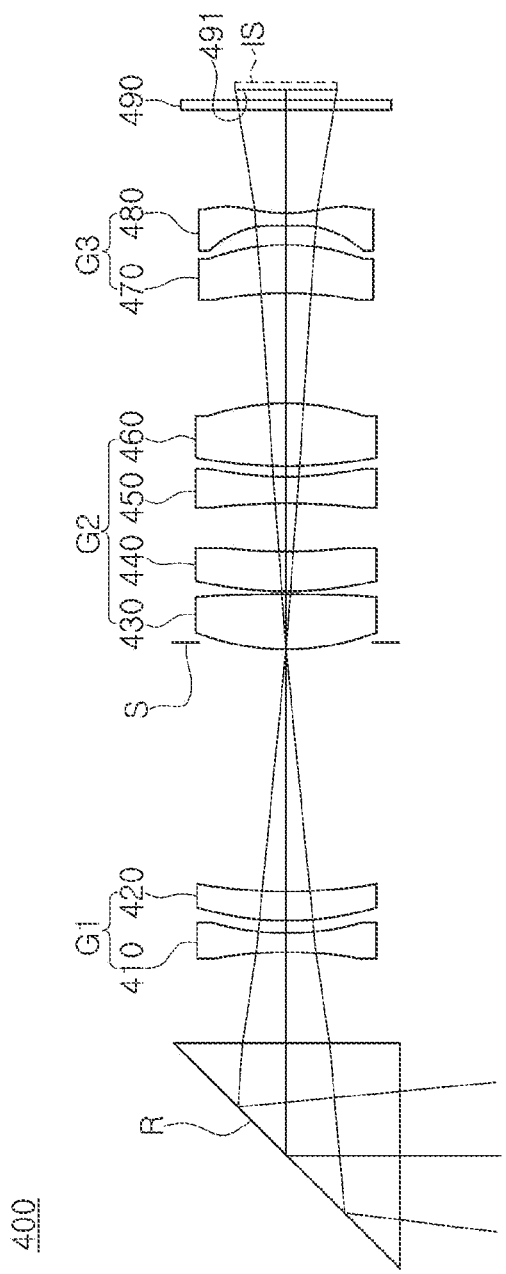
FIG. 13 is a view illustrating a configuration of the lens in the case that an optical imaging system according to a fourth example embodiment of the present disclosure has the first total focal length.
Figure 14:
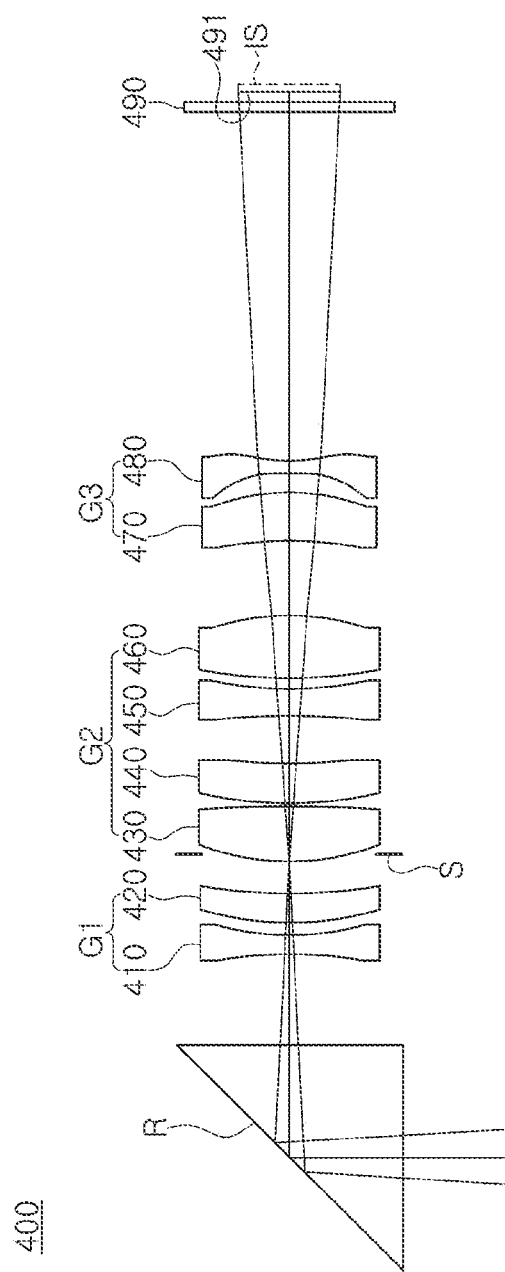
FIG. 14 is a view illustrating a configuration of the lens in the case that the optical imaging system according to the fourth example embodiment of the present disclosure has the second total focal length.

FIG. 13 is a view illustrating a configuration of the lens in the case that the optical imaging system according to the fourth example embodiment of the present disclosure has the first total focal length; and FIG. 14 is a view illustrating a configuration of the lens in the case that the optical imaging system according to the fourth example embodiment of the present disclosure has the second total focal length.

An optical imaging system 400 according to the fourth example embodiment of the present disclosure may include the first lens group G1, the second lens group G2, and the third lens group G3.

The first lens group G1 may include a first lens 410 and a second lens 420; the second lens group G2 may include a third lens 430, a fourth lens 440, a fifth lens 450, and a sixth lens 460; and the third lens group G3 may include a seventh lens 470 and an eighth lens 480.

In addition, the optical imaging system may further include a filter 490 and the image sensor IS.

The optical imaging system 400 according to the fourth example embodiment of the present disclosure may form the focus on an imaging plane 491. The imaging plane 491 may indicate the surface on which the focus is formed by the optical imaging system. For example, the imaging plane 491 may indicate one surface of the image sensor IS, on which light is received.

In addition, the aperture S may be disposed between the first lens group G1 and the second lens group G2. For example, the aperture S may be disposed between the second lens 420 and the third lens 430.

In addition, the optical imaging system further include the reflecting member R disposed in front of the first lens 410 and having the reflecting surface on which the optical path is changed. In the fourth example embodiment of the present disclosure, the reflecting member R may be the prism or the mirror.

Light incident on the reflecting member R may be bent by the reflecting member R, and may pass through the first lens group G1 to the third lens group G3. For example, light incident on the reflecting member R along the first optical axis may be bent toward the second optical axis (for example, the optical axis) perpendicular to the first optical axis.

At least one of the first lens group G1 to the third lens group G3 may be moved to change the total focal length of the optical imaging system. For example, the space between the first lens group G1 and the second lens group G2 may be changed as the first lens group G1 is fixed and the second lens group G2 is moved along the optical axis.

In addition, the space between the second lens group G2 and the third lens group G3 may be changed, and a space between the third lens group G3 and the imaging plane 491 may be changed, as the second lens group G2 and the third lens group G3 are respectively moved along the optical axis.

Here, 'space' may indicate the distance between two members in the optical axis direction.

Table 10 illustrates the characteristics (e.g., radius of curvature) of each lens, the thicknesses of the lens or the distance between the lenses, and the refractive index, Abbe number, effective diameter, and focal length of the lens.

TABLE 10

| Surface no. | Item | Radius of curvature | Thickness or distance | Refractive index | Abbe no. | Effective diameter | Focal length |
|---|---|---|---|---|---|---|---|
| S1 | Prism | Infinity | 3.200 | 1.717 | 29.5 | 5.800 | |
| S2 | | Infinity | −3.200 | 1.717 | 29.5 | 5.800 | |
| S3 | | Infinity | −2.500 | | | 5.800 | |
| S4 | First lens | −17.114 | 0.586 | 1.544 | 56 | 5.556 | −11.132 |
| S5 | | 9.554 | 0.320 | | | 5.627 | |
| S6 | Second lens | 8.864 | 0.836 | 1.846 | 23.7 | 5.804 | 29.520 |
| S7 | | 13.068 | D1 | | | 5.746 | |
| S8 | Third lens | 6.51642 | 1.507 | 1.497 | 81.6 | 6.170 | 11.789 |
| S9 | | −55.18747 | 0.090 | | | 6.029 | |
| S10 | Fourth lens | 9.09712 | 1.175 | 1.544 | 56 | 5.805 | 22.207 |
| S11 | | 34.67132 | 1.263 | | | 5.452 | |
| S12 | Fifth lens | −25.88808 | 0.767 | 1.846 | 23.7 | 4.859 | −9.650 |
| S13 | | 12.27612 | 0.271 | | | 4.643 | |
| S14 | Sixth lens | 11.82052 | 1.804 | 1.535 | 56 | 4.632 | 8.248 |
| S15 | | −6.70801 | D2 | | | 4.384 | |
| S16 | Seventh lens | −7.60417 | 1.330 | 1.66 | 20.4 | 3.518 | 18.579 |
| S17 | | −5.046 | 0.570 | | | 3.635 | |
| S18 | Eighth lens | −4.05036 | 0.541 | 1.535 | 56 | 3.569 | −7.196 |
| S19 | | 88.31608 | D3 | | | 3.833 | |
| S20 | Filter | Infinity | 0.189 | 1.516 | 64.1 | 4.910 | |
| S21 | | Infinity | 0.324 | | | 4.928 | |
| S22 | Imaging plane | Infinity | | | | 4.972 | |

TABLE 11

| | First position | Second position |
|---|---|---|
| D1 | 6.771 | 0.767 |
| D2 | 3.086 | 1.831 |
| D3 | 2.734 | 9.993 |

D1 may indicate a distance between the second lens 420 and the third lens 430 in the optical axis direction, D2 may indicate a distance between the sixth lens 460 and the seventh lens 470 in the optical axis direction, and D3 may indicate a distance between the eighth lens 480 and the filter 490 in the optical axis direction.

The space between the first lens group G1 and the second lens group G2 in the first position may be different from the space between the first lens group G1 and the second lens group G2 in the second position. For example, the first lens group G1 and the second lens group G2 may be positioned relatively distantly from each other in the first position, and the first lens group G1 and the second lens group G2 may be positioned relatively close to each other in the second position.

In addition, the space between the second lens group G2 and the third lens group G3 in the first position may be different from the space between the second lens group G2 and the third lens group G3 in the second position. For example, the second lens group G2 and the third lens group G3 may be positioned relatively distantly from each other in the first position, and the second lens group G2 and the third lens group G3 may be positioned relatively close to each other in the second position.

The space between the first lens group G1 and the second lens group G2 and the space between the second lens group G2 and the third lens group G3 may be changed, thus changing the total focal length of the optical imaging system, and adjusting the focus.

The first position may indicate the relative positions of the first lens group G1 to the third lens group G3 in the case that the optical imaging system has the first total focal length fL, and the second position may indicate the relative positions of the first lens group G1 to the third lens group G3 in the case that the optical imaging system has the second total focal length fH.

The first total focal length fL of the optical imaging system in the first position may be 9.5 mm, and Fno_L may be 2.5.

The second total focal length fH of the optical imaging system in the second position may be 20.47 mm, and Fno_H may be 4.3.

Fno_L may indicate the F-number of the optical imaging system in the first position, and Fno_H may indicate the F-number of the optical imaging system in the second position.

TTL of the optical imaging system may be 24.164 mm. TTL may indicate a distance from an object-side surface of the first lens 410 to the imaging plane 491 in the optical axis direction.

A diagonal length of the imaging plane 491 may be 4.972 mm.

In the fourth example embodiment of the present disclosure, the first lens group G1 may generally have negative refractive power. The focal length of the first lens group G1 may be −17.491 mm.

The second lens group G2 may generally have positive refractive power. The focal length of the second lens group G2 may be 7.766 mm.

The third lens group G3 may generally have negative refractive power. The focal length of the third lens group G3 may be −11.03 mm.

The first lens 410 may have negative refractive power, and a concave first surface and a concave second surface.

The second lens 420 may have positive refractive power, and a convex first surface and a concave second surface.

The third lens 430 may have positive refractive power, and a convex first surface and a convex second surface.

The fourth lens 440 may have positive refractive power, and a convex first surface and a concave second surface.

The fifth lens 450 may have negative refractive power, and a concave first surface and a concave second surface.

The sixth lens 460 may have positive refractive power, and a convex first surface and a convex second surface.

The seventh lens 470 may have positive refractive power, and a concave first surface and a convex second surface.

The eighth lens 480 may have negative refractive power, and a concave first surface and a concave second surface.

Meanwhile, each surface of the first lens 410, the fourth lens 440, the sixth lens 460, the seventh lens 470, and the eighth lens 480 may have the coefficient of the aspherical surface, as illustrated in Table 12. For example, the object-side surfaces and image-side surfaces of the first lens 410, the fourth lens 440, the sixth lens 460, the seventh lens 470, and the eighth lens 480 may be all the aspherical surfaces.

TABLE 12

| | S4 | S5 | S10 | S11 | S14 | S15 |
|---|---|---|---|---|---|---|
| Conic constant K | 2.2286659 | −0.508715 | 0 | −3.805441 | −0.815251 | −1.087956 |
| $4^{th}$ coefficient A | −1.158E−04 | −7.593E−05 | −6.958E−04 | −8.462E−05 | 9.191E−05 | −1.088E+00 |
| $6^{th}$ coefficient B | 2.864E−05 | 3.204E−05 | −2.651E−05 | −1.307E−05 | 2.118E−05 | 1.110E−03 |
| $8^{th}$ coefficient C | −1.084E−06 | −1.132E−06 | −8.802E−07 | 0.000E+00 | 1.650E−05 | −2.655E−05 |
| $10^{th}$ coefficient D | 0.000E+00 | 0.000E+00 | 0.000E+00 | 0.000E+00 | 0.000E+00 | 1.845E−05 |
| $12^{th}$ coefficient E | 0.000E+00 | 0.000E+00 | 0.000E+00 | 0.000E+00 | 0.000E+00 | 0.000E+00 |
| $14^{th}$ coefficient F | 0.000E+00 | 0.000E+00 | 0.000E+00 | 0.000E+00 | 0.000E+00 | 0.000E+00 |
| $16^{th}$ coefficient G | 0.000E+00 | 0.000E+00 | 0.000E+00 | 0.000E+00 | 0.000E+00 | 0.000E+00 |
| $18^{th}$ coefficient H | 0.000E+00 | 0.000E+00 | 0.000E+00 | 0.000E+00 | 0.000E+00 | 0.000E+00 |
| $20^{th}$ coefficient J | 0.000E+00 | 0.000E+00 | 0.000E+00 | 0.000E+00 | 0.000E+00 | 0.000E+00 |

| | S16 | S17 | S18 | S19 |
|---|---|---|---|---|
| Conic constant K | −17.54931 | −12.36746 | −17.98196 | −99 |
| $4^{th}$ coefficient A | 3.334E−03 | 4.246E−04 | −3.151E−02 | −7.650E−03 |
| $6^{th}$ coefficient B | −1.629E−04 | −7.463E−04 | 5.161E−03 | −3.247E−03 |
| $8^{th}$ coefficient C | 2.307E−05 | 5.964E−05 | −1.355E−03 | 2.495E−03 |
| $10^{th}$ coefficient D | 2.604E−07 | 1.054E−05 | 3.424E−04 | −7.641E−04 |
| $12^{th}$ coefficient E | 0.000E+00 | 0.000E+00 | −2.968E−05 | 1.290E−04 |
| $14^{th}$ coefficient F | 0.000E+00 | 0.000E+00 | 0.000E+00 | −9.025E−06 |
| $16^{th}$ coefficient G | 0.000E+00 | 0.000E+00 | 0.000E+00 | 0.000E+00 |
| $18^{th}$ coefficient H | 0.000E+00 | 0.000E+00 | 0.000E+00 | 0.000E+00 |
| $20^{th}$ coefficient J | 0.000E+00 | 0.000E+00 | 0.000E+00 | 0.000E+00 |

Figure 15:
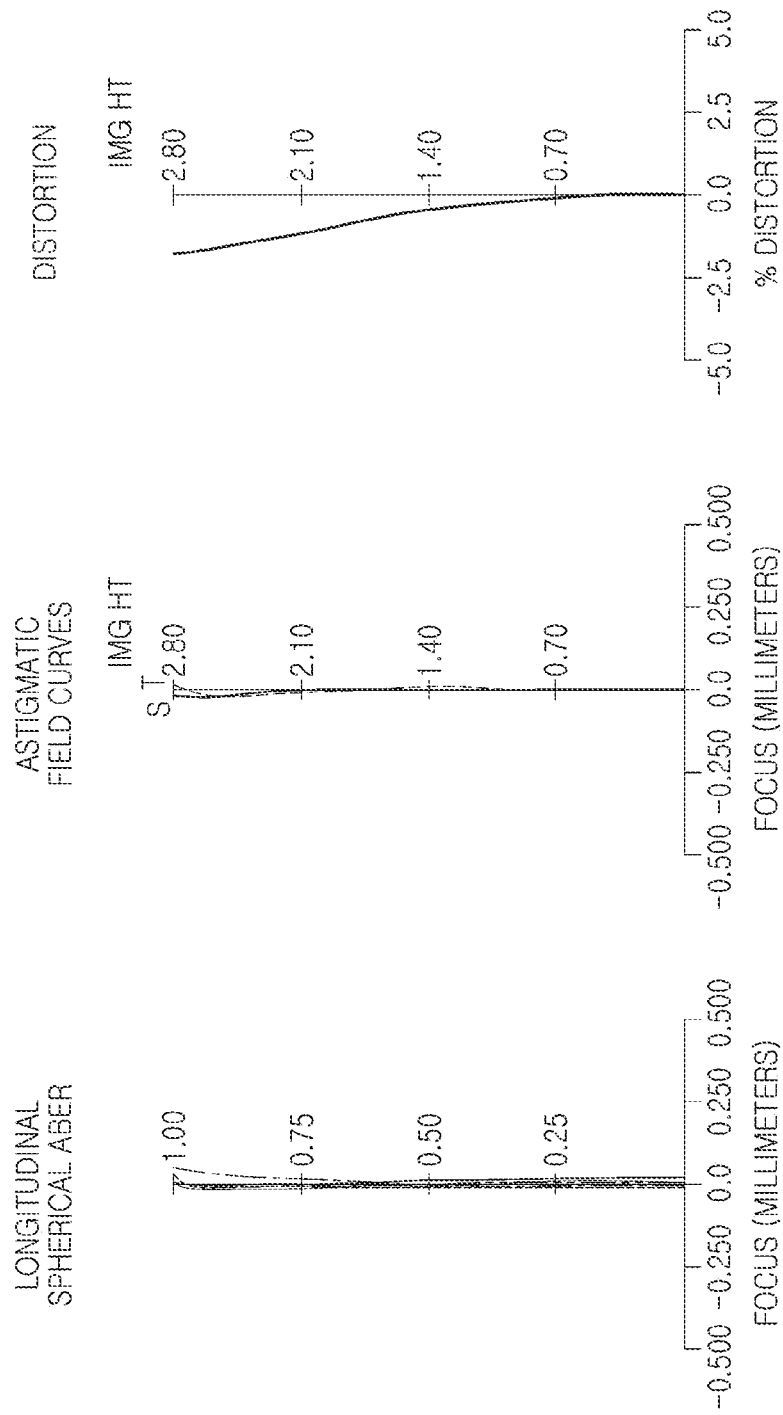
FIG. 15 presents graphs having curves representing aberration characteristics of the optical imaging system illustrated in FIG. 13.
Figure 16:
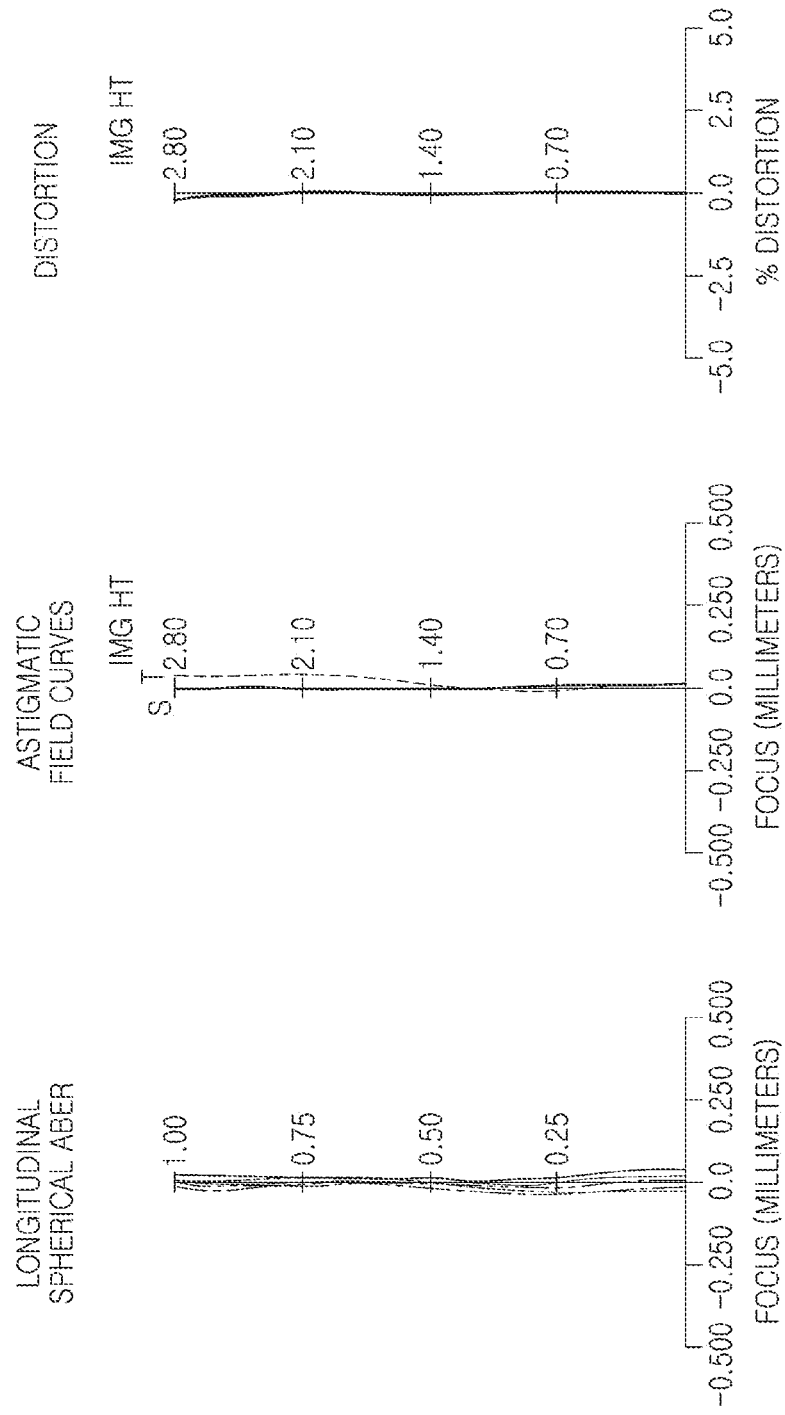
FIG. 16 presents graphs having curves representing aberration characteristics of the optical imaging system illustrated in FIG. 14.

In addition, the optical imaging system configured as described above may have aberration characteristics illustrated in FIGS. 15 and 16.

An optical imaging system according to a fifth example embodiment of the present disclosure is described with reference to FIGS. 17 through 20.

Figure 17:
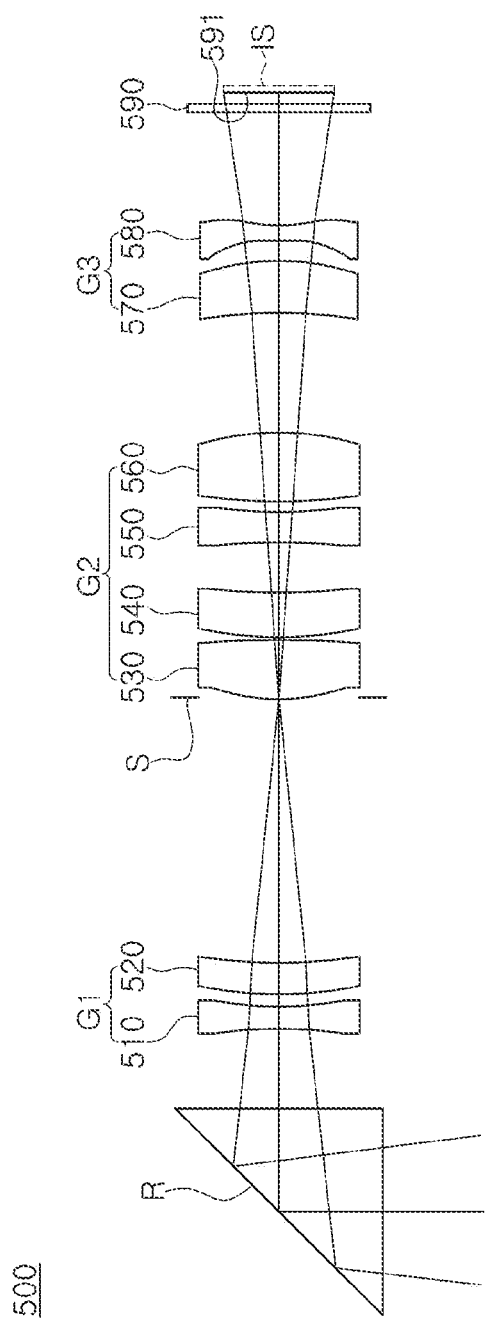
FIG. 17 is a view illustrating a configuration of the lens in the case that an optical imaging system according to a fifth example embodiment of the present disclosure has the first total focal length.
Figure 18:
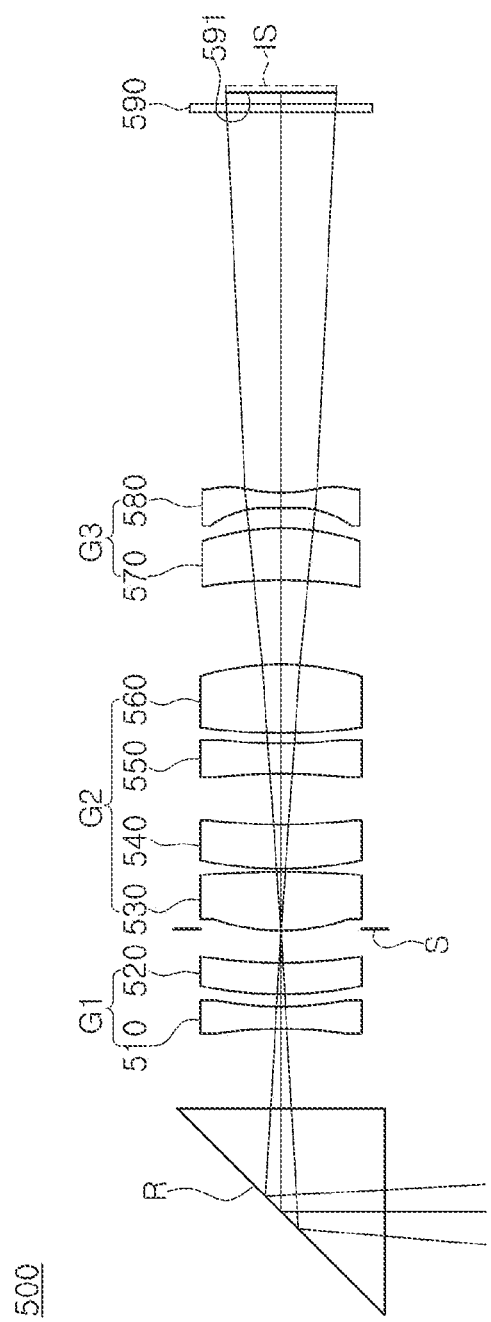
FIG. 18 is a view illustrating a configuration of the lens in the case that the optical imaging system according to the fifth example embodiment of the present disclosure has the second total focal length.

FIG. 17 is a view illustrating a configuration of the lens in the case that the optical imaging system according to the fifth example embodiment of the present disclosure has the first total focal length; and FIG. 18 is a view illustrating a configuration of the lens in the case that the optical imaging system according to the fifth example embodiment of the present disclosure has the second total focal length.

An optical imaging system 500 according to the fifth example embodiment of the present disclosure may include the first lens group G1, the second lens group G2, and the third lens group G3.

The first lens group G1 may include a first lens 510 and a second lens 520; the second lens group G2 may include a third lens 530, a fourth lens 540, a fifth lens 550, and a sixth lens 560; and the third lens group G3 may include a seventh lens 570 and an eighth lens 580.

In addition, the optical imaging system may further include a filter 590 and the image sensor IS.

The optical imaging system 500 according to the fifth example embodiment of the present disclosure may form the focus on an imaging plane 591. The imaging plane 591 may indicate the surface on which the focus is formed by the optical imaging system. For example, the imaging plane 591 may indicate one surface of the image sensor IS, on which light is received.

In addition, the aperture S may be disposed between the first lens group G1 and the second lens group G2. For example, the aperture S may be disposed between the second lens 520 and the third lens 530.

In addition, the optical imaging system may further include the reflecting member R disposed in front of the first lens 510 and having the reflecting surface on which the optical path is changed. In the fifth example embodiment of the present disclosure, the reflecting member R may be the prism, and may also be the mirror.

Light incident on the reflecting member R may be bent by the reflecting member R, and may pass through the first lens group G1 to the third lens group G3. For example, light incident on the reflecting member R along the first optical axis may be bent toward the second optical axis (for example, the optical axis) perpendicular to the first optical axis.

At least one of the first lens group G1 to the third lens group G3 may be moved to change the total focal length of the optical imaging system. For example, the space between the first lens group G1 and the second lens group G2 may be changed as the first lens group G1 is fixed and the second lens group G2 is moved along the optical axis.

In addition, the space between the second lens group G2 and the third lens group G3 may be changed, and a space between the third lens group G3 and the imaging plane 591 may be changed, as the second lens group G2 and the third lens group G3 are respectively moved along the optical axis.

Here, 'space' may indicate the distance between two members in the optical axis direction.

Table 13 illustrates the characteristics (e.g., radius of curvature) of each lens, the thicknesses of the lens or the distance between the lenses, and the refractive index, Abbe number, effective diameter, and focal length of the lens.

TABLE 13

| Surface no. | Item | Radius of curvature | Thickness or distance | Refractive index | Abbe no. | Effective diameter | Focal length |
|---|---|---|---|---|---|---|---|
| S1 | Prism | Infinity | 3.200 | 1.717 | 29.5 | 5.800 | |
| S2 | | Infinity | −3.200 | 1.717 | 29.5 | 5.800 | |
| S3 | | Infinity | −2.500 | | | 5.800 | |
| S4 | First lens | −20.833 | 0.714 | 1.544 | 56 | 6.764 | −13.552 |
| S5 | | 11.630 | 0.390 | | | 6.849 | |
| S6 | Second lens | 10.790 | 1.018 | 1.846 | 23.7 | 7.064 | 35.934 |
| S7 | | 15.907 | D1 | | | 6.993 | |
| S8 | Third lens | 7.93241 | 1.835 | 1.497 | 81.6 | 7.510 | 14.350 |
| S9 | | −67.17943 | 0.110 | | | 7.322 | |
| S10 | Fourth lens | 11.07387 | 1.431 | 1.544 | 56 | 7.030 | 27.032 |
| S11 | | 42.20523 | 1.537 | | | 6.581 | |
| S12 | Fifth lens | −31.51342 | 0.933 | 1.846 | 23.7 | 5.893 | −11.746 |
| S13 | | 14.94366 | 0.329 | | | 5.638 | |
| S14 | Sixth lens | 14.38906 | 2.196 | 1.535 | 56 | 5.628 | 10.041 |
| S15 | | −8.16563 | D2 | | | 5.336 | |
| S16 | Seventh lens | −9.25651 | 1.619 | 1.66 | 20.4 | 4.282 | 22.616 |
| S17 | | −6.143 | 0.694 | | | 4.420 | |
| S18 | Eighth lens | −4.93048 | 0.659 | 1.535 | 56 | 4.337 | −8.759 |
| S19 | | 107.50672 | D3 | | | 4.653 | |
| S20 | Filter | Infinity | 0.231 | 1.516 | 64.1 | 5.940 | |
| S21 | | Infinity | 0.394 | | | 5.961 | |
| S22 | Imaging plane | Infinity | | | | 6.013 | |

TABLE 14

| | First position | Second position |
|---|---|---|
| D1 | 8.243 | 0.933 |
| D2 | 3.756 | 2.229 |
| D3 | 3.328 | 12.165 |

D1 may indicate a distance between the second lens 520 and the third lens 530 in the optical axis direction, D2 may indicate a distance between the sixth lens 560 and the seventh lens 570 in the optical axis direction, and D3 may indicate a distance between the eighth lens 580 and the filter 590 in the optical axis direction.

The space between the first lens group G1 and the second lens group G2 in the first position may be different from the space between the first lens group G1 and the second lens group G2 in the second position. For example, the first lens group G1 and the second lens group G2 may be positioned relatively distantly from each other in the first position, and the first lens group G1 and the second lens group G2 may be positioned relatively close to each other in the second position.

In addition, the space between the second lens group G2 and the third lens group G3 in the first position may be different from the space between the second lens group G2 and the third lens group G3 in the second position. For example, the second lens group G2 and the third lens group G3 may be positioned relatively distantly from each other in the first position, and the second lens group G2 and the third lens group G3 may be positioned relatively close to each other in the second position.

The space between the first lens group G1 and the second lens group G2 and the space between the second lens group G2 and the third lens group G3 may be changed, thus changing the total focal length of the optical imaging system, and adjusting the focus.

The first position may indicate the relative positions of the first lens group G1 to the third lens group G3 in the case that the optical imaging system has the first total focal length fL, and the second position may indicate the relative positions of the first lens group G1 to the third lens group G3 in the case that the optical imaging system has the second total focal length fH.

The first total focal length fL of the optical imaging system in the first position may be 11.58 mm, and Fno_L may be 2.5.

The second total focal length fH of the optical imaging system in the second position may be 24.92 mm, and Fno_H may be 4.3.

Fno_L may indicate the F-number of the optical imaging system in the first position, and Fno_H may indicate the F-number of the optical imaging system in the second position.

TTL of the optical imaging system may be 29.415 mm. TTL may indicate a distance from an object-side surface of the first lens 510 to the imaging plane 591 in the optical axis direction.

A diagonal length of the imaging plane 591 may be 6.013 mm.

In the fifth example embodiment of the present disclosure, the first lens group G1 may generally have negative refractive power. The focal length of the first lens group G1 may be −21.292 mm.

The second lens group G2 may generally have positive refractive power. The focal length of the second lens group G2 may be 9.453 mm.

The eighth lens 580 may have negative refractive power, and a concave first surface and a concave second surface.

Meanwhile, each surface of the first lens 510, the fourth lens 540, the sixth lens 560, the seventh lens 570, and the eighth lens 580 may have the coefficient of the aspherical surface, as illustrated in Table 15. For example, the object-side surfaces and image-side surfaces of the first lens 510, the fourth lens 540, the sixth lens 560, the seventh lens 570, and the eighth lens 580 may be all the aspherical surfaces.

TABLE 15

|  | S4 | S5 | S10 | S11 | S14 | S15 |
| --- | --- | --- | --- | --- | --- | --- |
| Conic constant K | 2.2286659 | −0.508715 | 0 | −3.805441 | −0.815251 | −1.087956 |
| $4^{th}$ coefficient A | −6.420E−05 | −4.210E−05 | −3.857E−04 | −4.691E−05 | 5.095E−05 | 6.154E−04 |
| $6^{th}$ coefficient B | 1.071E−05 | 1.199E−05 | −9.916E−06 | −4.891E−06 | 7.924E−06 | −9.935E−06 |
| $8^{th}$ coefficient C | −2.736E−07 | −2.858E−07 | −2.222E−07 | 0.000E+00 | 4.166E−06 | 4.658E−06 |
| $10^{th}$ coefficient D | 0.000E+00 | 0.000E+00 | 0.000E+00 | 0.000E+00 | 0.000E+00 | 0.000E+00 |
| $12^{th}$ coefficient E | 0.000E+00 | 0.000E+00 | 0.000E+00 | 0.000E+00 | 0.000E+00 | 0.000E+00 |
| $14^{th}$ coefficient F | 0.000E+00 | 0.000E+00 | 0.000E+00 | 0.000E+00 | 0.000E+00 | 0.000E+00 |
| $16^{th}$ coefficient G | 0.000E+00 | 0.000E+00 | 0.000E+00 | 0.000E+00 | 0.000E+00 | 0.000E+00 |
| $18^{th}$ coefficient H | 0.000E+00 | 0.000E+00 | 0.000E+00 | 0.000E+00 | 0.000E+00 | 0.000E+00 |
| $20^{th}$ coefficient J | 0.000E+00 | 0.000E+00 | 0.000E+00 | 0.000E+00 | 0.000E+00 | 0.000E+00 |

|  | S16 | S17 | S18 | S19 |
| --- | --- | --- | --- | --- |
| Conic constant K | −17.54931 | −12.36746 | −17.98196 | −99 |
| $4^{th}$ coefficient A | 1.848E−03 | 2.354E−04 | −1.747E−02 | −4.241E−03 |
| $6^{th}$ coefficient B | −6.095E−05 | −2.792E−04 | 1.931E−03 | −1.215E−03 |
| $8^{th}$ coefficient C | 5.826E−06 | 1.506E−05 | −3.422E−04 | 6.300E−04 |
| $10^{th}$ coefficient D | 4.436E−08 | 1.796E−06 | 5.833E−05 | −1.302E−04 |
| $12^{th}$ coefficient E | 0.000E+00 | 0.000E+00 | −3.412E−06 | 1.483E−05 |
| $14^{th}$ coefficient F | 0.000E+00 | 0.000E+00 | 0.000E+00 | −7.003E−07 |
| $16^{th}$ coefficient G | 0.000E+00 | 0.000E+00 | 0.000E+00 | 0.000E+00 |
| $18^{th}$ coefficient H | 0.000E+00 | 0.000E+00 | 0.000E+00 | 0.000E+00 |
| $20^{th}$ coefficient J | 0.000E+00 | 0.000E+00 | 0.000E+00 | 0.000E+00 |

The third lens group G3 may generally have negative refractive power. The focal length of the third lens group G3 may be −13.426 mm.

The first lens 510 may have negative refractive power, and a concave first surface and a concave second surface.

The second lens 520 may have positive refractive power, and a convex first surface and a concave second surface.

The third lens 530 may have positive refractive power, and a convex first surface and a convex second surface.

The fourth lens 540 may have positive refractive power, and a convex first surface and a concave second surface.

The fifth lens 550 may have negative refractive power, and a concave first surface and a concave second surface.

The sixth lens 560 may have positive refractive power, and a convex first surface and a convex second surface.

The seventh lens 570 may have positive refractive power, and a concave first surface and a convex second surface.

Figure 19:
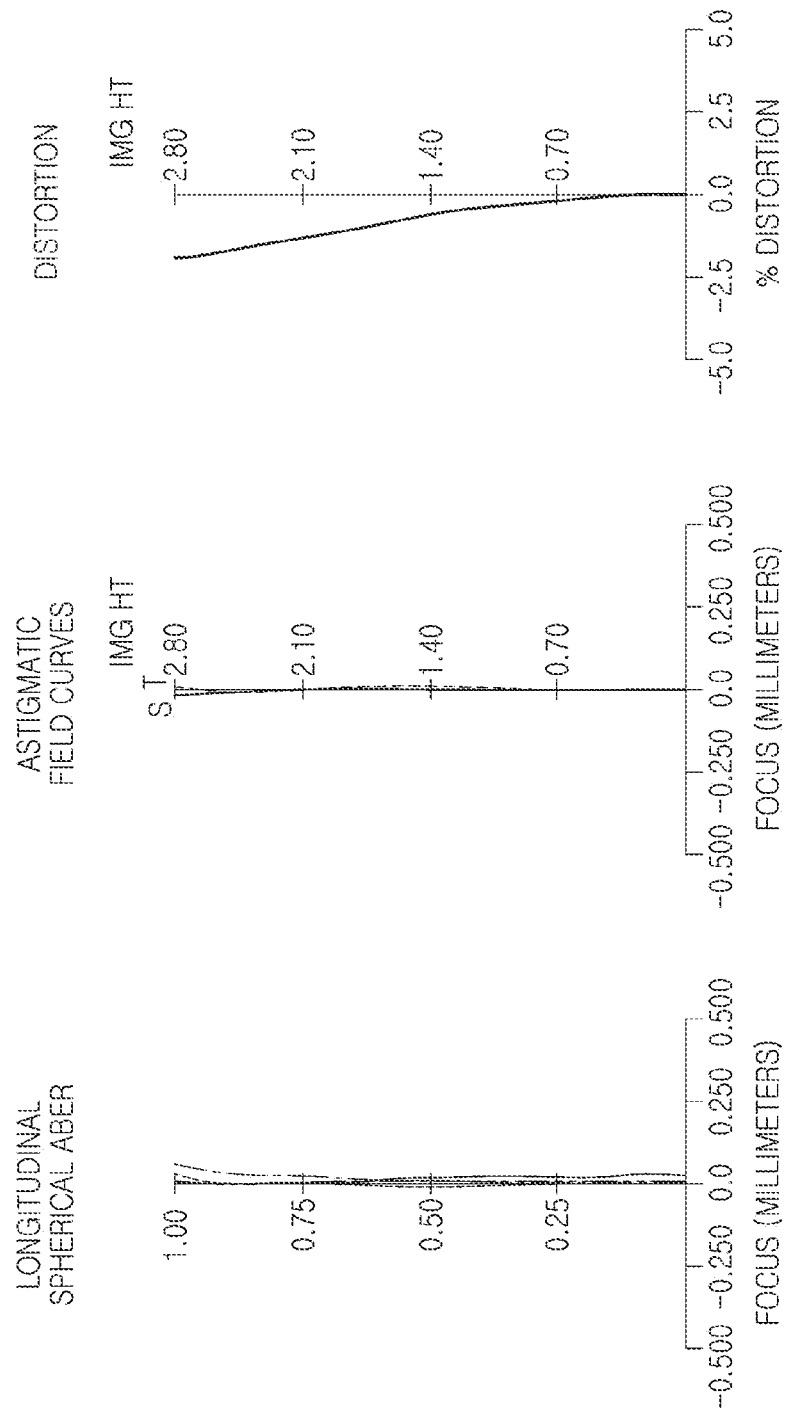
FIG. 19 presents graphs having curves representing aberration characteristics of the optical imaging system illustrated in FIG. 17.
Figure 20:
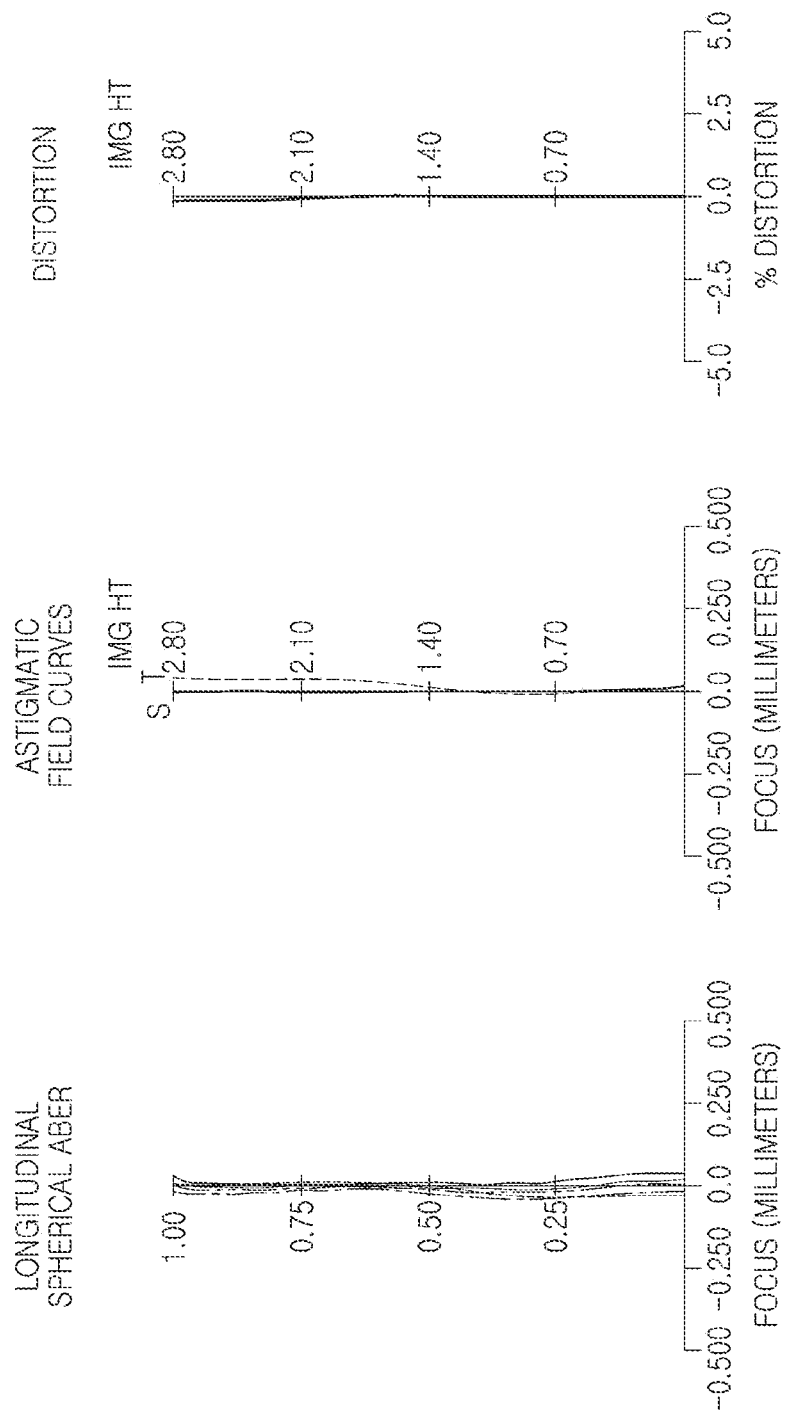
FIG. 20 presents graphs having curves representing aberration characteristics of the optical imaging system illustrated in FIG. 18.

In addition, the optical imaging system configured as described above may have aberration characteristics illustrated in FIGS. 19 and 20.

An optical imaging system according to a sixth example embodiment is described with reference to FIGS. 21 through 24.

Figure 21:
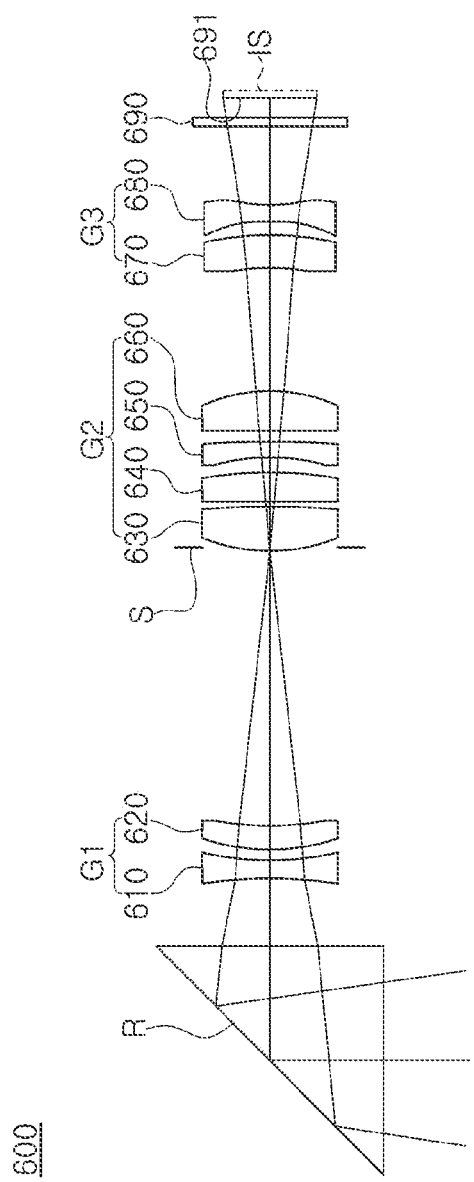
FIG. 21 is a view illustrating a configuration of the lens in the case that an optical imaging system according to a sixth example embodiment of the present disclosure has the first total focal length.
Figure 22:
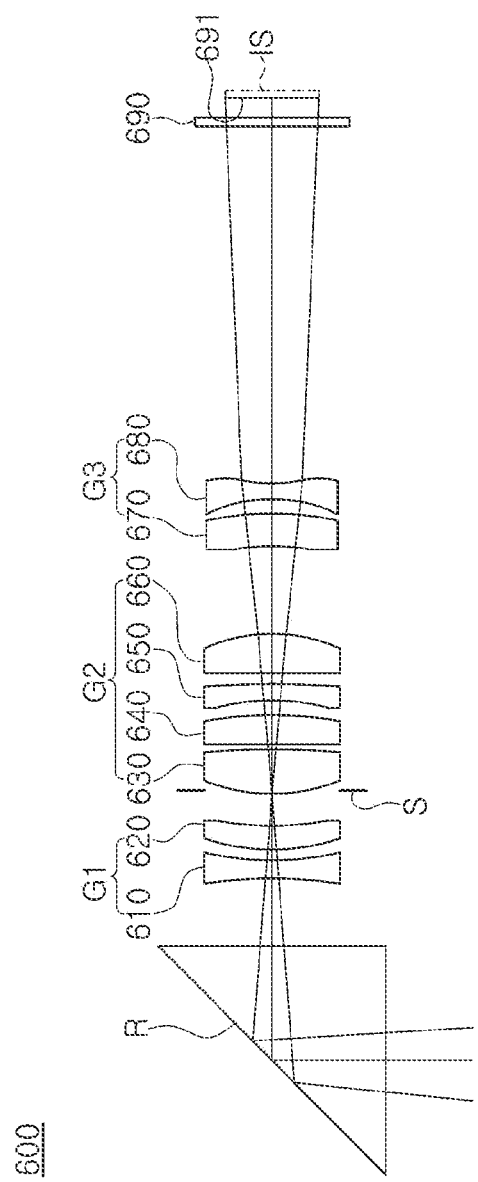
FIG. 22 is a view illustrating a configuration of the lens in the case that the optical imaging system according to the sixth example embodiment of the present disclosure has the second total focal length.

FIG. 21 is a view illustrating a configuration of the lens in the case that the optical imaging system according to the sixth example embodiment of the present disclosure has the first total focal length; and FIG. 22 is a view illustrating a configuration of the lens in the case that the optical imaging system according to the sixth example embodiment of the present disclosure has the second total focal length.

An optical imaging system 600 according to the sixth example embodiment of the present disclosure may include the first lens group G1, the second lens group G2, and the third lens group G3.

The first lens group G1 may include a first lens 610 and a second lens 620; the second lens group G2 may include a third lens 630, a fourth lens 640, a fifth lens 650, and a sixth lens 660; and the third lens group G3 may include a seventh lens 670 and an eighth lens 680.

In addition, the optical imaging system may further include a filter 690 and the image sensor IS.

The optical imaging system 600 according to the sixth example embodiment of the present disclosure may form the focus on an imaging plane 691. The imaging plane 691 may indicate the surface on which the focus is formed by the optical imaging system. For example, the imaging plane 691 may indicate one surface of the image sensor IS, on which light is received.

In addition, the aperture S may be disposed between the first lens group G1 and the second lens group G2. For example, the aperture S may be disposed between the second lens 620 and the third lens 630.

In addition, the optical imaging system may further include the reflecting member R disposed in front of the first lens 610 and having the reflecting surface on which the optical path is changed. In the sixth example embodiment of the present disclosure, the reflecting member R may be the prism or the mirror.

Light incident on the reflecting member R may be bent by the reflecting member R, and may pass through the first lens group G1 to the third lens group G3. For example, light incident on the reflecting member R along the first optical axis may be bent toward the second optical axis (for example, the optical axis) perpendicular to the first optical axis.

At least one of the first lens group G1 to the third lens group G3 may be moved to change the total focal length of the optical imaging system. For example, the space between the first lens group G1 and the second lens group G2 may be changed as the first lens group G1 is fixed and the second lens group G2 is moved along the optical axis.

In addition, the space between the second lens group G2 and the third lens group G3 may be changed, and a space between the third lens group G3 and the imaging plane 691 may be changed, as the second lens group G2 and the third lens group G3 are respectively moved along the optical axis.

Here, 'space' may indicate the distance between two members in the optical axis direction.

Table 16 illustrates the characteristics (e.g., radius of curvature) of each lens, the thicknesses of the lens or the distance between the lenses, and the refractive index, Abbe number, effective diameter, and focal length of the lens.

TABLE 16

| Surface no. | Item | Radius of curvature | Thickness or distance | Refractive index | Abbe no. | Effective diameter | Focal length |
|---|---|---|---|---|---|---|---|
| S1 | Prism | Infinity | 4.200 | 1.717 | 29.5 | 5.800 | |
| S2 | | Infinity | −4.200 | 1.717 | 29.5 | 5.800 | |
| S3 | | Infinity | −2.500 | | | 5.800 | |
| S4 | First lens | −8.741 | 0.620 | 1.544 | 56 | 5.712 | −11.770 |
| S5 | | 17.164 | 0.355 | | | 5.801 | |
| S6 | Second lens | 7.303 | 0.750 | 1.846 | 23.7 | 6.108 | 29.420 |
| S7 | | 10.308 | D1 | | | 6.032 | |
| S8 | Third lens | 5.71470 | 1.473 | 1.497 | 81.5 | 6.720 | 9.790 |
| S9 | | −16.78133 | 0.185 | | | 6.755 | |
| S10 | Fourth lens | −74.78126 | 0.910 | 1.544 | 56 | 6.540 | 124.340 |
| S11 | | −33.63970 | 0.481 | | | 6.540 | |
| S12 | Fifth lens | −9.15650 | 0.580 | 1.846 | 23.7 | 6.338 | −15.082 |
| S13 | | −46.02062 | 0.350 | | | 6.296 | |
| S14 | Sixth lens | −46.71626 | 1.283 | 1.535 | 56 | 6.233 | 11.027 |
| S15 | | −4.79595 | D2 | | | 6.182 | |
| S16 | Seventh lens | −7.04833 | 1.050 | 1.66 | 20.4 | 4.816 | 36.592 |
| S17 | | −5.646 | 0.480 | | | 4.679 | |
| S18 | Eighth lens | −16.50050 | 0.580 | 1.535 | 56 | 4.610 | −9.337 |
| S19 | | 6.22100 | D3 | | | 4.816 | |
| S20 | Filter | Infinity | 0.210 | 1.516 | 64.1 | 5.904 | |
| S21 | | Infinity | 0.655 | | | 5.925 | |
| S22 | Imaging plane | Infinity | | | | 6.105 | |

TABLE 17

| | First position | Second position |
|---|---|---|
| D1 | 9.066 | 0.850 |
| D2 | 4.087 | 2.557 |
| D3 | 2.635 | 12.382 |

D1 may indicate a distance between the second lens 620 and the third lens 630 in the optical axis direction, D2 may indicate a distance between the sixth lens 660 and the seventh lens 670 in the optical axis direction, and D3 may indicate a distance between the eighth lens 680 and the filter 690 in the optical axis direction.

The space between the first lens group G1 and the second lens group G2 in the first position may be different from the space between the first lens group G1 and the second lens group G2 in the second position. For example, the first lens group G1 and the second lens group G2 may be positioned relatively distantly from each other in the first position, and the first lens group G1 and the second lens group G2 may be positioned relatively close to each other in the second position.

In addition, the space between the second lens group G2 and the third lens group G3 in the first position may be different from the space between the second lens group G2 and the third lens group G3 in the second position. For example, the second lens group G2 and the third lens group G3 may be positioned relatively distantly from each other in the first position, and the second lens group G2 and the third lens group G3 may be positioned relatively close to each other in the second position.

The space between the first lens group G1 and the second lens group G2 and the space between the second lens group G2 and the third lens group G3 may be changed, thus changing the total focal length of the optical imaging system, and adjusting the focus.

The first position may indicate the relative positions of the first lens group G1 to the third lens group G3 in the case that the optical imaging system has the first total focal length fL, and the second position may indicate the relative positions of the first lens group G1 to the third lens group G3 in the case that the optical imaging system has the second total focal length fH.

The first total focal length fL of the optical imaging system in the first position may be 9.18 mm, and Fno_L may be 2.5.

The second total focal length fH of the optical imaging system in the second position may be 22.75 mm, and Fno_H may be 4.5.

Fno_L may indicate the F-number of the optical imaging system in the first position, and Fno_H may indicate the F-number of the optical imaging system in the second position.

TTL of the optical imaging system may be 25.751 mm. TTL may indicate a distance from an object-side surface of the first lens 610 to the imaging plane 691 in the optical axis direction.

A diagonal length of the imaging plane 691 may be 6.105 mm.

In the sixth example embodiment of the present disclosure, the first lens group G1 may generally have negative refractive power. The focal length of the first lens group G1 may be −17.233 mm.

The second lens group G2 may generally have positive refractive power. The focal length of the second lens group G2 may be 7.582 mm.

The third lens group G3 may generally have negative refractive power. The focal length of the third lens group G3 may be −10.676 mm.

The first lens 610 may have negative refractive power, and a concave first surface and a concave second surface.

The second lens 620 may have positive refractive power, and a convex first surface and a concave second surface.

The third lens 630 may have positive refractive power, and a convex first surface and a convex second surface.

The fourth lens 640 may have positive refractive power, and a concave first surface and a convex second surface.

The fifth lens 650 may have negative refractive power, and a concave first surface and a convex second surface.

The sixth lens 660 may have positive refractive power, and a concave first surface and a convex second surface.

The seventh lens 670 may have positive refractive power, and a concave first surface and a convex second surface.

The eighth lens 680 may have negative refractive power, and a concave first surface and a concave second surface.

Meanwhile, each surface of the first lens 610, the third lens 630, the fourth lens 640, the sixth lens 660, the seventh lens 670, and the eighth lens 680 may have the coefficient of the aspherical surface, as illustrated in Table 18. For example, the object-side surfaces and image-side surfaces of the first lens 610, the third lens 630, the fourth lens 640, the sixth lens 660, the seventh lens 670, and the eighth lens 680 may be all the aspherical surfaces.

TABLE 18

| | S4 | S5 | S8 | S9 | S10 | S11 |
|---|---|---|---|---|---|---|
| Conic constant K | 2.2882784 | 9.9447339 | 0.1345855 | −99 | 99.000001 | 99 |
| $4^{th}$ coefficient A | 4.747E−03 | 3.839E−03 | 1.624E−04 | 9.185E−04 | 5.222E−04 | 1.026E−03 |
| $6^{th}$ coefficient B | −1.106E−03 | −6.302E−04 | −2.297E−05 | 1.261E−05 | 3.064E−05 | 6.324E−05 |
| $8^{th}$ coefficient C | 5.446E−04 | 2.781E−04 | −5.893E−06 | −9.014E−07 | −6.647E−05 | −3.201E−04 |
| $10^{th}$ coefficient D | −1.980E−04 | −1.086E−04 | 2.703E−07 | −4.969E−07 | −7.054E−06 | 6.083E−05 |
| $12^{th}$ coefficient E | 4.471E−05 | 2.607E−05 | −5.138E−08 | 7.092E−09 | 7.771E−06 | −7.735E−07 |
| $14^{th}$ coefficient F | −6.216E−06 | −3.797E−06 | 0.000E+00 | 0.000E+00 | −1.629E−06 | −1.132E−06 |
| $16^{th}$ coefficient G | 5.200E−07 | 3.302E−07 | 0.000E+00 | 0.000E+00 | 1.629E−07 | 1.598E−07 |
| $18^{th}$ coefficient H | −2.404E−08 | −1.584E−08 | 0.000E+00 | 0.000E+00 | −8.240E−09 | −9.177E−09 |
| $20^{th}$ coefficient J | 4.726E−10 | 3.235E−10 | 0.000E+00 | 0.000E+00 | 1.710E−10 | 2.005E−10 |

| | S14 | S15 | S16 | S17 | S18 | S19 |
|---|---|---|---|---|---|---|
| Conic constant K | 99 | −3.04386 | −11.32069 | −76.7575 | −25.70075 | −99 |
| $4^{th}$ coefficient A | 6.099E−03 | 2.522E−03 | 5.065E−03 | −2.674E−02 | −2.195E−02 | 7.820E−03 |
| $6^{th}$ coefficient B | −1.361E−03 | −8.213E−04 | −5.000E−04 | 2.197E−02 | −1.162E−03 | −2.112E−02 |
| $8^{th}$ coefficient C | 2.868E−04 | 2.763E−04 | 5.384E−05 | −1.380E−02 | 3.078E−03 | 1.630E−02 |
| $10^{th}$ coefficient D | −1.321E−04 | −1.101E−04 | 1.191E−04 | 6.717E−03 | −9.282E−04 | −7.804E−03 |
| $12^{th}$ coefficient E | 3.731E−05 | 2.718E−05 | −5.425E−05 | −2.267E−03 | −4.519E−05 | 2.450E−03 |

TABLE 18-continued

| 14th coefficient F | −5.765E−06 | −3.952E−06 | 9.809E−06 | 5.086E−04 | 9.445E−05 | −5.038E−04 |
|---|---|---|---|---|---|---|
| 16th coefficient G | 4.889E−07 | 3.339E−07 | −8.233E−07 | −7.306E−05 | −2.594E−05 | 6.538E−05 |
| 18th coefficient H | −2.099E−08 | −1.520E−08 | 2.808E−08 | 6.113E−06 | 3.292E−06 | −4.844E−06 |
| 20th coefficient J | 3.502E−10 | 2.933E−10 | −2.499E−10 | −2.260E−07 | −1.668E−07 | 1.559E−07 |

Figure 23:
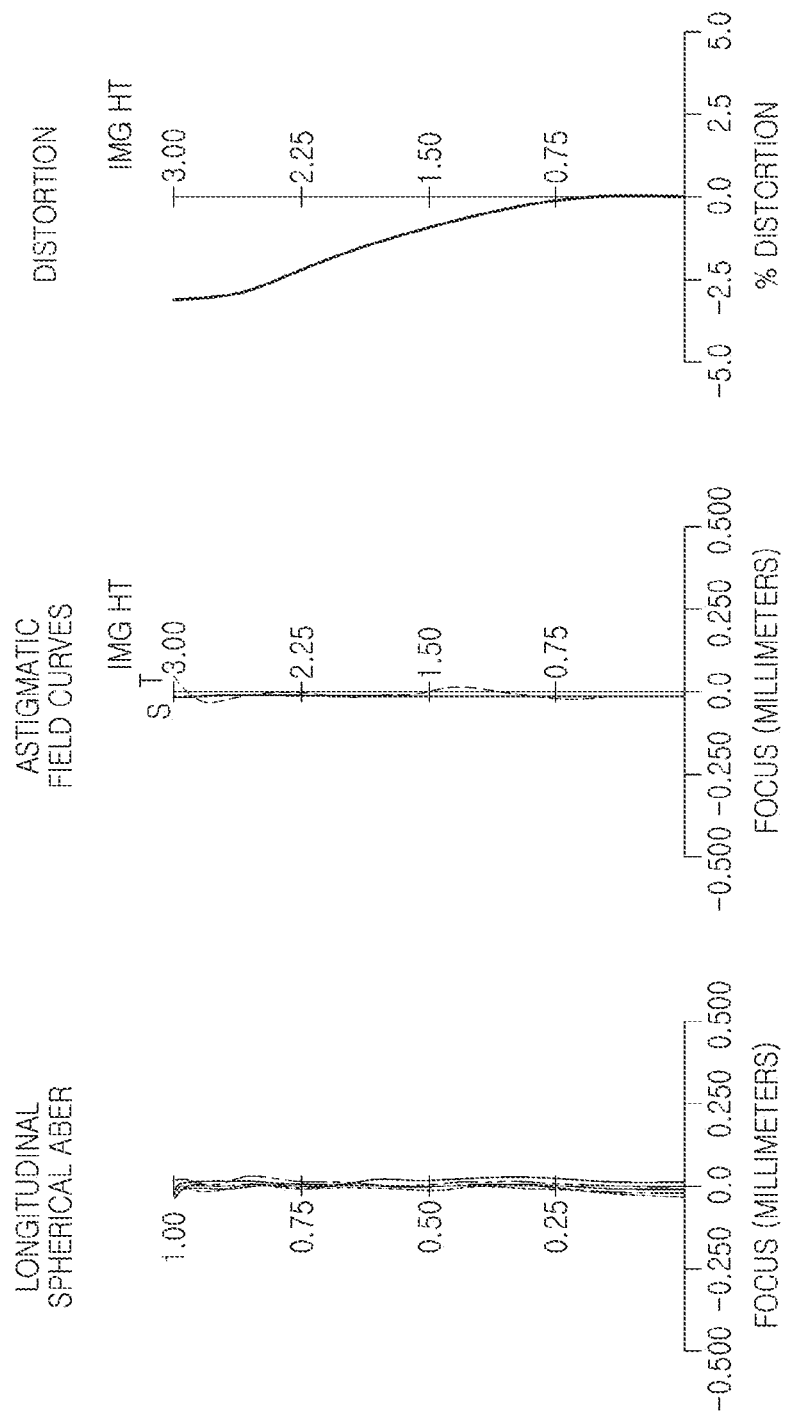
FIG. 23 presents graphs having curves representing aberration characteristics of the optical imaging system illustrated in FIG. 21.
Figure 24:
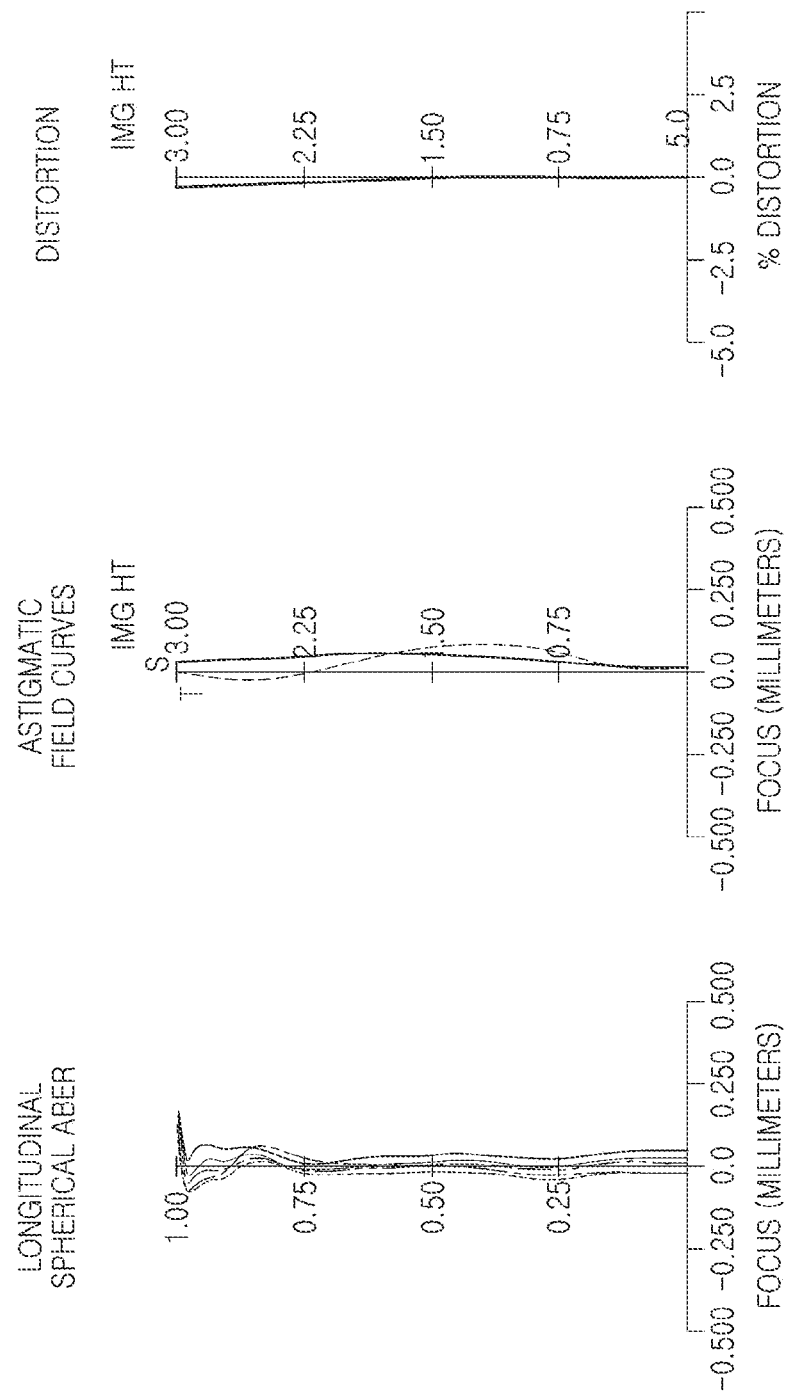
FIG. 24 presents graphs having curves representing aberration characteristics of the optical imaging system illustrated in FIG. 22.

In addition, the optical imaging system configured as described above may have aberration characteristics illustrated in FIGS. 23 and 24.

An optical imaging system according to a seventh example embodiment of the present disclosure is described with reference to FIGS. 25 through 28.

Figure 25:
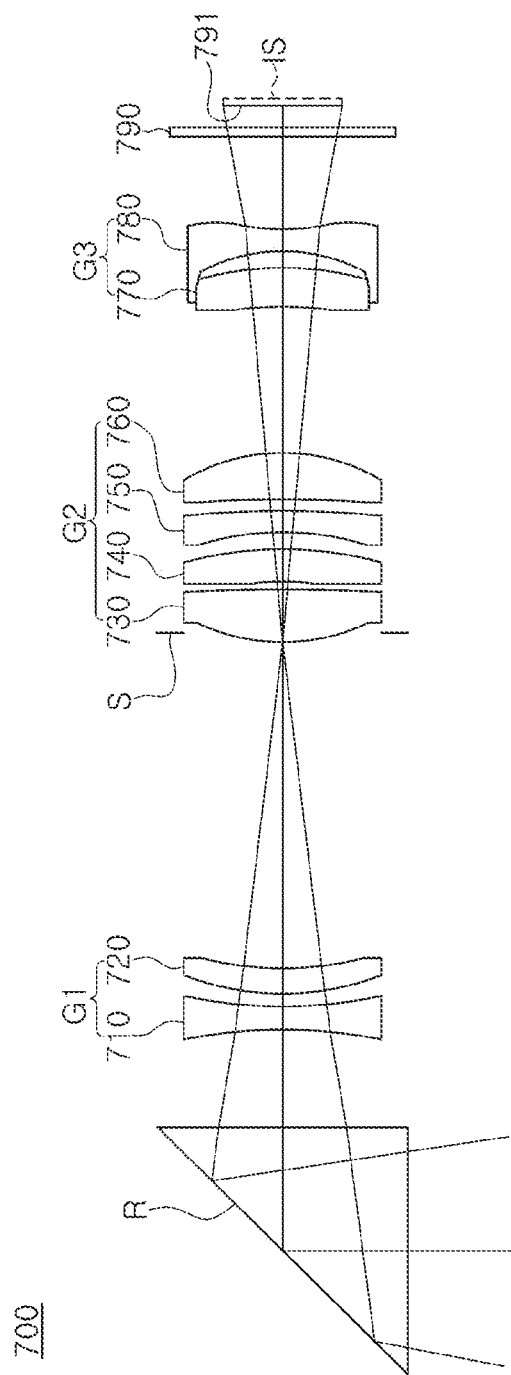
FIG. 25 is a view illustrating a configuration of the lens in the case that an optical imaging system according to a seventh example embodiment of the present disclosure has the first total focal length.
Figure 26:
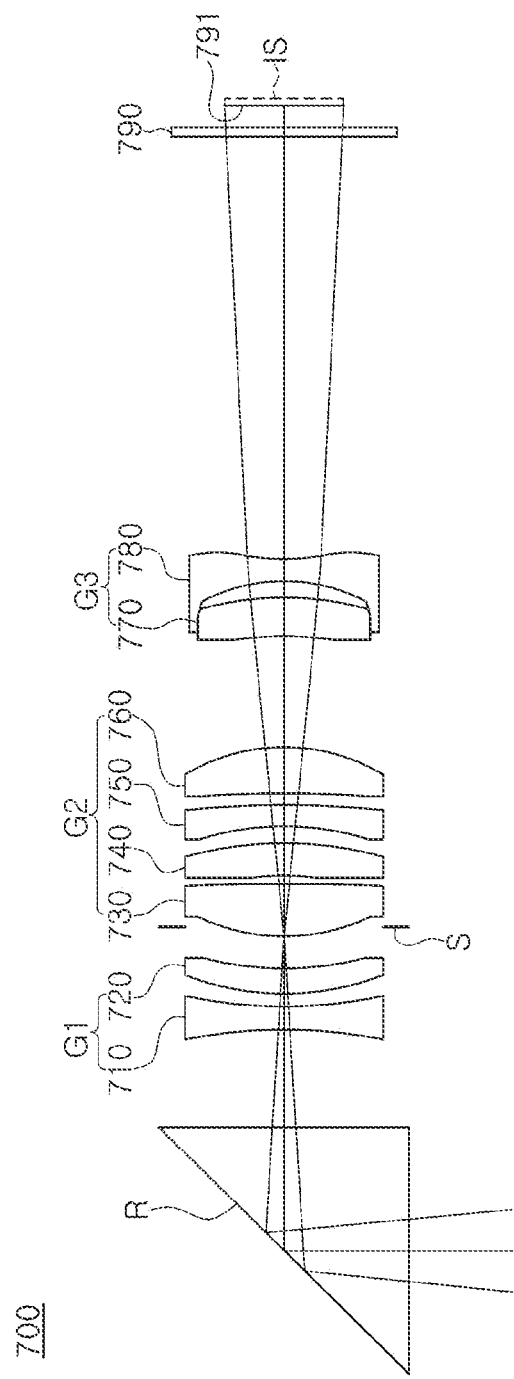
FIG. 26 is a view illustrating a configuration of the lens in the case that the optical imaging system according to the seventh example embodiment of the present disclosure has the second total focal length.

FIG. 25 is a view illustrating a configuration of the lens in the case that the optical imaging system according to the seventh example embodiment of the present disclosure has the first total focal length; and FIG. 26 is a view illustrating a configuration of the lens in the case that the optical imaging system according to the seventh example embodiment of the present disclosure has the second total focal length.

An optical imaging system 700 according to the seventh example embodiment of the present disclosure may include the first lens group G1, the second lens group G2, and the third lens group G3.

The first lens group G1 may include a first lens 710 and a second lens 720; the second lens group G2 may include a third lens 730, a fourth lens 740, a fifth lens 750, and a sixth lens 760; and the third lens group G3 may include a seventh lens 770 and an eighth lens 780.

In addition, the optical imaging system may further include a filter 790 and the image sensor IS.

The optical imaging system 700 according to the seventh example embodiment of the present disclosure may form the focus on an imaging plane 791. The imaging plane 791 may indicate the surface on which the focus is formed by the optical imaging system. For example, the imaging plane 791 may indicate one surface of the image sensor IS, on which light is received.

In addition, the aperture S may be disposed between the first lens group G1 and the second lens group G2. For example, the aperture S may be disposed between the second lens 720 and the third lens 730.

In addition, the optical imaging system may further include the reflecting member R disposed in front of the first lens 710 and having the reflecting surface on which the optical path is changed. In the seventh example embodiment of the present disclosure, the reflecting member R may be the prism or the mirror.

Light incident on the reflecting member R may be bent by the reflecting member R, and may pass through the first lens group G1 to the third lens group G3. For example, light incident on the reflecting member R along the first optical axis may be bent toward the second optical axis (for example, the optical axis) perpendicular to the first optical axis.

At least one of the first lens group G1 to the third lens group G3 may be moved to change the total focal length of the optical imaging system. For example, the space between the first lens group G1 and the second lens group G2 may be changed as the first lens group G1 is fixed and the second lens group G2 is moved along the optical axis.

In addition, the space between the second lens group G2 and the third lens group G3 may be changed, and a space between the third lens group G3 and the imaging plane 791 may be changed, as the second lens group G2 and the third lens group G3 are respectively moved along the optical axis.

Here, 'space' may indicate the distance between two members in the optical axis direction.

Table 19 illustrates the characteristics (e.g., radius of curvature) of each lens, the thicknesses of the lens or the distance between the lenses, and the refractive index, Abbe number, effective diameter, and focal length of the lens.

TABLE 19

| Surface no. | Item | Radius of curvature | Thickness or distance | Refractive index | Abbe no. | Effective diameter | Focal length |
|---|---|---|---|---|---|---|---|
| S1 | Prism | Infinity | 3.200 | 1.717 | 29.5 | 5.800 | |
| S2 | | Infinity | −3.200 | 1.717 | 29.5 | 5.800 | |
| S3 | | Infinity | −2.500 | | | 5.800 | |
| S4 | First lens | −8.042 | 0.570 | 1.544 | 56 | 4.692 | −9.668 |
| S5 | | 15.790 | 0.327 | | | 4.801 | |
| S6 | Second lens | 6.718 | 0.690 | 1.846 | 23.7 | 5.091 | 24.166 |
| S7 | | 9.484 | D1 | | | 5.039 | |
| S8 | Third lens | 5.25752 | 1.355 | 1.497 | 81.5 | 5.520 | 8.042 |
| S9 | | −15.43882 | 0.170 | | | 5.549 | |
| S10 | Fourth lens | −68.79876 | 0.837 | 1.544 | 56 | 5.320 | 102.137 |
| S11 | | −30.94852 | 0.443 | | | 5.340 | |
| S12 | Fifth lens | −8.42398 | 0.534 | 1.846 | 23.7 | 5.206 | −12.389 |
| S13 | | −42.33897 | 0.322 | | | 5.172 | |
| S14 | Sixth lens | −42.97896 | 1.180 | 1.535 | 56 | 5.120 | 9.058 |
| S15 | | −4.41227 | D2 | | | 5.078 | |
| S16 | Seventh lens | −6.48446 | 0.966 | 1.66 | 20.4 | 3.956 | 30.058 |
| S17 | | −5.195 | 0.442 | | | 3.842 | |
| S18 | Eighth lens | −15.18046 | 0.534 | 1.535 | 56 | 3.774 | −7.670 |

TABLE 19-continued

| Surface no. | Item | Radius of curvature | Thickness or distance | Refractive index | Abbe no. | Effective diameter | Focal length |
|---|---|---|---|---|---|---|---|
| S19 | | 5.72332 | D3 | | | 3.956 | |
| S20 | Filter | Infinity | 0.193 | 1.516 | 64.1 | 4.922 | |
| S21 | | Infinity | 0.603 | | | 4.935 | |
| S22 | Imaging plane | Infinity | | | | 5.079 | |

TABLE 20

| | First position | Second position |
|---|---|---|
| D1 | 8.341 | 0.782 |
| D2 | 3.760 | 2.352 |
| D3 | 2.424 | 11.392 |

D1 may indicate a distance between the second lens 720 and the third lens 730 in the optical axis direction, D2 may indicate a distance between the sixth lens 760 and the seventh lens 770 in the optical axis direction, and D3 may indicate a distance between the eighth lens 780 and the filter 790 in the optical axis direction.

The space between the first lens group G1 and the second lens group G2 in the first position may be different from the space between the first lens group G1 and the second lens group G2 in the second position. For example, the first lens group G1 and the second lens group G2 may be positioned relatively distantly from each other in the first position, and the first lens group G1 and the second lens group G2 may be positioned relatively close to each other in the second position.

In addition, the space between the second lens group G2 and the third lens group G3 in the first position may be different from the space between the second lens group G2 and the third lens group G3 in the second position. For example, the second lens group G2 and the third lens group G3 may be positioned relatively distantly from each other in the first position, and the second lens group G2 and the third lens group G3 may be positioned relatively close to each other in the second position.

The space between the first lens group G1 and the second lens group G2 and the space between the second lens group G2 and the third lens group G3 may be changed, thus changing the total focal length of the optical imaging system, and adjusting the focus.

The first position may indicate the relative positions of the first lens group G1 to the third lens group G3 in the case that the optical imaging system has the first total focal length fL, and the second position may indicate the relative positions of the first lens group G1 to the third lens group G3 in the case that the optical imaging system has the second total focal length fH.

The first total focal length fL of the optical imaging system in the first position may be 7.54 mm, and Fno_L may be 2.5.

The second total focal length fH of the optical imaging system in the second position may be 20.2 mm, and Fno_H may be 4.5.

Fno_L may indicate the F-number of the optical imaging system in the first position, and Fno_H may indicate the F-number of the optical imaging system in the second position.

TTL of the optical imaging system may be 23.691 mm. TTL may indicate a distance from an object-side surface of the first lens 710 to the imaging plane 791 in the optical axis direction in the optical axis direction.

A diagonal length of the imaging plane 791 may be 5.079 mm.

In the seventh example embodiment of the present disclosure, the first lens group G1 may generally have negative refractive power. The focal length of the first lens group G1 may be −15.854 mm.

The second lens group G2 may generally have positive refractive power. The focal length of the second lens group G2 may be 6.976 mm.

The third lens group G3 may generally have negative refractive power. The focal length of the third lens group G3 may be −9.822 mm.

The first lens 710 may have negative refractive power, and a concave first surface and a concave second surface.

The second lens 720 may have positive refractive power, and a convex first surface and a concave second surface.

The third lens 730 may have positive refractive power, and a convex first surface and a convex second surface.

The fourth lens 740 may have positive refractive power, and a concave first surface and a convex second surface.

The fifth lens 750 may have negative refractive power, and a concave first surface and a concave second surface.

The sixth lens 760 may have positive refractive power, and a concave first surface and a convex second surface.

The seventh lens 770 may have positive refractive power, and a concave first surface and a convex second surface.

The eighth lens 780 may have negative refractive power, and a concave first surface and a concave second surface.

Meanwhile, each surface of the first lens 710, the third lens 730, the fourth lens 740, the sixth lens 760, the seventh lens 770, and the eighth lens 780 may have the coefficient of the aspherical surface, as illustrated in Table 21. For example, the object-side surfaces and image-side surfaces of the first lens 710, the third lens 730, the fourth lens 740, the sixth lens 760, the seventh lens 770, and the eighth lens 780 may be all the aspherical surfaces.

TABLE 21

| | S4 | S5 | S8 | S9 | S10 | S11 |
|---|---|---|---|---|---|---|
| Conic constant K | 2.2882784 | 9.9447339 | 0.1345855 | −99 | 99.000001 | 99 |
| $4^{th}$ coefficient A | 8.565E−03 | 6.926E−03 | 2.929E−04 | 1.657E−03 | 9.421E−04 | 1.851E−03 |
| $6^{th}$ coefficient B | −2.959E−03 | −1.685E−03 | −6.142E−05 | 3.373E−05 | 8.192E−05 | 1.691E−04 |
| $8^{th}$ coefficient C | 2.158E−03 | 1.102E−03 | −2.335E−05 | −3.572E−06 | −2.634E−04 | −1.269E−03 |

TABLE 21-continued

| | | | | | | |
|---|---|---|---|---|---|---|
| 10$^{th}$ coefficient D | −1.163E−03 | −6.377E−04 | 1.587E−06 | −2.919E−06 | −4.143E−05 | 3.572E−04 |
| 12$^{th}$ coefficient E | 3.892E−04 | 2.270E−04 | −4.472E−07 | 6.173E−08 | 6.764E−05 | −6.733E−06 |
| 14$^{th}$ coefficient F | −8.019E−05 | −4.899E−05 | 0.000E+00 | 0.000E+00 | −2.102E−05 | −1.461E−05 |
| 16$^{th}$ coefficient G | 9.941E−06 | 6.313E−06 | 0.000E+00 | 0.000E+00 | 3.114E−06 | 3.055E−06 |
| 18$^{th}$ coefficient H | −6.812E−07 | −4.488E−07 | 0.000E+00 | 0.000E+00 | −2.335E−07 | −2.600E−07 |
| 20$^{th}$ coefficient J | 1.985E−08 | 1.359E−08 | 0.000E+00 | 0.000E+00 | 7.181E−09 | 8.422E−09 |

| | S14 | S15 | S16 | S17 | S18 | S19 |
|---|---|---|---|---|---|---|
| Conic constant K | 99 | −3.04386 | −11.32069 | −76.7575 | −25.70075 | −99 |
| 4$^{th}$ coefficient A | 1.100E−02 | 4.550E−03 | 9.138E−03 | −4.824E−02 | −3.960E−02 | 1.411E−02 |
| 6$^{th}$ coefficient B | −3.640E−03 | −2.196E−03 | −1.337E−03 | 5.875E−02 | −3.108E−03 | −5.646E−02 |
| 8$^{th}$ coefficient C | 1.137E−03 | 1.095E−03 | 2.134E−04 | −5.470E−02 | 1.220E−02 | 6.460E−02 |
| 10$^{th}$ coefficient D | −7.756E−04 | −6.466E−04 | 6.995E−04 | 3.945E−02 | −5.452E−03 | −4.583E−02 |
| 12$^{th}$ coefficient E | 3.247E−04 | 2.366E−04 | −4.722E−04 | −1.973E−02 | −3.933E−04 | 2.132E−02 |
| 14$^{th}$ coefficient F | −7.437E−05 | −5.098E−05 | 1.265E−04 | 6.561E−03 | 1.218E−03 | −6.499E−03 |
| 16$^{th}$ coefficient G | 9.347E−06 | 6.384E−06 | −1.574E−05 | −1.397E−03 | −4.960E−04 | 1.250E−03 |
| 18$^{th}$ coefficient H | −5.946E−07 | −4.308E−07 | 7.956E−07 | 1.732E−04 | 9.327E−05 | −1.373E−04 |
| 20$^{th}$ coefficient J | 1.471E−08 | 1.232E−08 | −1.049E−08 | −9.492E−06 | −7.004E−06 | 6.548E−06 |

Figure 27:
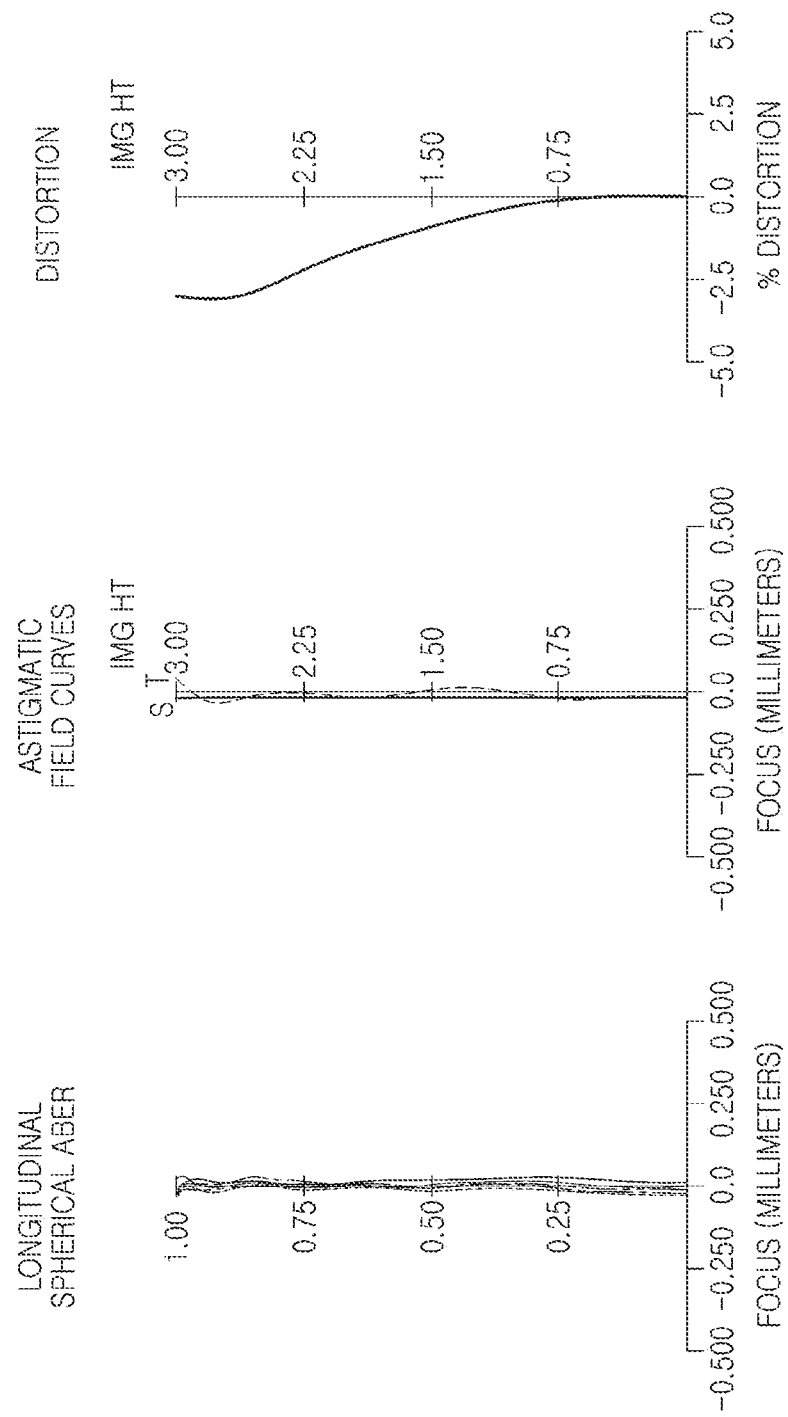
FIG. 27 presents graphs having curves representing aberration characteristics of the optical imaging system illustrated in FIG. 25.
Figure 28:
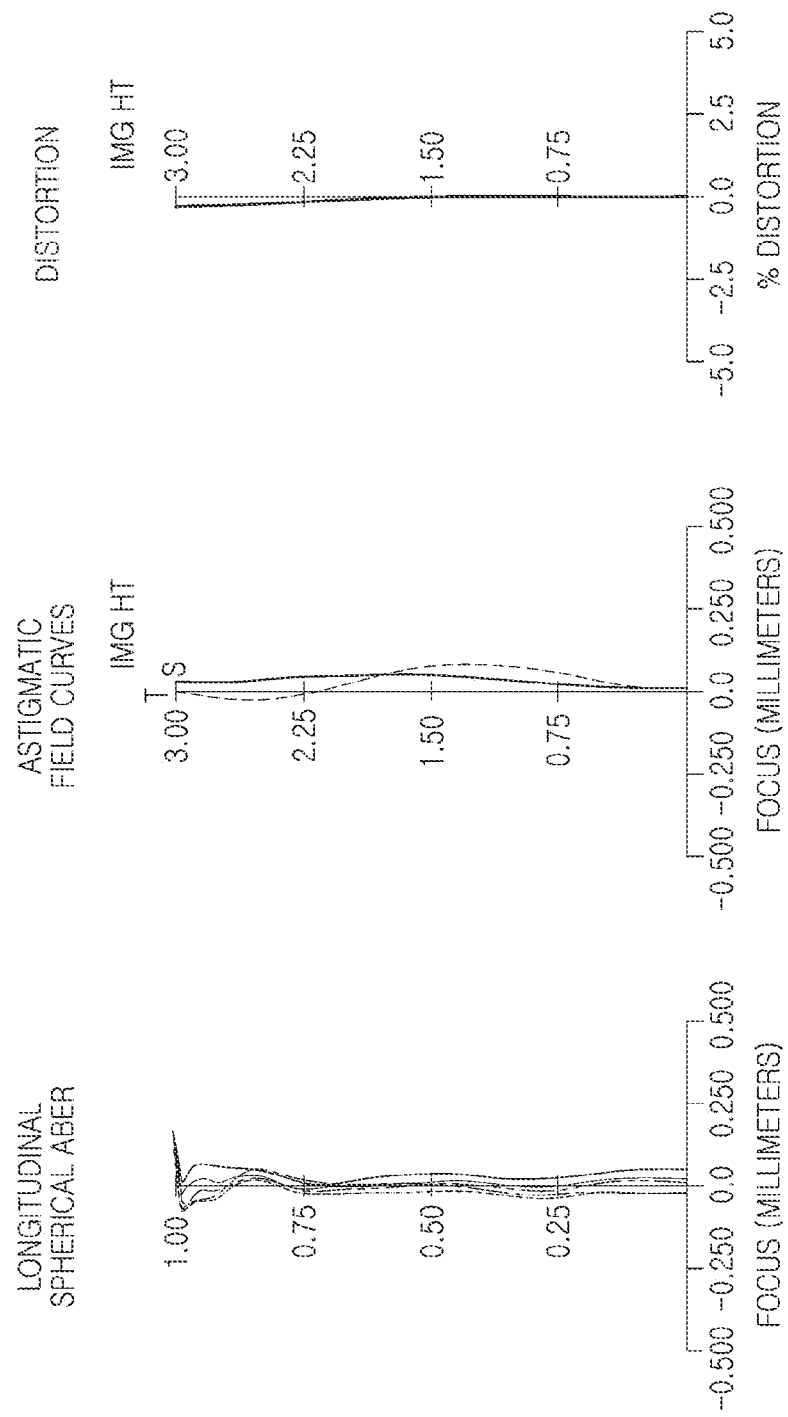
FIG. 28 presents graphs having curves representing aberration characteristics of the optical imaging system illustrated in FIG. 26.

In addition, the optical imaging system configured as described above may have aberration characteristics illustrated in FIGS. 27 and 28.

An optical imaging system according to an eighth example embodiment is described with reference to FIGS. 29 through 32.

Figure 29:
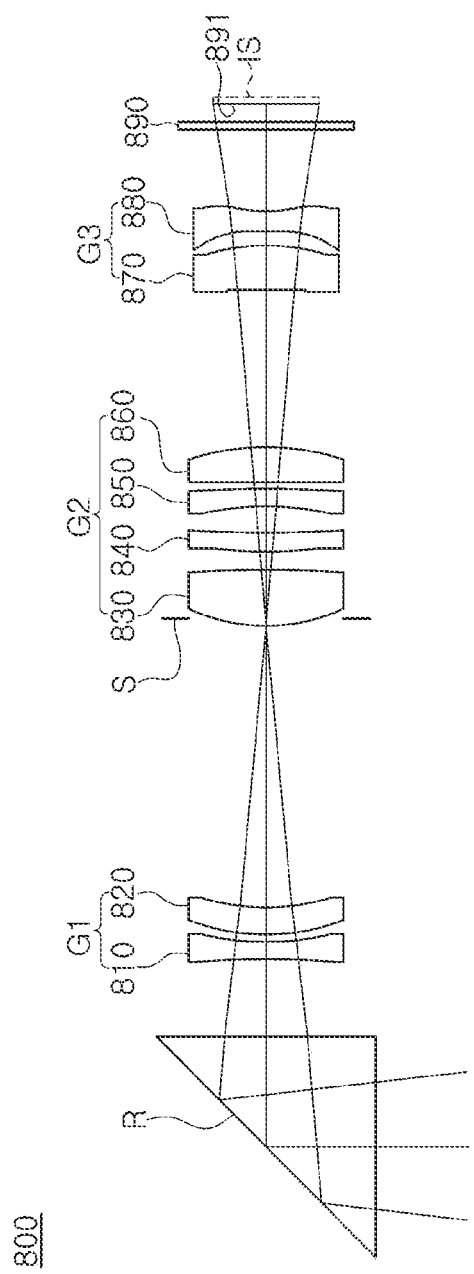
FIG. 29 is a view illustrating a configuration of the lens in the case that an optical imaging system according to an eighth example embodiment of the present disclosure has the first total focal length.
Figure 30:
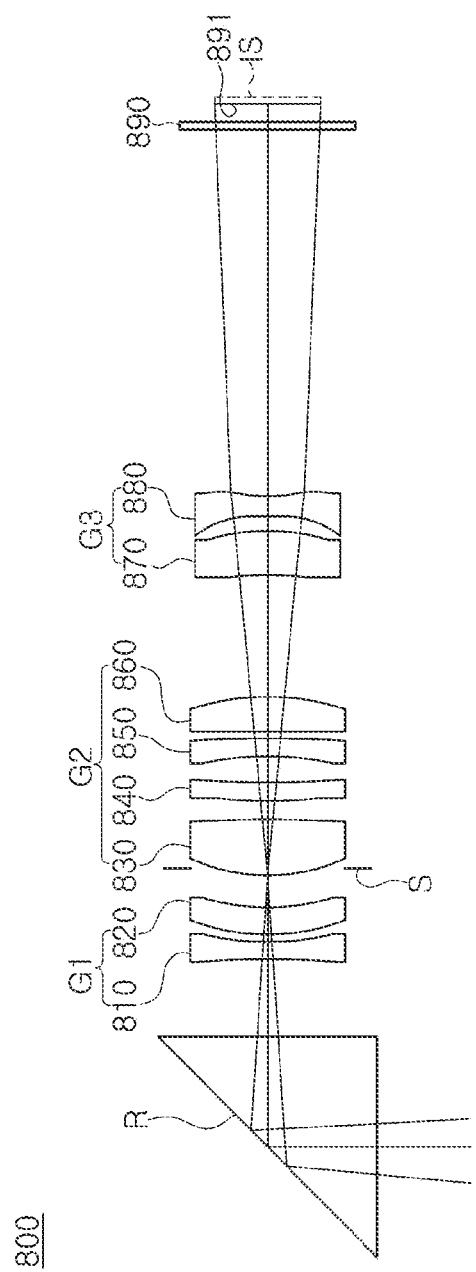
FIG. 30 is a view illustrating a configuration of the lens in the case that the optical imaging system according to the eighth example embodiment of the present disclosure has the second total focal length.

FIG. 29 is a view illustrating a configuration of the lens in the case that the optical imaging system according to the eighth example embodiment of the present disclosure has the first total focal length; and FIG. 30 is a view illustrating a configuration of the lens in the case that the optical imaging system according to the eighth example embodiment of the present disclosure has the second total focal length.

An optical imaging system 800 according to the eighth example embodiment of the present disclosure may include the first lens group G1, the second lens group G2, and the third lens group G3.

The first lens group G1 may include a first lens 810 and a second lens 820; the second lens group G2 may include a third lens 830, a fourth lens 840, a fifth lens 850, and a sixth lens 860; and the third lens group G3 may include a seventh lens 870 and an eighth lens 880.

In addition, the optical imaging system may further include a filter 890 and the image sensor IS.

The optical imaging system 800 according to the eighth example embodiment of the present disclosure may form the focus on an imaging plane 891. The imaging plane 891 may indicate the surface on which the focus is formed by the optical imaging system. For example, the imaging plane 891 may indicate one surface of the image sensor IS, on which light is received.

In addition, the aperture S may be disposed between the first lens group G1 and the second lens group G2. For example, the aperture S may be disposed between the second lens 820 and the third lens 830.

In addition, the optical imaging system may further include the reflecting member R disposed in front of the first lens 810 and having the reflecting surface on which the optical path is changed. In the eighth example embodiment of the present disclosure, the reflecting member R may be the prism or the mirror.

Light incident on the reflecting member R may be bent by the reflecting member R, and may pass through the first lens group G1 to the third lens group G3. For example, light incident on the reflecting member R along the first optical axis may be bent toward the second optical axis (for example, the optical axis) perpendicular to the first optical axis.

At least one of the first lens group G1 to the third lens group G3 may be moved to change the total focal length of the optical imaging system. For example, the space between the first lens group G1 and the second lens group G2 may be changed as the first lens group G1 is fixed and the second lens group G2 is moved along the optical axis.

In addition, the space between the second lens group G2 and the third lens group G3 may be changed, and a space between the third lens group G3 and the imaging plane 891 may be changed, as the second lens group G2 and the third lens group G3 are respectively moved along the optical axis.

Here, 'space' may indicate the distance between two members in the optical axis direction.

Table 22 illustrates characteristics of each lens (e.g., radius of curvature, thickness of the lens or distance between the lenses, refractive index, Abbe number or focal length).

TABLE 22

| Surface no. | Item | Radius of curvature | Thickness or distance | Refractive index | Abbe no. | Effective diameter | Focal length |
|---|---|---|---|---|---|---|---|
| S1 | Prism | Infinity | 3.600 | 1.717 | 29.5 | 5.800 | |
| S2 | | Infinity | -3.600 | 1.717 | 29.5 | 5.800 | |
| S3 | | Infinity | -2.500 | | | 5.800 | |
| S4 | First lens | -31.793 | 0.620 | 1.544 | 56 | 6.120 | -15.847 |
| S5 | | 11.985 | 0.220 | | | 6.140 | |
| S6 | Second lens | 7.385 | 0.920 | 1.846 | 23.7 | 6.180 | 47.022 |
| S7 | | 8.527 | 9.221 | | | 6.147 | |
| S8 | Third lens | 5.61157 | 1.880 | 1.497 | 81.5 | 6.440 | 9.590 |
| S9 | | -28.71067 | 0.650 | | | 6.299 | |
| S10 | Fourth lens | 34.03522 | 0.738 | 1.544 | 56 | 5.942 | 83.260 |
| S11 | | 134.02720 | 0.686 | | | 5.877 | |
| S12 | Fifth lens | -11.15840 | 0.580 | 1.846 | 23.7 | 5.422 | -15.340 |
| S13 | | -76.52858 | 0.287 | | | 5.294 | |
| S14 | Sixth lens | -56.82152 | 1.088 | 1.535 | 56 | 5.227 | 16.075 |
| S15 | | -7.54499 | 5.192 | | | 5.200 | |
| S16 | Seventh lens | -12.58473 | 1.420 | 1.66 | 20.4 | 4.760 | 23.929 |
| S17 | | -7.361 | 0.520 | | | 4.551 | |
| S18 | Eighth lens | -11.08049 | 0.720 | 1.535 | 56 | 4.488 | -8.261 |
| S19 | | 7.56842 | 2.638 | | | 4.760 | |
| S20 | Filter | Infinity | 0.210 | 1.516 | 64.1 | 5.860 | |
| S21 | | Infinity | 0.652 | | | 5.878 | |
| S22 | Imaging plane | Infinity | | | | 6.018 | |

TABLE 23

| | First position | Second position |
|---|---|---|
| D1 | 9.221 | 0.850 |
| D2 | 5.192 | 3.706 |
| D3 | 2.638 | 12.496 |

D1 may indicate a distance between the second lens 820 and the third lens 830 in the optical axis direction, D2 may indicate a distance between the sixth lens 860 and the seventh lens 870 in the optical axis direction, and D3 may indicate a distance between the eighth lens 880 and the filter 890 in the optical axis direction.

The space between the first lens group G1 and the second lens group G2 in the first position may be different from the space between the first lens group G1 and the second lens group G2 in the second position. For example, the first lens group G1 and the second lens group G2 may be positioned relatively distantly from each other in the first position, and the first lens group G1 and the second lens group G2 may be positioned relatively close to each other in the second position.

In addition, the space between the second lens group G2 and the third lens group G3 in the first position may be different from the space between the second lens group G2 and the third lens group G3 in the second position. For example, the second lens group G2 and the third lens group G3 may be positioned relatively distantly from each other in the first position, and the second lens group G2 and the third lens group G3 may be positioned relatively close to each other in the second position.

The space between the first lens group G1 and the second lens group G2 and the space between the second lens group G2 and the third lens group G3 may be changed, thus changing the total focal length of the optical imaging system, and adjusting the focus.

The first position may indicate the relative positions of the first lens group G1 to the third lens group G3 in the case that the optical imaging system has the first total focal length fL, and the second position may indicate the relative positions of the first lens group G1 to the third lens group G3 in the case that the optical imaging system has the second total focal length fH.

The first total focal length fL of the optical imaging system in the first position may be 11.8 mm, and Fno_L may be 2.8.

The second total focal length fH of the optical imaging system in the second position may be 29.6 mm, and Fno_H may be 5.1.

Fno_L may indicate the F-number of the optical imaging system in the first position, and Fno_H may indicate the F-number of the optical imaging system in the second position.

TTL of the optical imaging system may be 28.241 mm. TTL may indicate a distance from an object-side surface of the first lens 810 to the imaging plane 891 in the optical axis direction.

A diagonal length of the imaging plane 891 may be 6.018 mm.

In the eighth example embodiment of the present disclosure, the first lens group G1 may generally have negative refractive power. The focal length of the first lens group G1 may be -22.484 mm.

The second lens group G2 may generally have positive refractive power. The focal length of the second lens group G2 may be 9.441 mm.

The third lens group G3 may generally have negative refractive power. The focal length of the third lens group G3 may be -12.377 mm.

The first lens 810 may have negative refractive power, and a concave first surface and a concave second surface.

The second lens 820 may have positive refractive power, and a convex first surface and a concave second surface.

The third lens 830 may have positive refractive power, and a convex first surface and a convex second surface.

The fourth lens 840 may have positive refractive power, and a convex first surface and a concave second surface.

The fifth lens 850 may have negative refractive power, and a concave first surface and a convex second surface.

The sixth lens 860 may have positive refractive power, and a concave first surface and a convex second surface.

The seventh lens 870 may have positive refractive power, and a concave first surface and a convex second surface.

The eighth lens 880 may have negative refractive power, and a concave first surface and a concave second surface.

Figure 34:
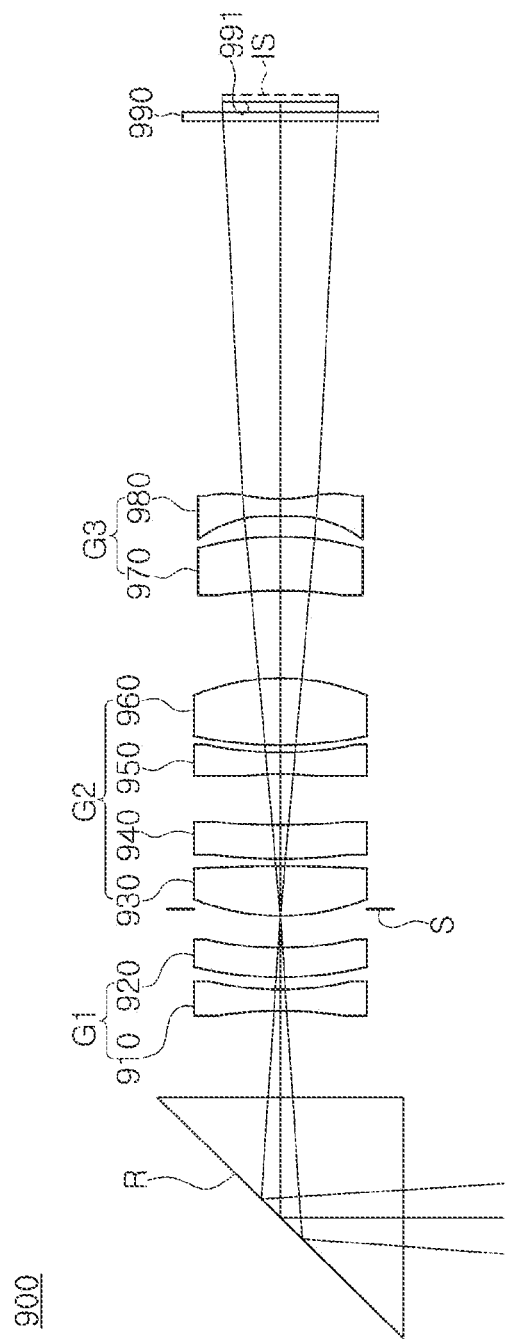
FIG. 34 is a view illustrating a configuration of the lens in the case that the optical imaging system according to the ninth example embodiment of the present disclosure has the second total focal length.

Meanwhile, each surface of the first lens 810, the third lens 830, the fourth lens 840, the sixth lens 860, the seventh lens 870, and the eighth lens 880 may have the coefficient of the aspherical surface, as illustrated in Table 24. For example, the object-side surfaces and image-side surfaces of the first lens 810, the third lens 830, the fourth lens 840, the sixth lens 860, the seventh lens 870, and the eighth lens 880 may be all the aspherical surfaces.

ninth example embodiment of the present disclosure has the first total focal length; and FIG. 34 is a view illustrating a configuration of the lens in the case that the optical imaging system according to the ninth example embodiment of the present disclosure has the second total focal length.

An optical imaging system 900 according to the ninth example embodiment of the present disclosure may include the first lens group G1, the second lens group G2, and the third lens group G3.

The first lens group G1 may include a first lens 910 and a second lens 920; the second lens group G2 may include a third lens 930, a fourth lens 940, a fifth lens 950, and a sixth lens 960; and the third lens group G3 may include a seventh lens 970 and an eighth lens 980.

In addition, the optical imaging system may further include a filter 990 and the image sensor IS.

The optical imaging system 900 according to the ninth example embodiment of the present disclosure may form the

TABLE 24

|  | S4 | S5 | S8 | S9 | S10 | S11 |
|---|---|---|---|---|---|---|
| Conic constant K | 59.637026 | −40.15146 | 0.2781084 | −99 | 99.000001 | 99 |
| 4th coefficient A | −4.829E−04 | 2.249E−03 | 9.063E−05 | 1.113E−03 | 5.536E−04 | 2.191E−03 |
| 6th coefficient B | 1.483E−04 | −1.252E−04 | 2.678E−05 | −4.196E−06 | 1.310E−05 | −2.680E−04 |
| 8th coefficient C | 4.264E−05 | 4.035E−05 | −1.370E−05 | −2.184E−06 | −1.526E−04 | −4.630E−04 |
| 10th coefficient D | −3.796E−05 | −2.639E−05 | 1.171E−06 | −1.316E−06 | −2.008E−05 | 8.244E−05 |
| 12th coefficient E | 1.157E−05 | 8.300E−06 | −6.986E−08 | 6.189E−08 | 2.700E−05 | 1.609E−05 |
| 14th coefficient F | −1.897E−06 | −1.392E−06 | 0.000E+00 | 0.000E+00 | −7.109E−06 | −7.556E−06 |
| 16th coefficient G | 1.777E−07 | 1.314E−07 | 0.000E+00 | 0.000E+00 | 8.916E−07 | 1.098E−06 |
| 18th coefficient H | −8.980E−09 | −6.627E−09 | 0.000E+00 | 0.000E+00 | −5.658E−08 | −7.394E−08 |
| 20th coefficient J | 1.905E−10 | 1.392E−10 | 0.000E+00 | 0.000E+00 | 1.473E−09 | 1.967E−09 |

|  | S14 | S15 | S16 | S17 | S18 | S19 |
|---|---|---|---|---|---|---|
| Conic constant K | 99 | −4.926851 | −0.490063 | −70.2403 | −76.18155 | −99 |
| 4th coefficient A | 7.573E−03 | 4.857E−03 | 4.833E−03 | −2.077E−02 | −3.727E−02 | 9.933E−05 |
| 6th coefficient B | −2.404E−03 | −1.829E−03 | −1.070E−03 | 1.326E−02 | 1.414E−02 | −7.373E−03 |
| 8th coefficient C | 6.382E−04 | 9.041E−04 | 1.790E−03 | −5.220E−03 | −5.002E−03 | 5.791E−03 |
| 10th coefficient D | −3.669E−04 | −5.005E−04 | −1.282E−03 | 1.790E−03 | 2.380E−03 | −2.499E−03 |
| 12th coefficient E | 1.298E−04 | 1.687E−04 | 5.315E−04 | −5.855E−04 | −1.335E−03 | 5.979E−04 |
| 14th coefficient F | −2.516E−05 | −3.369E−05 | −1.366E−04 | 1.520E−04 | 4.929E−04 | −6.848E−05 |
| 16th coefficient G | 2.676E−06 | 3.954E−06 | 2.159E−05 | −2.562E−05 | −1.031E−04 | 5.693E−07 |
| 18th coefficient H | −1.441E−07 | −2.530E−07 | −1.923E−06 | 2.412E−06 | 1.133E−05 | 6.229E−07 |
| 20th coefficient J | 3.016E−09 | 6.859E−09 | 7.392E−08 | −9.617E−08 | −5.126E−07 | −4.214E−08 |

Figure 31:
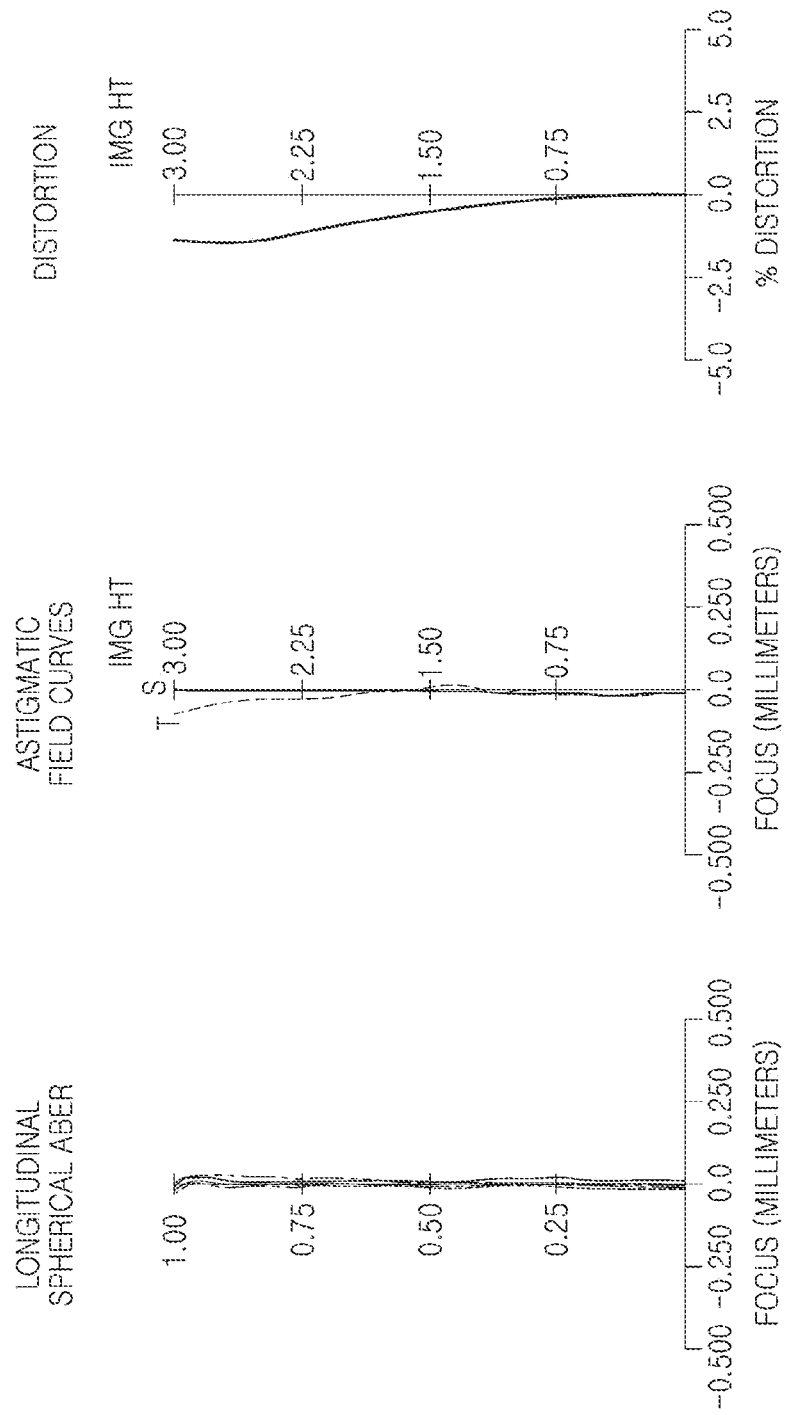
FIG. 31 presents graphs having curves representing aberration characteristics of the optical imaging system illustrated in FIG. 29.
Figure 32:
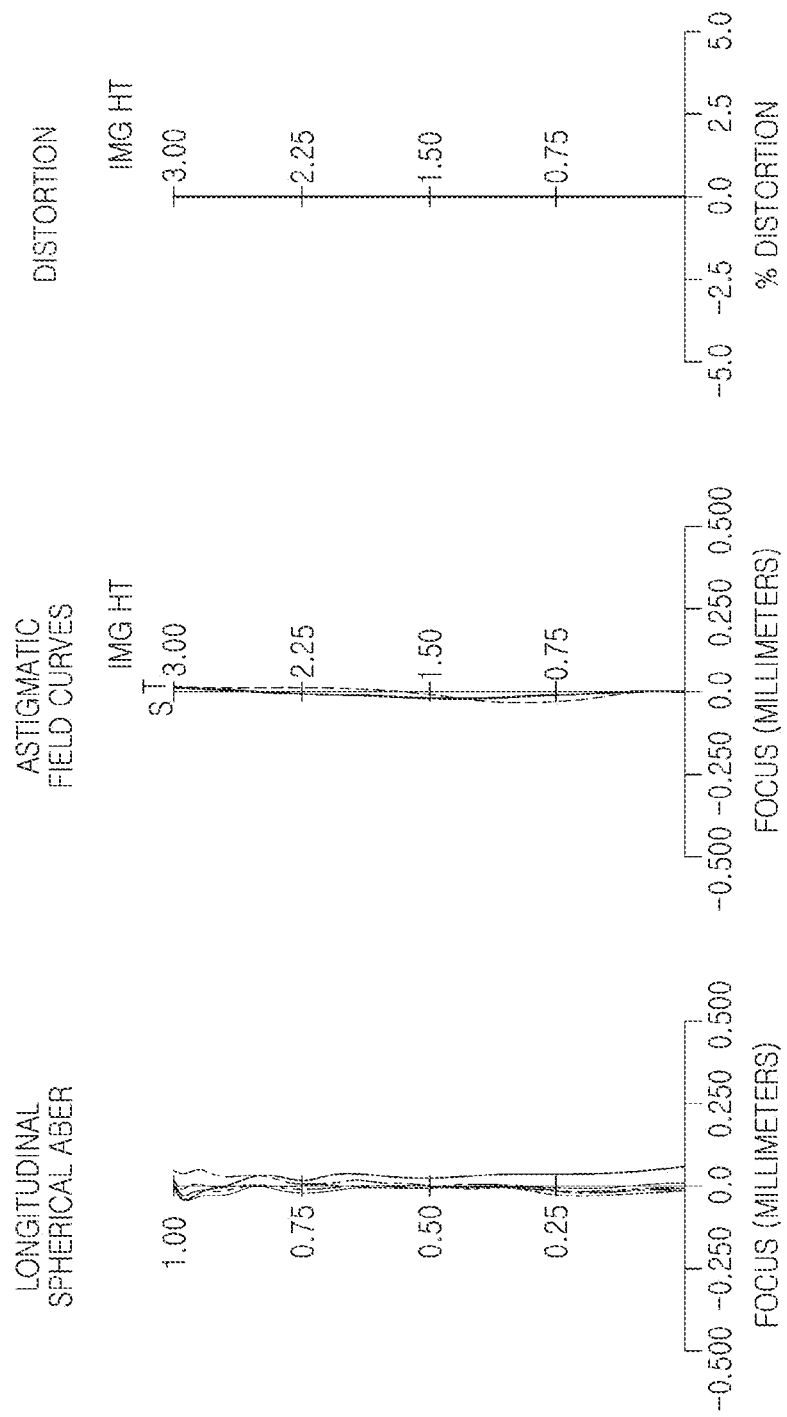
FIG. 32 presents graphs having curves representing aberration characteristics of the optical imaging system illustrated in FIG. 30.

In addition, the optical imaging system configured as described above may have aberration characteristics illustrated in FIGS. 31 and 32.

An optical imaging system according to a ninth example embodiment of the present disclosure is described with reference to FIGS. 33 through 36.

Figure 33:
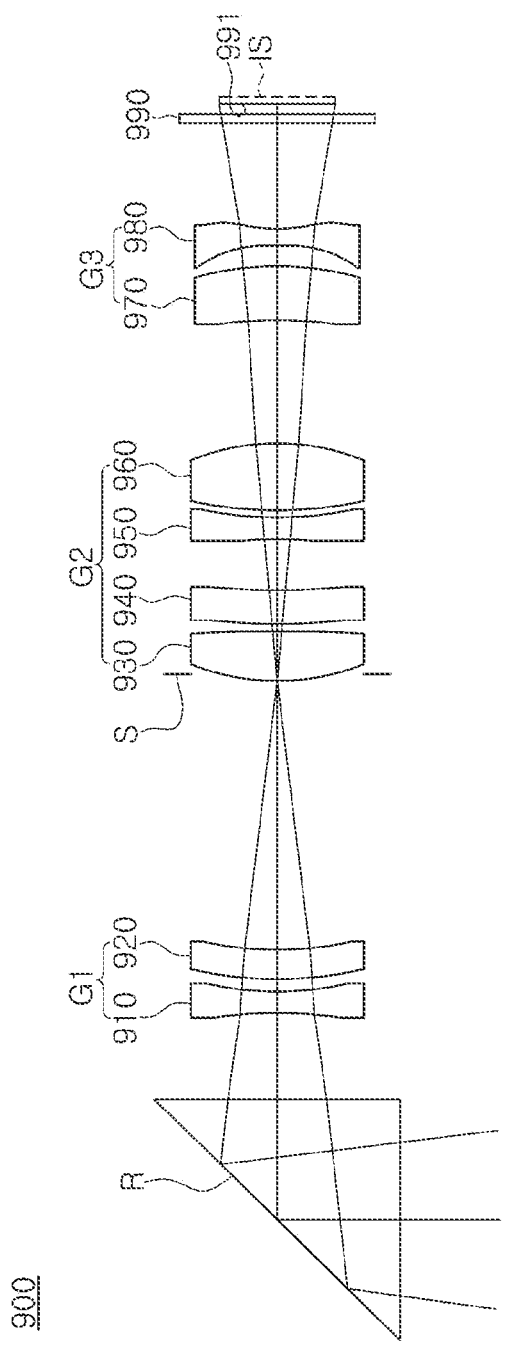
FIG. 33 is a view illustrating a configuration of the lens in the case that an optical imaging system according to a ninth example embodiment of the present disclosure has the first total focal length.

FIG. 33 is a view illustrating a configuration of the lens in the case that the optical imaging system according to the focus on an imaging plane 991. The imaging plane 991 may indicate the surface on which the focus is formed by the optical imaging system. For example, the imaging plane 991 may indicate one surface of the image sensor IS, on which light is received.

In addition, the aperture S may be disposed between the first lens group G1 and the second lens group G2. For example, the aperture S may be disposed between the second lens 920 and the third lens 930.

In addition, the optical imaging system may further include the reflecting member R disposed in front of the first lens 910 and having the reflecting surface on which the optical path is changed. In the ninth example embodiment of the present disclosure, the reflecting member R may be the prism or the mirror.

Light incident on the reflecting member R may be bent by the reflecting member R, and may pass through the first lens group G1 to the third lens group G3. For example, light incident on the reflecting member R along the first optical axis may be bent toward the second optical axis (for example, the optical axis) perpendicular to the first optical axis.

At least one of the first lens group G1 to the third lens group G3 may be moved to change the total focal length of the optical imaging system. For example, the space between the first lens group G1 and the second lens group G2 may be changed as the first lens group G1 is fixed and the second lens group G2 is moved along the optical axis.

In addition, the space between the second lens group G2 and the third lens group G3 may be changed, and a space between the third lens group G3 and the imaging plane 991 may be changed, as the second lens group G2 and the third lens group G3 are respectively moved along the optical axis.

Here, 'space' may indicate the distance between two members in the optical axis direction.

Table 25 illustrates characteristics of each lens (e.g., radius of curvature, thickness of the lens or distance between the lenses, refractive index, Abbe number or focal length).

D1 may indicate a distance between the second lens 920 and the third lens 930 in the optical axis direction, D2 may indicate a distance between the sixth lens 960 and the seventh lens 970 in the optical axis direction, and D3 may indicate a distance between the eighth lens 980 and the filter 990 in the optical axis direction.

The space between the first lens group G1 and the second lens group G2 in the first position may be different from the space between the first lens group G1 and the second lens group G2 in the second position. For example, the first lens group G1 and the second lens group G2 may be positioned relatively distantly from each other in the first position, and the first lens group G1 and the second lens group G2 may be positioned relatively close to each other in the second position.

In addition, the space between the second lens group G2 and the third lens group G3 in the first position may be different from the space between the second lens group G2 and the third lens group G3 in the second position. For example, the second lens group G2 and the third lens group G3 may be positioned relatively distantly from each other in the first position, and the second lens group G2 and the third lens group G3 may be positioned relatively close to each other in the second position.

The space between the first lens group G1 and the second lens group G2 and the space between the second lens group G2 and the third lens group G3 may be changed, thus changing the total focal length of the optical imaging system, and adjusting the focus.

TABLE 25

| Surface no. | Item | Radius of curvature | Thickness or distance | Refractive index | Abbe no. | Effective diameter | Focal length |
|---|---|---|---|---|---|---|---|
| S1 | Prism | Infinity | 3.600 | 1.717 | 29.5 | 5.800 | |
| S2 | | Infinity | −3.600 | 1.717 | 29.5 | 5.800 | |
| S3 | | Infinity | −2.500 | | | 5.800 | |
| S4 | First lens | −23.325 | 0.650 | 1.544 | 56 | 5.600 | −12.828 |
| S5 | | 10.122 | 0.355 | | | 5.542 | |
| S6 | Second lens | 9.356 | 0.900 | 1.846 | 23.7 | 5.560 | 31.713 |
| S7 | | 13.651 | D1 | | | 5.525 | |
| S8 | Third lens | 7.01503 | 1.450 | 1.497 | 81.5 | 5.760 | 11.634 |
| S9 | | −31.15917 | 0.250 | | | 5.700 | |
| S10 | Fourth lens | 26.27557 | 1.000 | 1.544 | 56 | 5.403 | 135.672 |
| S11 | | 40.15097 | 1.460 | | | 5.225 | |
| S12 | Fifth lens | −55.24721 | 0.650 | 1.846 | 23.7 | 4.931 | −12.099 |
| S13 | | 12.79832 | 0.220 | | | 4.858 | |
| S14 | Sixth lens | 11.80735 | 2.000 | 1.535 | 56 | 4.912 | 7.775 |
| S15 | | −6.07851 | D2 | | | 4.860 | |
| S16 | Seventh lens | −8.82365 | 1.565 | 1.66 | 20.4 | 3.900 | 21.582 |
| S17 | | −5.864 | 0.628 | | | 4.012 | |
| S18 | Eighth lens | −5.24884 | 0.600 | 1.535 | 56 | 3.947 | −7.416 |
| S19 | | 17.17373 | D3 | | | 4.228 | |
| S20 | Filter | Infinity | 0.210 | 1.516 | 64.1 | 5.541 | |
| S21 | | Infinity | 0.354 | | | 5.561 | |
| S22 | Imaging plane | Infinity | | | | 5.612 | |

TABLE 26

| | First position | Second position |
|---|---|---|
| D1 | 7.932 | 0.850 |
| D2 | 3.624 | 2.000 |
| D3 | 3.035 | 11.74 |

The first position may indicate the relative positions of the first lens group G1 to the third lens group G3 in the case that the optical imaging system has the first total focal length fL, and the second position may indicate the relative positions of the first lens group G1 to the third lens group G3 in the case that the optical imaging system has the second total focal length fH.

The first total focal length fL of the optical imaging system in the first position may be 10.15 mm, and Fno_L may be 2.8.

The second total focal length fH of the optical imaging system in the second position may be 22.7 mm, and Fno_H may be 4.6.

Fno_L may indicate the F-number of the optical imaging system in the first position, and Fno_H may indicate the F-number of the optical imaging system in the second position.

TTL of the optical imaging system may be 26.882 mm. TTL may indicate a distance from an object-side surface of the first lens 910 to the imaging plane 991 in the optical axis direction.

A diagonal length of the imaging plane 991 may be 5.612 mm.

In the ninth example embodiment of the present disclosure, the first lens group G1 may generally have negative refractive power. The focal length of the first lens group G1 may be −21.013 mm.

The second lens group G2 may generally have positive refractive power. The focal length of the second lens group G2 may be 8.406 mm.

The third lens group G3 may generally have negative refractive power. The focal length of the third lens group G3 may be −10.674 mm.

The first lens 910 may have negative refractive power, and a concave first surface and a concave second surface.

The second lens 920 may have positive refractive power, and a convex first surface and a concave second surface.

The third lens 930 may have positive refractive power, and a convex first surface and a convex second surface.

The fourth lens 940 may have positive refractive power, and a convex first surface and a concave second surface.

The fifth lens 950 may have negative refractive power, and a concave first surface and a concave second surface.

The sixth lens 960 may have positive refractive power, and a convex first surface and a convex second surface.

The seventh lens 970 may have positive refractive power, and a concave first surface and a convex second surface.

The eighth lens 980 may have negative refractive power, and a concave first surface and a concave second surface.

Meanwhile, each surface of the first lens 910, the third lens 930, the fourth lens 940, the sixth lens 960, the seventh lens 970, and the eighth lens 980 may have the coefficient of the aspherical surface, as illustrated in Table 27. For example, the object-side surfaces and image-side surfaces of the first lens 910, the third lens 930, the fourth lens 940, the sixth lens 960, the seventh lens 970, and the eighth lens 980 may be all the aspherical surfaces.

TABLE 27

| | S4 | S5 | S8 | S9 | S10 | S11 |
|---|---|---|---|---|---|---|
| Conic constant K | 0.350713 | −0.214767 | −0.041435 | −99 | 0 | −0.321877 |
| $4^{th}$ coefficient A | −6.936E−05 | −1.621E−05 | −1.587E−05 | 8.742E−05 | −5.772E−04 | −6.150E−05 |
| $6^{th}$ coefficient B | 1.536E−05 | 1.705E−05 | 1.378E−06 | 6.115E−06 | −1.645E−05 | −8.985E−06 |
| $8^{th}$ coefficient C | −3.451E−07 | −3.407E−07 | −3.388E−07 | 9.493E−07 | −1.661E−07 | 0.000E+00 |
| $10^{th}$ coefficient D | 0.000E+00 | 0.000E+00 | 8.367E−08 | −1.068E−07 | 0.000E+00 | 0.000E+00 |
| $12^{th}$ coefficient E | 0.000E+00 | 0.000E+00 | −9.522E−09 | −2.272E−09 | 0.000E+00 | 0.000E+00 |
| $14^{th}$ coefficient F | 0.000E+00 | 0.000E+00 | 0.000E+00 | 0.000E+00 | 0.000E+00 | 0.000E+00 |
| $16^{th}$ coefficient G | 0.000E+00 | 0.000E+00 | 0.000E+00 | 0.000E+00 | 0.000E+00 | 0.000E+00 |
| $18^{th}$ coefficient H | 0.000E+00 | 0.000E+00 | 0.000E+00 | 0.000E+00 | 0.000E+00 | 0.000E+00 |
| $20^{th}$ coefficient J | 0.000E+00 | 0.000E+00 | 0.000E+00 | 0.000E+00 | 0.000E+00 | 0.000E+00 |

| | S14 | S15 | S16 | S17 | S18 | S19 |
|---|---|---|---|---|---|---|
| Conic constant K | 1.7023673 | −0.815333 | −19.52624 | −15.41276 | −24.99483 | −99 |
| $4^{th}$ coefficient A | 1.979E−04 | 6.893E−04 | 2.859E−03 | 7.079E−04 | −2.352E−02 | −7.739E−03 |
| $6^{th}$ coefficient B | −2.680E−05 | −3.511E−05 | −1.464E−04 | −4.151E−04 | 2.562E−03 | −1.584E−03 |
| $8^{th}$ coefficient C | 7.864E−06 | 7.898E−06 | 1.033E−05 | −3.018E−05 | −5.633E−04 | 1.186E−03 |
| $10^{th}$ coefficient D | 0.000E+00 | 0.000E+00 | 1.187E−06 | 1.601E−05 | 1.415E−04 | −2.977E−04 |
| $12^{th}$ coefficient E | 0.000E+00 | 0.000E+00 | 0.000E+00 | 0.000E+00 | −9.543E−06 | 4.149E−05 |
| $14^{th}$ coefficient F | 0.000E+00 | 0.000E+00 | 0.000E+00 | 0.000E+00 | 0.000E+00 | −2.361E−06 |
| $16^{th}$ coefficient G | 0.000E+00 | 0.000E+00 | 0.000E+00 | 0.000E+00 | 0.000E+00 | 0.000E+00 |
| $18^{th}$ coefficient H | 0.000E+00 | 0.000E+00 | 0.000E+00 | 0.000E+00 | 0.000E+00 | 0.000E+00 |
| $20^{th}$ coefficient J | 0.000E+00 | 0.000E+00 | 0.000E+00 | 0.000E+00 | 0.000E+00 | 0.000E+00 |

Figure 35:
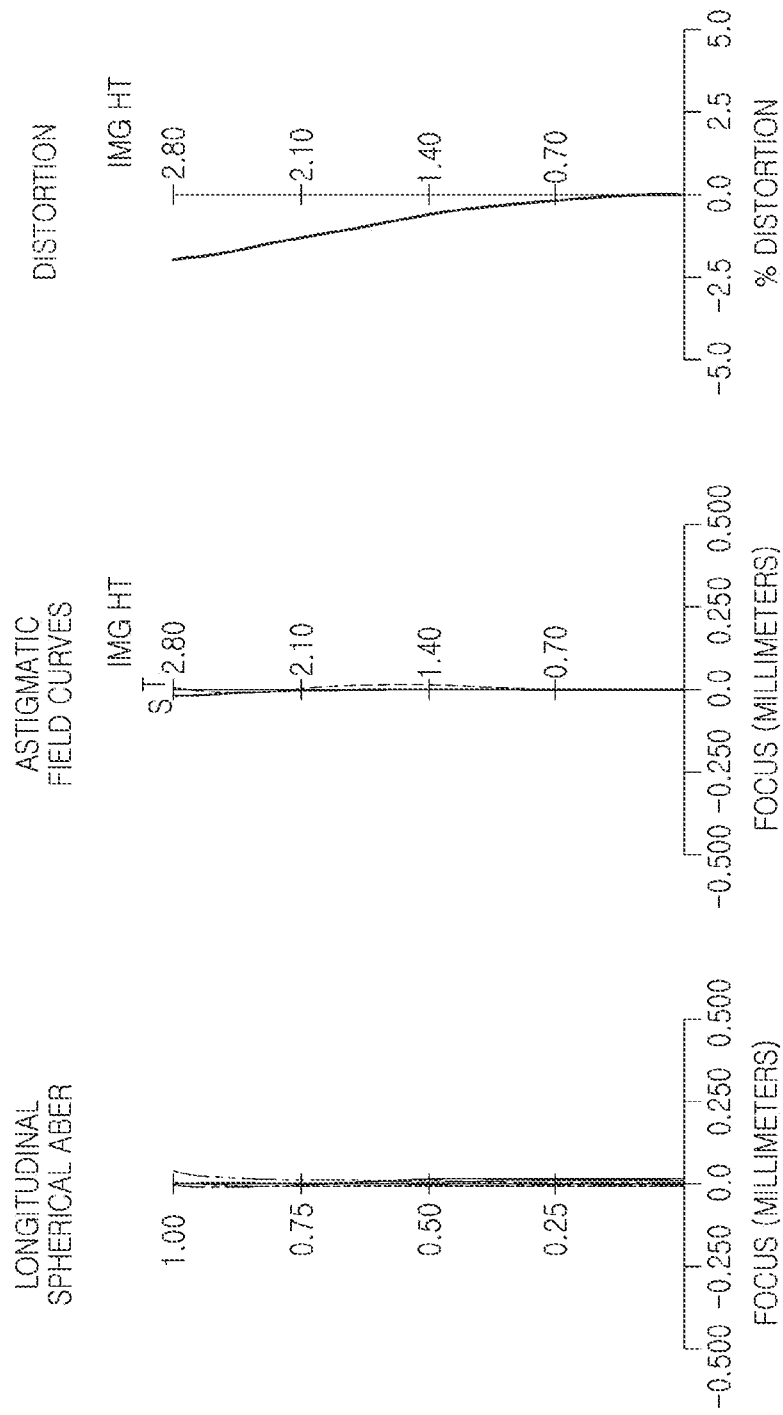
FIG. 35 presents graphs having curves representing aberration characteristics of the optical imaging system illustrated in FIG. 33.
Figure 36:
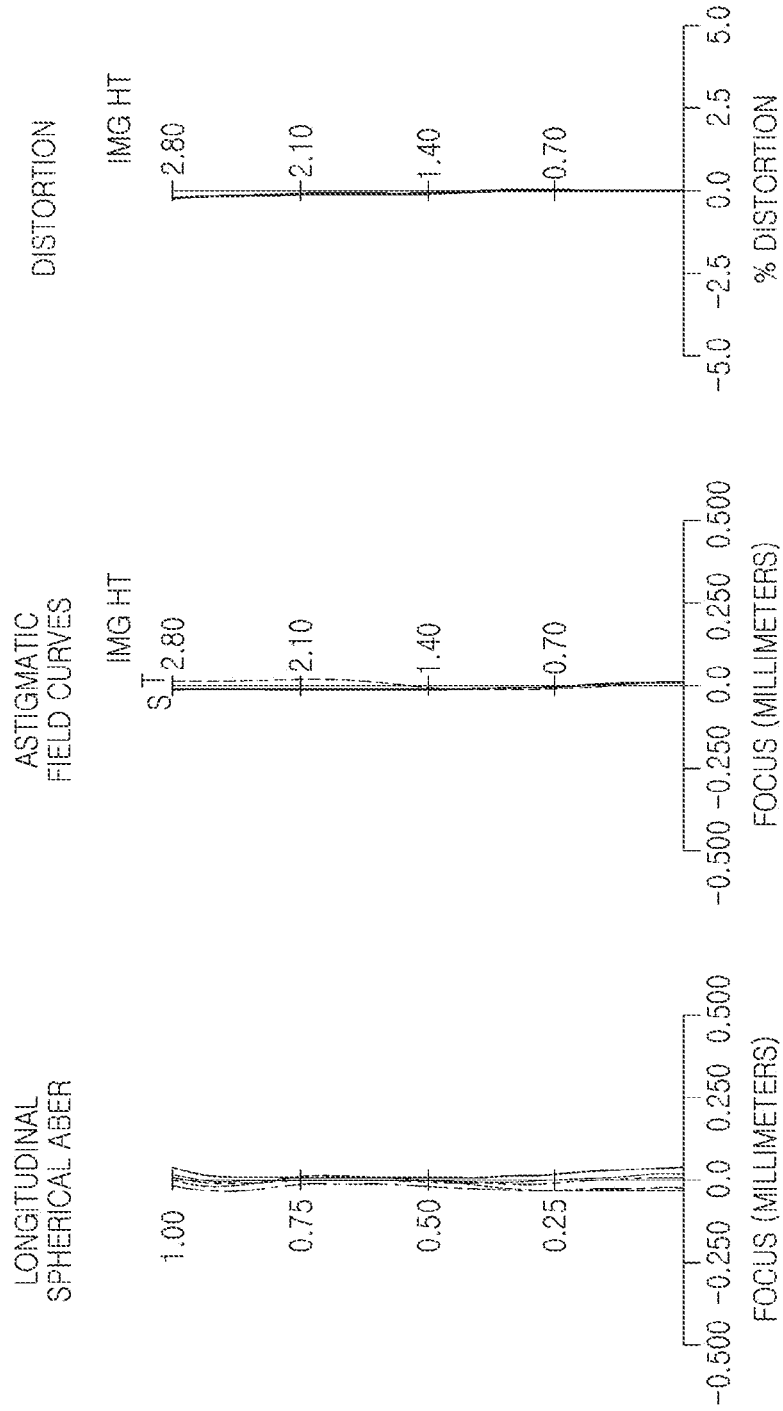
FIG. 36 presents graphs having curves representing aberration characteristics of the optical imaging system illustrated in FIG. 34.

In addition, the optical imaging system configured as described above may have aberration characteristics illustrated in FIGS. 35 and 36.

An optical imaging system according to a tenth example embodiment of the present disclosure is described with reference to FIGS. 37 through 40.

Figure 37:
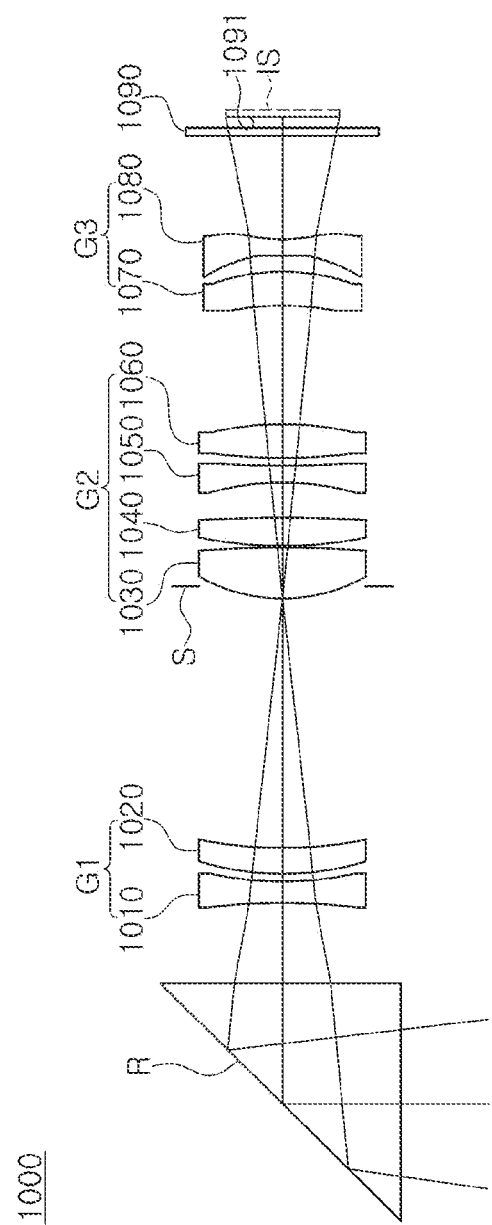
FIG. 37 is a view illustrating a configuration of the lens in the case that an optical imaging system according to a tenth example embodiment of the present disclosure has the first total focal length.
Figure 38:
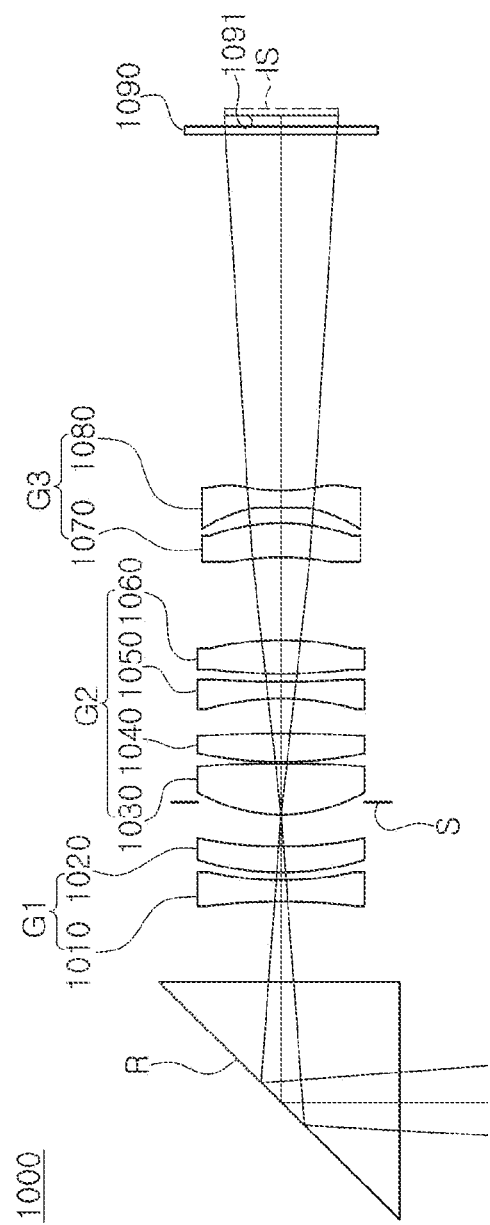
FIG. 38 is a view illustrating a configuration of the lens in the case that the optical imaging system according to the tenth example embodiment of the present disclosure has the second total focal length.

FIG. 37 is a view illustrating a configuration of the lens in the case that the optical imaging system according to the tenth example embodiment of the present disclosure has the first total focal length; and FIG. 38 is a view illustrating a configuration of the lens in the case that the optical imaging system according to the tenth example embodiment of the present disclosure has the second total focal length.

An optical imaging system 1000 according to the tenth example embodiment of the present disclosure may include the first lens group G1, the second lens group G2, and the third lens group G3.

The first lens group G1 may include a first lens 1010 and a second lens 1020; the second lens group G2 may include a third lens 1030, a fourth lens 1040, a fifth lens 1050, and a sixth lens 1060; and the third lens group G3 may include a seventh lens 1070 and an eighth lens 1080.

In addition, the optical imaging system may further include a filter 1090 and the image sensor IS.

The optical imaging system 1000 according to the tenth example embodiment of the present disclosure may form the focus on an imaging plane 1091. The imaging plane 1091 may indicate the surface on which the focus is formed by the optical imaging system. For example, the imaging plane 1091 may indicate one surface of the image sensor IS, on which light is received.

In addition, the aperture S may be disposed between the first lens group G1 and the second lens group G2. For example, the aperture S may be disposed between the second lens 1020 and the third lens 1030.

In addition, the optical imaging system may further include the reflecting member R disposed in front of the first lens 1010 and having the reflecting surface on which the optical path is changed. In the tenth example embodiment of the present disclosure, the reflecting member R may be the prism or the mirror.

Light incident on the reflecting member R may be bent by the reflecting member R, and may pass through the first lens group G1 to the third lens group G3. For example, light incident on the reflecting member R along the first optical axis may be bent toward the second optical axis (for example, the optical axis) perpendicular to the first optical axis.

At least one of the first lens group G1 to the third lens group G3 may be moved to change the total focal length of the optical imaging system. For example, the space between the first lens group G1 and the second lens group G2 may be changed as the first lens group G1 is fixed and the second lens group G2 is moved along the optical axis.

In addition, the space between the second lens group G2 and the third lens group G3 may be changed, and a space between the third lens group G3 and the imaging plane 1091 may be changed, as the second lens group G2 and the third lens group G3 are respectively moved along the optical axis.

Here, 'space' may indicate the distance between two members in the optical axis direction.

Table 28 illustrates the characteristics (e.g., radius of curvature) of each lens, the thicknesses of the lens or the distance between the lenses, and the refractive index, Abbe number, effective diameter, and focal length of the lens.

TABLE 28

| Surface no. | Item | Radius of curvature | Thickness or distance | Refractive index | Abbe no. | Effective diameter | Focal length |
|---|---|---|---|---|---|---|---|
| S1 | Prism | Infinity | 3.600 | 1.717 | 29.5 | 5.800 | |
| S2 | | Infinity | −3.600 | 1.717 | 29.5 | 5.800 | |
| S3 | | Infinity | −2.500 | | | 5.800 | |
| S4 | First lens | −23.862 | 0.620 | 1.544 | 56 | 5.400 | −13.168 |
| S5 | | 10.398 | 0.220 | | | 5.354 | |
| S6 | Second lens | 8.329 | 0.806 | 1.846 | 23.7 | 5.360 | 36.506 |
| S7 | | 10.854 | 7.538 | | | 5.298 | |
| S8 | Third lens | 4.88593 | 1.480 | 1.497 | 81.5 | 5.500 | 9.620 |
| S9 | | −235.19999 | 0.100 | | | 5.460 | |
| S10 | Fourth lens | 11.80583 | 0.876 | 1.544 | 56 | 5.334 | 25.314 |
| S11 | | 78.42016 | 1.000 | | | 5.206 | |
| S12 | Fifth lens | −9.97067 | 0.580 | 1.846 | 23.7 | 4.786 | −10.688 |
| S13 | | 112.52125 | 0.220 | | | 4.739 | |
| S14 | Sixth lens | 26.14151 | 1.000 | 1.535 | 56 | 4.720 | 11.858 |
| S15 | | −8.30748 | 3.600 | | | 4.860 | |
| S16 | Seventh lens | −6.14597 | 1.051 | 1.66 | 20.4 | 3.900 | 17.525 |
| S17 | | −4.307 | 0.480 | | | 3.973 | |
| S18 | Eighth lens | −7.16836 | 0.580 | 1.535 | 56 | 3.929 | −7.359 |
| S19 | | 9.06035 | 3.033 | | | 4.236 | |
| S20 | Filter | Infinity | 0.210 | 1.516 | 64.1 | 5.521 | |
| S21 | | Infinity | 0.357 | | | 5.541 | |
| S22 | Imaging plane | Infinity | | | | 5.603 | |

TABLE 29

|    | First position | Second position |
|----|----------------|-----------------|
| D1 | 7.538          | 0.850           |
| D2 | 3.600          | 2.000           |
| D3 | 3.033          | 11.322          |

D1 may indicate a distance between the second lens 1020 and the third lens 1030 in the optical axis direction, D2 may indicate a distance between the sixth lens 1060 and the seventh lens 1070 in the optical axis direction, and D3 may indicate a distance between the eighth lens 1080 and the filter 1090 in the optical axis direction.

The space between the first lens group G1 and the second lens group G2 in the first position may be different from the space between the first lens group G1 and the second lens group G2 in the second position. For example, the first lens group G1 and the second lens group G2 may be positioned relatively distantly from each other in the first position, and the first lens group G1 and the second lens group G2 may be positioned relatively close to each other in the second position.

In addition, the space between the second lens group G2 and the third lens group G3 in the first position may be different from the space between the second lens group G2 and the third lens group G3 in the second position. For example, the second lens group G2 and the third lens group G3 may be positioned relatively distantly from each other in the first position, and the second lens group G2 and the third lens group G3 may be positioned relatively close to each other in the second position.

The space between the first lens group G1 and the second lens group G2 and the space between the second lens group G2 and the third lens group G3 may be changed, thus changing the total focal length of the optical imaging system, and adjusting the focus.

The first position may indicate the relative positions of the first lens group G1 to the third lens group G3 in the case that the optical imaging system has the first total focal length fL, and the second position may indicate the relative positions of the first lens group G1 to the third lens group G3 in the case that the optical imaging system has the second total focal length fH.

The first total focal length fL of the optical imaging system in the first position may be 10.15 mm, and Fno_L may be 2.9.

The second total focal length fH of the optical imaging system in the second position may be 22.7 mm, and Fno_H may be 4.8.

Fno_L may indicate the F-number of the optical imaging system in the first position, and Fno_H may indicate the F-number of the optical imaging system in the second position.

TTL of the optical imaging system may be 23.751 mm. TTL may indicate a distance from an object-side surface of the first lens 1010 to the imaging plane 1091 in the optical axis direction.

A diagonal length of the imaging plane 1091 may be 5.603 mm.

In the tenth example embodiment of the present disclosure, the first lens group G1 may generally have negative refractive power. The focal length of the first lens group G1 may be −19.847 mm.

The second lens group G2 may generally have positive refractive power. The focal length of the second lens group G2 may be 7.890 mm.

The third lens group G3 may generally have negative refractive power. The focal length of the third lens group G3 may be −11.996 mm.

The first lens 1010 may have negative refractive power, and a concave first surface and a concave second surface.

The second lens 1020 may have positive refractive power, and a convex first surface and a concave second surface.

The third lens 1030 may have positive refractive power, and a convex first surface and a convex second surface.

The fourth lens 1040 may have positive refractive power, and a convex first surface and a concave second surface.

The fifth lens 1050 may have negative refractive power, and a concave first surface and a concave second surface.

The sixth lens 1060 may have positive refractive power, and a convex first surface and a convex second surface.

The seventh lens 1070 may have positive refractive power, and a concave first surface and a convex second surface.

The eighth lens 1080 may have negative refractive power, and a concave first surface and a concave second surface.

Meanwhile, each surface of the first lens 1010, the third lens 1030, the fourth lens 1040, the sixth lens 1060, the seventh lens 1070, and the eighth lens 1080 may have the coefficient of the aspherical surface, as illustrated in Table 30. For example, the object-side surfaces and image-side surfaces of the first lens 1010, the third lens 1030, the fourth lens 1040, the sixth lens 1060, the seventh lens 1070, and the eighth lens 1080 may be all the aspherical surfaces.

TABLE 30

|                          | S4         | S5         | S8         | S9         | S10        | S11        |
|--------------------------|------------|------------|------------|------------|------------|------------|
| Conic constant K         | 26.999618  | −1.887399  | −0.17031   | −99        | 0          | −99        |
| $4^{th}$ coefficient A   | −2.412E−04 | −1.927E−04 | −1.399E−04 | 1.876E−04  | −5.869E−04 | −9.592E−04 |
| $6^{th}$ coefficient B   | 4.838E−05  | 4.702E−05  | −2.557E−05 | 6.943E−06  | 2.211E−05  | −1.421E−04 |
| $8^{th}$ coefficient C   | −7.961E−07 | −1.240E−06 | −8.140E−06 | 2.670E−06  | 1.031E−05  | 0.000E+00  |
| $10^{th}$ coefficient D  | 0.000E+00  | 0.000E+00  | 1.767E−07  | −7.669E−07 | 0.000E+00  | 0.000E+00  |
| $12^{th}$ coefficient E  | 0.000E+00  | 0.000E+00  | −5.874E−08 | 3.859E−08  | 0.000E+00  | 0.000E+00  |
| $14^{th}$ coefficient F  | 0.000E+00  | 0.000E+00  | 0.000E+00  | 0.000E+00  | 0.000E+00  | 0.000E+00  |
| $16^{th}$ coefficient G  | 0.000E+00  | 0.000E+00  | 0.000E+00  | 0.000E+00  | 0.000E+00  | 0.000E+00  |

TABLE 30-continued

| | | | | | | |
|---|---|---|---|---|---|---|
| 18th coefficient H | 0.000E+00 | 0.000E+00 | 0.000E+00 | 0.000E+00 | 0.000E+00 | 0.000E+00 |
| 20th coefficient J | 0.000E+00 | 0.000E+00 | 0.000E+00 | 0.000E+00 | 0.000E+00 | 0.000E+00 |

| | S14 | S15 | S16 | S17 | S18 | S19 |
|---|---|---|---|---|---|---|
| Conic constant K | 40.558455 | −7.682722 | −14.45329 | −11.43108 | −26.48213 | −99 |
| 4th coefficient A | 1.223E−03 | 2.432E−03 | 4.962E−03 | −6.733E−04 | −2.899E−02 | −1.379E−02 |
| 6th coefficient B | −2.212E−04 | 1.503E−06 | −3.213E−04 | 1.026E−04 | 2.019E−03 | −6.785E−04 |
| 8th coefficient C | −3.845E−07 | 1.328E−05 | 6.607E−05 | −1.155E−04 | −2.097E−04 | 1.171E−03 |
| 10th coefficient D | 0.000E+00 | 0.000E+00 | −6.665E−07 | 3.503E−05 | 1.174E−04 | −3.024E−04 |
| 12th coefficient E | 0.000E+00 | 0.000E+00 | 0.000E+00 | 0.000E+00 | −9.543E−06 | 4.149E−05 |
| 14th coefficient F | 0.000E+00 | 0.000E+00 | 0.000E+00 | 0.000E+00 | 0.000E+00 | −2.361E−06 |
| 16th coefficient G | 0.000E+00 | 0.000E+00 | 0.000E+00 | 0.000E+00 | 0.000E+00 | 0.000E+00 |
| 18th coefficient H | 0.000E+00 | 0.000E+00 | 0.000E+00 | 0.000E+00 | 0.000E+00 | 0.000E+00 |
| 20th coefficient J | 0.000E+00 | 0.000E+00 | 0.000E+00 | 0.000E+00 | 0.000E+00 | 0.000E+00 |

Figure 39:
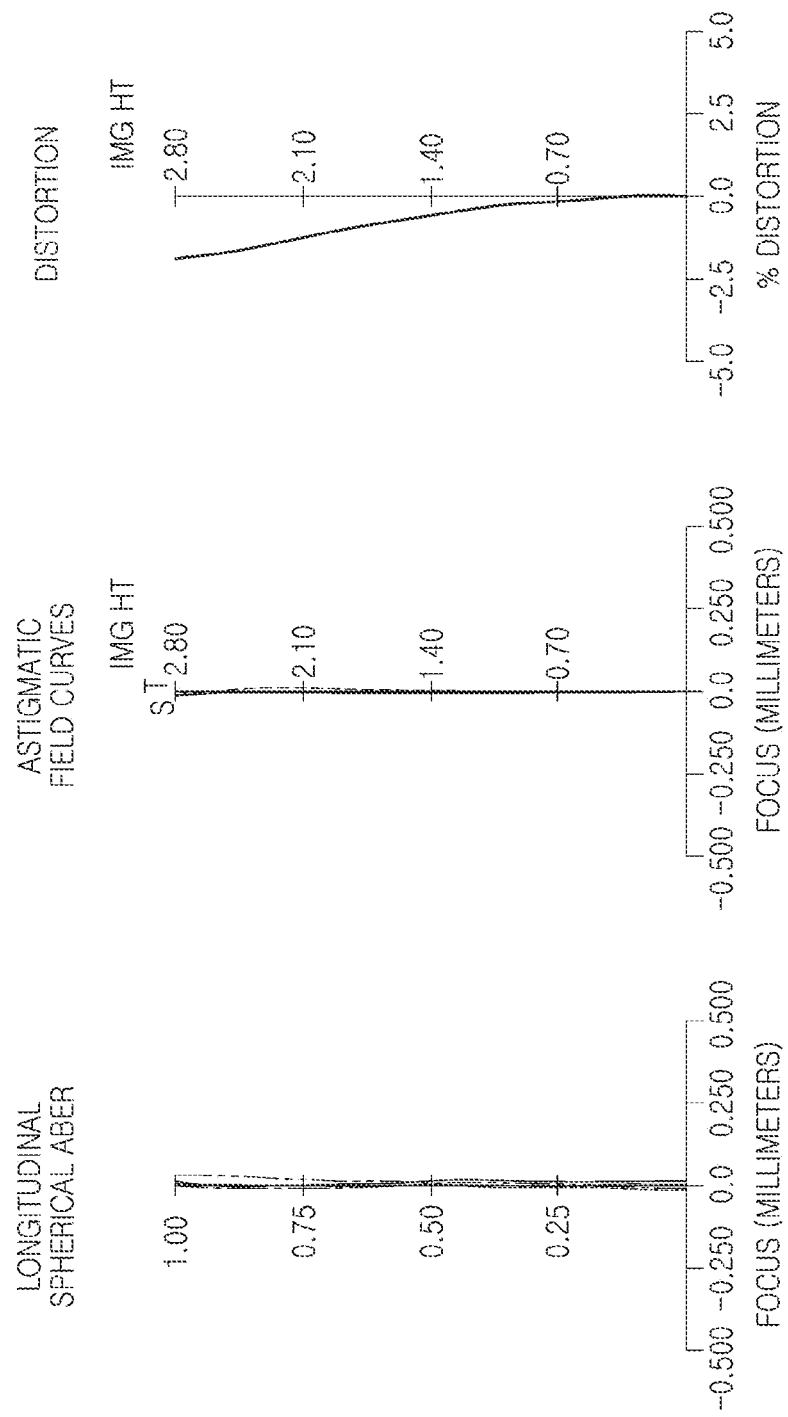
FIG. 39 presents graphs having curves representing aberration characteristics of the optical imaging system illustrated in FIG. 37.
Figure 40:
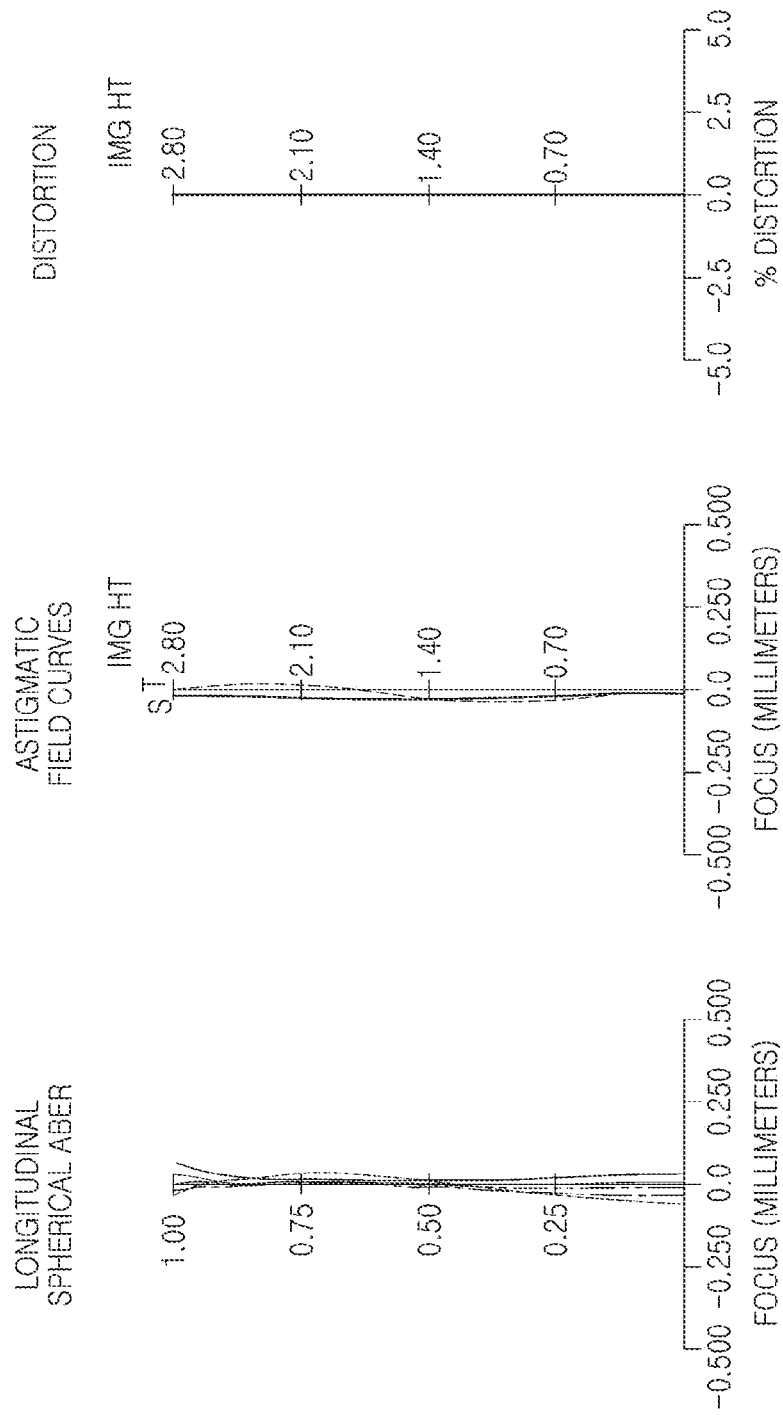
FIG. 40 presents graphs having curves representing aberration characteristics of the optical imaging system illustrated in FIG. 38.

In addition, the optical imaging system configured as described above may have aberration characteristics illustrated in FIGS. 39 and 40.

An optical imaging system according to an eleventh example embodiment is described with reference to FIGS. 41 through 44.

Figure 41:
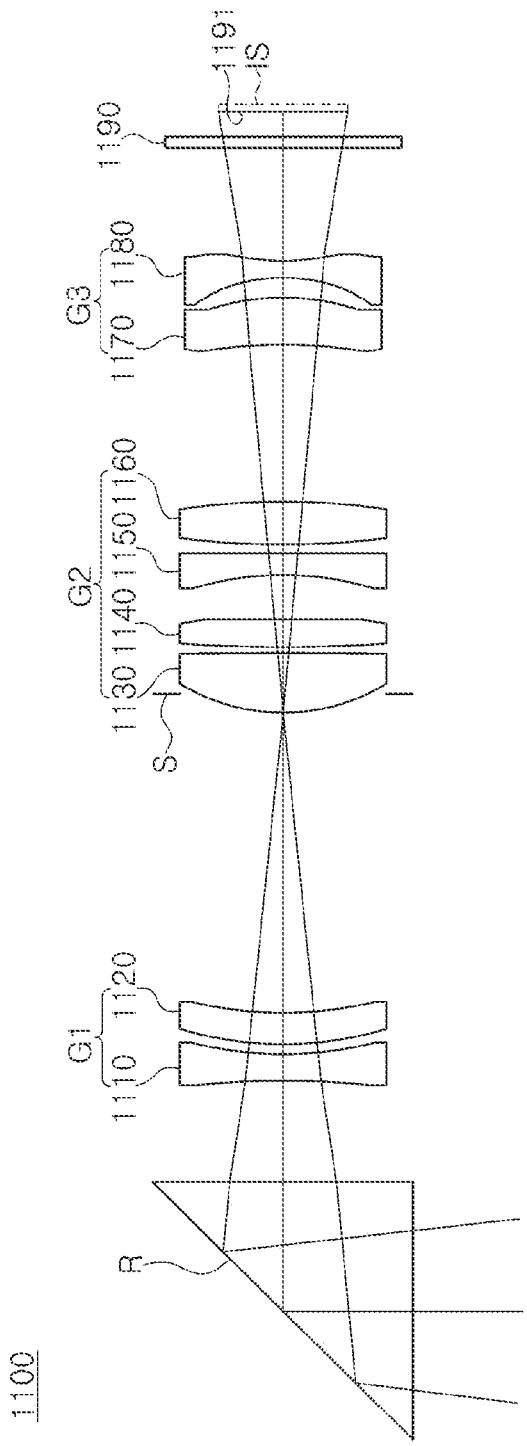
FIG. 41 is a view illustrating a configuration of the lens in the case that an optical imaging system according to an eleventh example embodiment of the present disclosure has the first total focal length.
Figure 42:
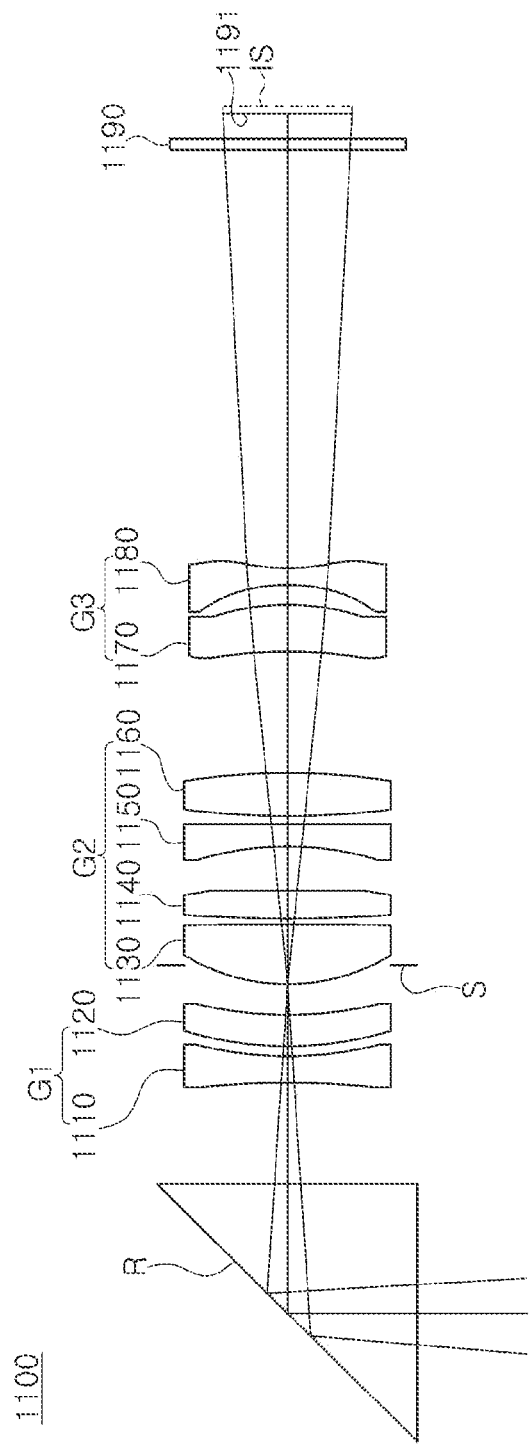
FIG. 42 is a view illustrating a configuration of the lens in the case that the optical imaging system according to the eleventh example embodiment of the present disclosure has the second total focal length.

FIG. 41 is a view illustrating a configuration of the lens in the case that the optical imaging system according to the eleventh example embodiment of the present disclosure has the first total focal length; and FIG. 42 is a view illustrating a configuration of the lens in the case that the optical imaging system according to the eleventh example embodiment of the present disclosure has the second total focal length.

An optical imaging system 1100 according to the eleventh example embodiment of the present disclosure may include the first lens group G1, the second lens group G2, and the third lens group G3.

The first lens group G1 may include a first lens 1110 and a second lens 1120; the second lens group G2 may include a third lens 1130, a fourth lens 1140, a fifth lens 1150, and a sixth lens 1160; and the third lens group G3 may include a seventh lens 1170 and an eighth lens 1180.

In addition, the optical imaging system may further include a filter 1190 and the image sensor IS.

The optical imaging system 1100 according to the eleventh example embodiment of the present disclosure may form the focus on an imaging plane 1191. The imaging plane 1191 may indicate the surface on which the focus is formed by the optical imaging system. For example, the imaging plane 1191 may indicate one surface of the image sensor IS, on which light is received.

In addition, the aperture S may be disposed between the first lens group G1 and the second lens group G2. For example, the aperture S may be disposed between the second lens 1120 and the third lens 1130.

In addition, the optical imaging system may further include the reflecting member R disposed in front of the first lens 1110 and having the reflecting surface on which the optical path is changed. In the eleventh example embodiment of the present disclosure, the reflecting member R may be the prism or the mirror.

Light incident on the reflecting member R may be bent by the reflecting member R, and may pass through the first lens group G1 to the third lens group G3. For example, light incident on the reflecting member R along the first optical axis may be bent toward the second optical axis (for example, the optical axis) perpendicular to the first optical axis.

At least one of the first lens group G1 to the third lens group G3 may be moved to change the total focal length of the optical imaging system. For example, the space between the first lens group G1 and the second lens group G2 may be changed as the first lens group G1 is fixed and the second lens group G2 is moved along the optical axis.

In addition, the space between the second lens group G2 and the third lens group G3 may be changed, and a space between the third lens group G3 and the imaging plane 1191 may be changed, as the second lens group G2 and the third lens group G3 are respectively moved along the optical axis.

Here, 'space' may indicate the distance between two members in the optical axis direction.

Table 31 illustrates the characteristics (e.g., radius of curvature) of each lens, the thicknesses of the lens or the distance between the lenses, and the refractive index, Abbe number, effective diameter, and focal length of the lens.

TABLE 31

| Surface no. | Item | Radius of curvature | Thickness or distance | Refractive index | Abbe no. | Effective diameter | Focal length |
|---|---|---|---|---|---|---|---|
| S1 | Prism | Infinity | 3.200 | 1.717 | 29.5 | 5.800 | |
| S2 | | Infinity | −3.200 | 1.717 | 29.5 | 5.800 | |
| S3 | | Infinity | −2.500 | | | 5.800 | |

TABLE 31-continued

| Surface no. | Item | Radius of curvature | Thickness or distance | Refractive index | Abbe no. | Effective diameter | Focal length |
|---|---|---|---|---|---|---|---|
| S4 | First lens | −22.325 | 0.620 | 1.544 | 56 | 4.800 | −11.947 |
| S5 | | 9.318 | 0.227 | | | 4.802 | |
| S6 | Second lens | 8.115 | 0.790 | 1.846 | 23.7 | 4.890 | 31.670 |
| S7 | | 11.067 | D1 | | | 4.797 | |
| S8 | Third lens | 4.72044 | 1.453 | 1.497 | 81.5 | 5.000 | 8.633 |
| S9 | | −43.76803 | 0.100 | | | 5.000 | |
| S10 | Fourth lens | 19.56210 | 0.754 | 1.544 | 56 | 4.883 | 31.579 |
| S11 | | −144.53533 | 1.033 | | | 4.769 | |
| S12 | Fifth lens | −8.57886 | 0.580 | 1.846 | 23.7 | 4.327 | −11.217 |
| S13 | | −83.79358 | 0.222 | | | 4.306 | |
| S14 | Sixth lens | 36.24603 | 1.000 | 1.535 | 56 | 4.277 | 13.673 |
| S15 | | −9.12137 | D2 | | | 4.200 | |
| S16 | Seventh lens | −7.46522 | 1.173 | 1.66 | 20.4 | 3.900 | 21.761 |
| S17 | | −5.244 | 0.480 | | | 3.930 | |
| S18 | Eighth lens | −7.92774 | 0.580 | 1.535 | 56 | 3.895 | −8.251 |
| S19 | | 10.30456 | D3 | | | 4.203 | |
| S20 | Filter | Infinity | 0.210 | 1.516 | 64.1 | 5.270 | |
| S21 | | Infinity | 0.643 | | | 5.289 | |
| S22 | Imaging plane | Infinity | | | | 5.408 | |

TABLE 32

| | First position | Second position |
|---|---|---|
| D1 | 7.379 | 0.850 |
| D2 | 3.860 | 2.500 |
| D3 | 2.647 | 10.536 |

D1 may indicate a distance between the second lens 1120 and the third lens 1130 in the optical axis direction, D2 may indicate a distance between the sixth lens 1160 and the seventh lens 1170 in the optical axis direction, and D3 may indicate a distance between the eighth lens 1180 and the filter 1190 in the optical axis direction.

The space between the first lens group G1 and the second lens group G2 in the first position may be different from the space between the first lens group G1 and the second lens group G2 in the second position. For example, the first lens group G1 and the second lens group G2 may be positioned relatively distantly from each other in the first position, and the first lens group G1 and the second lens group G2 may be positioned relatively close to each other in the second position.

In addition, the space between the second lens group G2 and the third lens group G3 in the first position may be different from the space between the second lens group G2 and the third lens group G3 in the second position. For example, the second lens group G2 and the third lens group G3 may be positioned relatively distantly from each other in the first position, and the second lens group G2 and the third lens group G3 may be positioned relatively close to each other in the second position.

The space between the first lens group G1 and the second lens group G2 and the space between the second lens group G2 and the third lens group G3 may be changed, thus changing the total focal length of the optical imaging system, and adjusting the focus.

The first position may indicate the relative positions of the first lens group G1 to the third lens group G3 in the case that the optical imaging system has the first total focal length fL, and the second position may indicate the relative positions of the first lens group G1 to the third lens group G3 in the case that the optical imaging system has the second total focal length fH.

The first total focal length fL of the optical imaging system in the first position may be 10.15 mm, and Fno_L may be 3.1.

The second total focal length fH of the optical imaging system in the second position may be 22.7 mm, and Fno_H may be 5.2.

Fno_L may indicate the F-number of the optical imaging system in the first position, and Fno_H may indicate the F-number of the optical imaging system in the second position.

TTL of the optical imaging system may be 23.751 mm. TTL may indicate a distance from an object-side surface of the first lens 1110 to the imaging plane 1191 in the optical axis direction.

A diagonal length of the imaging plane 1191 may be 5.408 mm.

In the eleventh example embodiment of the present disclosure, the first lens group G1 may generally have negative refractive power. The focal length of the first lens group G1 may be −18.544 mm.

The second lens group G2 may generally have positive refractive power. The focal length of the second lens group G2 may be 7.927 mm.

The third lens group G3 may generally have negative refractive power. The focal length of the third lens group G3 may be −12.589 mm.

The first lens 1110 may have negative refractive power, and a concave first surface and a concave second surface.

The second lens 1120 may have positive refractive power, and a convex first surface and a concave second surface.

The third lens 1130 may have positive refractive power, and a convex first surface and a convex second surface.

The fourth lens 1140 may have positive refractive power, and a convex first surface and a convex second surface.

The fifth lens 1150 may have negative refractive power, and a concave first surface and a convex second surface.

The sixth lens 1160 may have positive refractive power, and a convex first surface and a convex second surface.

The seventh lens 1170 may have positive refractive power, and a concave first surface and a convex second surface.

The eighth lens 1180 may have negative refractive power, and a concave first surface and a concave second surface.

Meanwhile, each surface of the first lens 1110, the third lens 1130, the fourth lens 1140, the sixth lens 1160, the seventh lens 1170, and the eighth lens 1180 may have the coefficient of the aspherical surface, as illustrated in Table 33. For example, the object-side surfaces and image-side surfaces of the first lens 1110, the third lens 1130, the fourth lens 1140, the sixth lens 1160, the seventh lens 1170, and the eighth lens 1180 may be all the aspherical surfaces.

TABLE 33

|  | S4 | S5 | S8 | S9 | S10 | S11 |
|---|---|---|---|---|---|---|
| Conic constant K | 27.898541 | −2.35064 | −0.193013 | −99 | 0 | 99 |
| 4$^{th}$ coefficient A | −4.483E−04 | −3.888E−04 | −1.439E−04 | 1.778E−04 | −1.740E−05 | 5.621E−05 |
| 6$^{th}$ coefficient B | 5.741E−05 | 9.953E−05 | −3.914E−05 | −6.708E−06 | −2.091E−04 | −6.270E−04 |
| 8$^{th}$ coefficient C | 9.720E−06 | −5.752E−06 | −1.023E−05 | 2.555E−06 | 4.728E−05 | 7.144E−05 |
| 10$^{th}$ coefficient D | −1.739E−06 | 4.927E−07 | 9.677E−08 | −8.469E−07 | −3.897E−06 | −6.588E−06 |
| 12$^{th}$ coefficient E | 9.095E−08 | −3.670E−08 | −8.846E−08 | 4.867E−08 | 2.575E−07 | 3.896E−07 |
| 14$^{th}$ coefficient F | 0.000E+00 | 0.000E+00 | 0.000E+00 | 0.000E+00 | 0.000E+00 | 0.000E+00 |
| 16$^{th}$ coefficient G | 0.000E+00 | 0.000E+00 | 0.000E+00 | 0.000E+00 | 0.000E+00 | 0.000E+00 |
| 18$^{th}$ coefficient H | 0.000E+00 | 0.000E+00 | 0.000E+00 | 0.000E+00 | 0.000E+00 | 0.000E+00 |
| 20$^{th}$ coefficient J | 0.000E+00 | 0.000E+00 | 0.000E+00 | 0.000E+00 | 0.000E+00 | 0.000E+00 |

|  | S14 | S15 | S16 | S17 | S18 | S19 |
|---|---|---|---|---|---|---|
| Conic constant K | 58.976819 | −9.065894 | −14.672 | −11.54744 | −16.39709 | −99 |
| 4$^{th}$ coefficient A | 3.524E−03 | 4.027E−03 | 3.254E−03 | −9.239E−03 | −5.302E−02 | −2.922E−02 |
| 6$^{th}$ coefficient B | −1.249E−03 | −7.376E−04 | 1.450E−03 | 7.626E−03 | 2.494E−02 | 1.298E−02 |
| 8$^{th}$ coefficient C | 2.490E−04 | 2.378E−04 | −4.328E−04 | −2.617E−03 | −9.618E−03 | −4.897E−03 |
| 10$^{th}$ coefficient D | −4.803E−05 | −5.242E−05 | 6.187E−05 | 4.216E−04 | 1.920E−03 | 1.115E−03 |
| 12$^{th}$ coefficient E | 4.783E−06 | 5.499E−06 | −2.485E−06 | −2.158E−05 | −1.410E−04 | −1.268E−04 |
| 14$^{th}$ coefficient F | 0.000E+00 | 0.000E+00 | 0.000E+00 | 0.000E+00 | 0.000E+00 | 5.679E−06 |
| 16$^{th}$ coefficient G | 0.000E+00 | 0.000E+00 | 0.000E+00 | 0.000E+00 | 0.000E+00 | 0.000E+00 |
| 18$^{th}$ coefficient H | 0.000E+00 | 0.000E+00 | 0.000E+00 | 0.000E+00 | 0.000E+00 | 0.000E+00 |
| 20$^{th}$ coefficient J | 0.000E+00 | 0.000E+00 | 0.000E+00 | 0.000E+00 | 0.000E+00 | 0.000E+00 |

Figure 43:
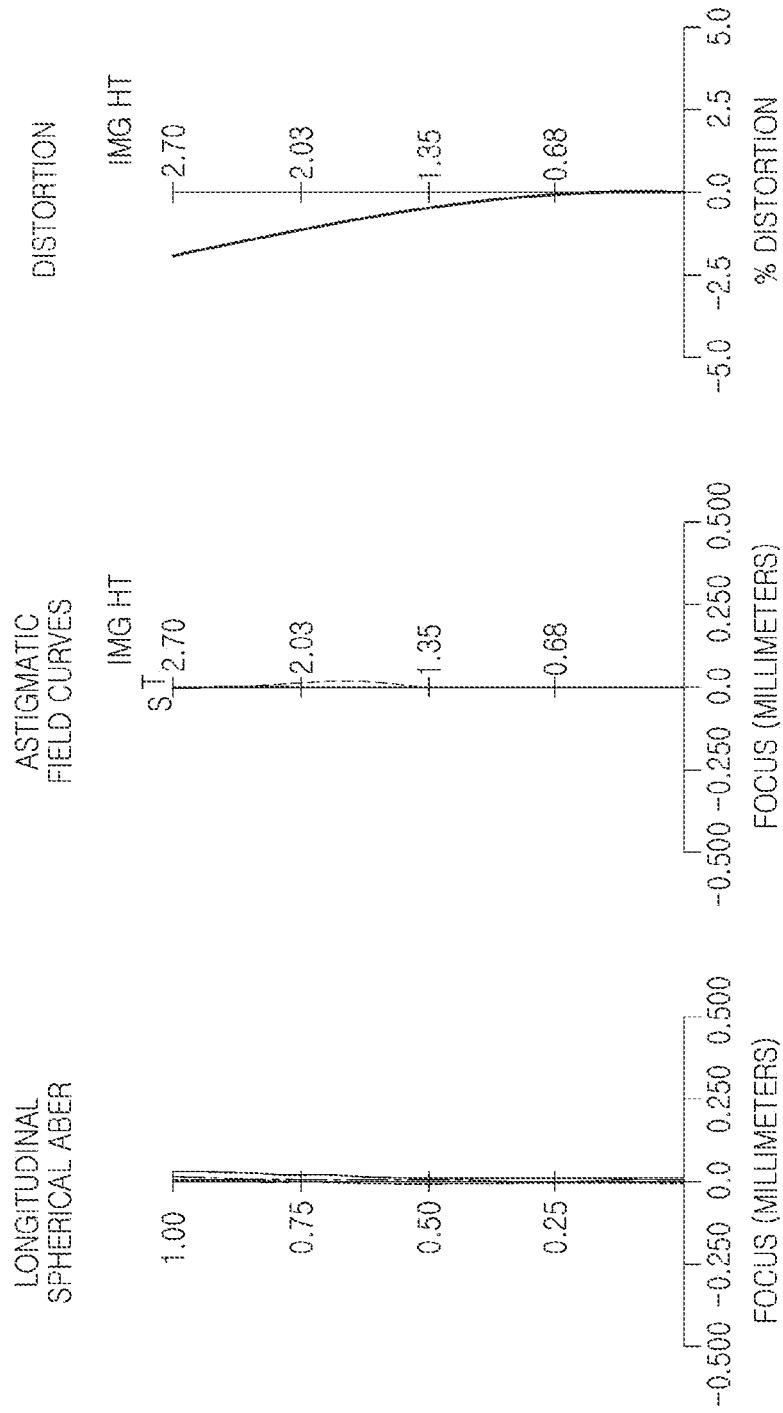
FIG. 43 presents graphs having curves representing aberration characteristics of the optical imaging system illustrated in FIG. 41.
Figure 44:
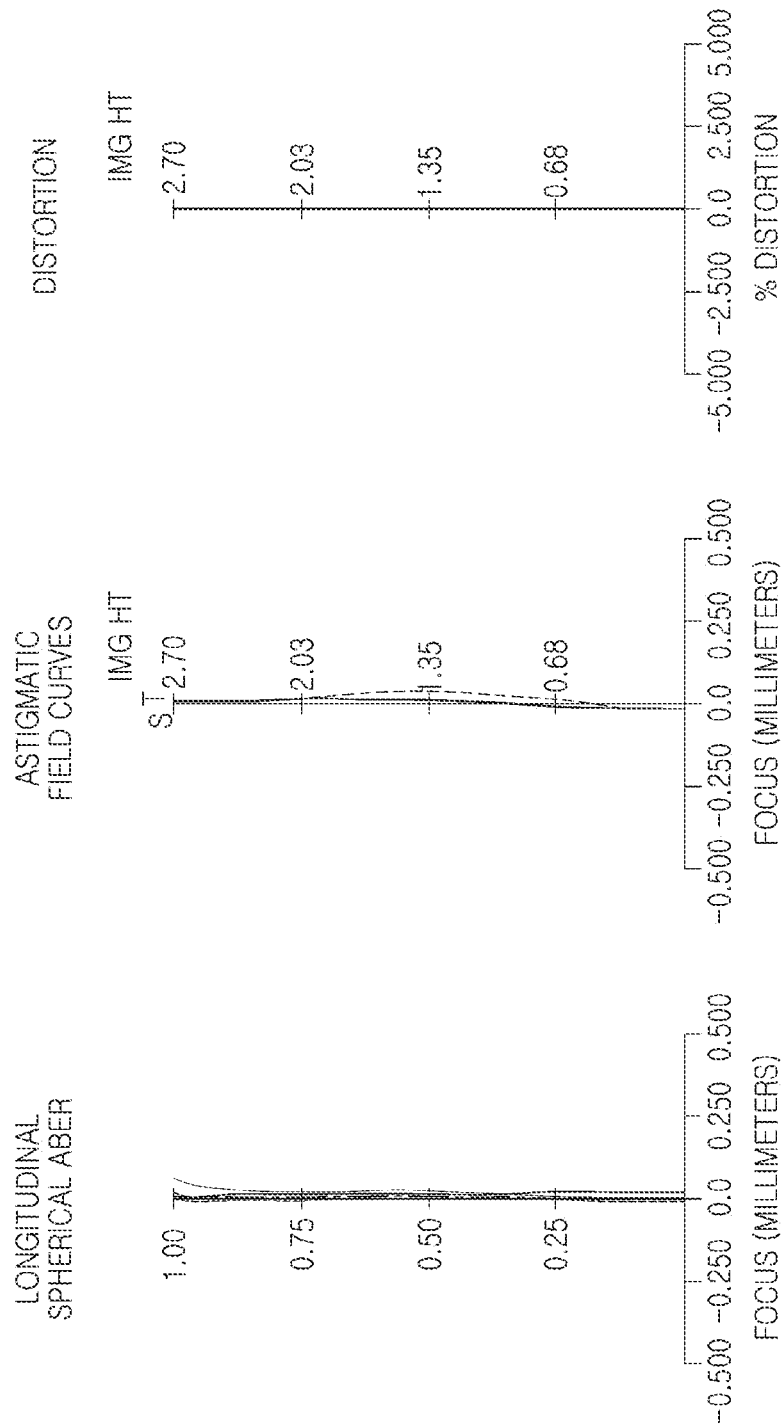
FIG. 44 presents graphs having curves representing aberration characteristics of the optical imaging system illustrated in FIG. 42.

In addition, the optical imaging system configured as described above may have aberration characteristics illustrated in FIGS. 43 and 44.

As set forth above, the optical imaging system according to an example embodiment of the present disclosure may implement the zoom function by changing the focal length.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system comprising:
   a first lens group, a second lens group, and a third lens group, each including a plurality of lenses and arranged in order along an optical axis;
   a reflecting member disposed in front of the first lens group; and
   an aperture disposed between the first lens group and the second lens group,
   wherein at least one of the first lens group to the third lens group is configured to be movable along the optical axis, wherein a lens disposed closest to the aperture among the plurality of lenses included in the second lens group is formed of glass, and wherein the lens formed of glass has the largest effective diameter among the plurality of lenses included in the first lens group to the third lens group.

2. The optical imaging system of claim 1, wherein at least one among the plurality of lenses included in the first lens group is formed of glass and the others are formed of plastic, and the plurality of lenses included in the third lens group are formed of plastic.

3. The optical imaging system of claim 1, wherein the object-side surface and image-side surface of the lens formed of glass are aspherical surfaces.

4. The optical imaging system of claim 1, wherein the first lens group has negative refractive power, the second lens group has positive refractive power, and the third lens group has negative refractive power.

5. The optical imaging system of claim 1, wherein the first lens group includes a first lens and a second lens, the second lens group includes a third lens, a fourth lens, a fifth lens, and a sixth lens, and the third lens group includes a seventh lens and an eighth lens.

6. The optical imaging system of claim 5, wherein the first lens has negative refractive power, and the second lens has positive refractive power.

7. The optical imaging system of claim 6, wherein the third lens has positive refractive power, the fourth lens has positive refractive power, the fifth lens has negative refractive power, and the sixth lens has positive refractive power.

8. The optical imaging system of claim 7, wherein the seventh lens has positive refractive power, and the eighth lens has negative refractive power.

9. The optical imaging system of claim 5, wherein the second lens group and the third lens group are each capable of being moved along the optical axis, wherein the optical imaging system has a first total focal length or a second total focal length, based on positions of the second lens group and the third lens group, and wherein the first total focal length is smaller than the second total focal length.

10. The optical imaging system of claim 9, wherein $0.5 < f3/fL < 3.0$, where f3 indicates a focal length of the third lens, and fL indicates the first total focal length.

11. The optical imaging system of claim 9, wherein $1.0 < f4/fL < 15.0$, where f4 indicates a focal length of the fourth lens, and fL indicates the first total focal length.

12. The optical imaging system of claim 9, wherein $-2.0 < f5/fL < -0.5$, where f5 indicates a focal length of the fifth lens, and fL indicates the first total focal length.

13. The optical imaging system of claim 9, wherein $0.5 < f6/fL < 3.0$, where f6 indicates a focal length of the sixth lens, and fL indicates the first total focal length.

14. The optical imaging system of claim 9, wherein $1.9 < fH/fL < 3.0$, where fL indicates the first total focal length, and fH indicates the second total focal length.

15. The optical imaging system of claim 1, wherein $2 < |fG1|/|fG2| < 3.0$ and $1 < |fG1|/|fG3| < 2$, where fG1 indicates a focal length of the first lens group, fG2 is a focal length of the second lens group, and fG3 indicates a focal length of the third lens group.

16. The optical imaging system of claim 1, wherein $1 < MAX\_GED/MAX\_PED < 1.2$, where MAX_GED indicates an effective diameter of the lens having the largest effective diameter among the plurality of lenses included in the first lens group to the third lens group, and MAX_PED indicates an effective diameter of the lens having the second largest effective diameter among the plurality of lenses included in the first lens group to the third lens group.

17. The optical imaging system of claim 1, wherein $0.9 < MAX\_GED/2IMG\ HT < 1.3$, where MAX_GED indicates an effective diameter of the lens having the largest effective diameter among the plurality of lenses included in the first lens group to the third lens group, and 2IMG HT indicates a diagonal length of an imaging plane.

18. An optical imaging system comprising:

a first lens group, a second lens group, and a third lens group, each including a plurality of lenses and arranged in order along an optical axis;

a reflecting member disposed in front of the first lens group; and an aperture disposed between the first lens group and the second lens group, wherein at least one of the first lens group to the third lens group is movable along the optical axis, wherein at least one lens among the plurality of lenses included in the second lens group is formed of glass, and wherein the at least one lens formed of glass has the largest effective diameter among the plurality of lenses included in the first lens group to the third lens group.

19. An electronic device comprising:

the optical imaging system of claim 18, wherein the optical imaging system further comprises an image sensor configured to convert an image of an incident subject into an electrical signal.

* * * * *